United States Patent
Scheuerell et al.

(10) Patent No.: US 11,618,422 B2
(45) Date of Patent: Apr. 4, 2023

(54) OPERATING MODES USING A BRAKING SYSTEM FOR AN ALL TERRAIN VEHICLE

(71) Applicant: Polaris Industries Inc., Medina, MN (US)

(72) Inventors: Alex R. Scheuerell, Wyoming, MN (US); Jonathon P. Graus, Stacy, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 17/582,589

(22) Filed: Jan. 24, 2022

(65) Prior Publication Data
US 2022/0144338 A1 May 12, 2022

Related U.S. Application Data

(62) Division of application No. 16/401,933, filed on May 2, 2019, now Pat. No. 11,254,294.
(Continued)

(51) Int. Cl.
*B60T 8/1755* (2006.01)
*B60T 8/171* (2006.01)

(52) U.S. Cl.
CPC .......... *B60T 8/1755* (2013.01); *B60T 8/171* (2013.01)

(58) Field of Classification Search
CPC .............................. B60T 8/1755; B60T 8/171
See application file for complete search history.

(56) References Cited

U.S. PATENT DOCUMENTS

| 1,567,982 A | 12/1925 | Pfeiffer |
| 1,606,224 A | 11/1926 | Hoeller |

(Continued)

FOREIGN PATENT DOCUMENTS

| CN | 1935589 A | 3/2007 |
| CN | 101643006 A | 2/2010 |

(Continued)

OTHER PUBLICATIONS

International Preliminary Report on Patentability issued by the International Preliminary Examining Authority, dated Jan. 30, 2020, for International Patent Application No. PCT/US2018/062179; 18 pages.
(Continued)

*Primary Examiner* — Ramsey Refai
(74) *Attorney, Agent, or Firm* — Faegre Drinker Biddle & Reath LLP

(57) ABSTRACT

An all terrain vehicle may include a braking system comprising a hydraulic and electric controller unit (HECU) operably coupled to the plurality of ground-engaging members. The HECU may receive sensor information from the one or more sensors and determine whether the all terrain vehicle is encountering a wheel locking event based on the sensor information. The wheel locking event may indicate the plurality of ground-engaging members are unable to turn. The HECU also may determine whether the all terrain vehicle is encountering a turning event based on the sensor information and operate in an HECU intervention mode based on an indication that the all terrain vehicle is encountering the wheel locking event and the turning event. The HECU intervention mode permits the HECU to control the plurality of ground-engaging members based on steering input.

8 Claims, 29 Drawing Sheets

Related U.S. Application Data

(60) Provisional application No. 62/767,097, filed on Nov. 14, 2018.

(56) References Cited

U.S. PATENT DOCUMENTS

| | | | |
|---|---|---|---|
| 2,313,991 A | 3/1943 | Fitch | |
| 3,159,974 A | 12/1964 | Rodgers | |
| 3,473,634 A | 10/1969 | Strifler et al. | |
| 3,486,591 A | 12/1969 | Scheffler | |
| 3,554,334 A | 1/1971 | Shimano et al. | |
| 3,750,857 A | 8/1973 | Marschall et al. | |
| 3,868,001 A | 2/1975 | Yokoi | |
| 3,885,392 A | 5/1975 | Haraikawa | |
| 3,960,030 A | 6/1976 | Williams | |
| 3,999,807 A | 12/1976 | Haraikawa | |
| 4,024,932 A | 5/1977 | Fay | |
| 4,161,239 A | 7/1979 | Karasudani | |
| 4,174,867 A | 11/1979 | Oberthur | |
| 4,176,886 A | 12/1979 | Watanabe | |
| 4,189,190 A | 2/1980 | Luepertz | |
| 4,239,294 A | 12/1980 | Burgdorf | |
| 4,274,518 A | 6/1981 | Berisch | |
| 4,289,359 A | 9/1981 | Luepertz et al. | |
| 4,421,359 A | 12/1983 | Hayashi et al. | |
| 4,456,310 A | 6/1984 | Hayashi et al. | |
| 4,465,322 A | 8/1984 | Hayashi | |
| 4,494,800 A | 1/1985 | Hayashi | |
| 4,598,954 A | 7/1986 | Hayashi | |
| 4,697,825 A | 10/1987 | Hayashi et al. | |
| 4,702,339 A | 10/1987 | Hayashi et al. | |
| 4,733,757 A | 3/1988 | Hayashi et al. | |
| 4,766,982 A | 8/1988 | Hayashi et al. | |
| 4,770,473 A | 9/1988 | Tsuchida | |
| 4,852,701 A | 8/1989 | Wakatsuki | |
| 4,865,399 A | 9/1989 | Atkins et al. | |
| 4,943,922 A | 7/1990 | Tanaka | |
| 4,976,501 A | 12/1990 | Sivulka et al. | |
| 5,036,960 A | 8/1991 | Schenk et al. | |
| 5,134,352 A * | 7/1992 | Matsumoto | B60T 8/1755 303/146 |
| 5,195,717 A | 3/1993 | Benz et al. | |
| 5,219,211 A | 6/1993 | Tsuchida et al. | |
| 5,246,276 A | 9/1993 | Pajonk et al. | |
| 5,273,346 A | 12/1993 | Tsuchida et al. | |
| 5,344,220 A | 9/1994 | Roll et al. | |
| 5,363,943 A | 11/1994 | Iwashita et al. | |
| 5,372,408 A | 12/1994 | Tsuchida et al. | |
| 5,445,443 A | 8/1995 | Hauser et al. | |
| 5,501,511 A | 3/1996 | Wagner | |
| 5,544,946 A | 8/1996 | Toyoda et al. | |
| 5,564,534 A | 10/1996 | Toyoda et al. | |
| 5,586,814 A | 12/1996 | Steiner | |
| 5,615,934 A | 4/1997 | Abuelsamid | |
| 5,620,237 A | 4/1997 | Iwashita et al. | |
| 5,628,387 A | 5/1997 | Schantzen | |
| 5,683,152 A * | 11/1997 | Hu | B60T 8/1755 180/197 |
| 5,727,852 A | 3/1998 | Pueschel et al. | |
| 5,730,256 A | 3/1998 | Namngani | |
| 5,918,948 A | 7/1999 | Burgdorf et al. | |
| 5,971,499 A | 10/1999 | Pape et al. | |
| 6,092,877 A | 7/2000 | Rasidescu et al. | |
| 6,095,276 A | 8/2000 | Kuroda et al. | |
| 6,142,583 A | 11/2000 | Steffes | |
| 6,155,655 A * | 12/2000 | Matsuno | B60T 8/1755 303/140 |
| 6,273,523 B1 | 8/2001 | Wakabayashi et al. | |
| 6,390,566 B1 | 5/2002 | Matsuno | |
| 6,407,663 B1 | 6/2002 | Huggett | |
| 6,419,329 B1 | 7/2002 | Buschmann et al. | |
| 6,478,103 B1 | 11/2002 | Matsuura | |
| 6,652,039 B1 | 11/2003 | Shull et al. | |
| 6,772,864 B1 | 8/2004 | Luh | |
| 6,793,295 B2 | 9/2004 | Sakamoto | |
| 6,802,400 B2 | 10/2004 | Ohura | |
| 6,814,413 B2 | 11/2004 | Davison et al. | |
| 6,817,434 B1 | 11/2004 | Sweet | |
| 6,835,904 B2 | 12/2004 | McGuire et al. | |
| 6,883,630 B2 | 4/2005 | Morin | |
| 6,923,514 B1 | 8/2005 | Spieker et al. | |
| 7,219,965 B2 | 5/2007 | Wagner | |
| 7,331,640 B2 | 2/2008 | Koyama | |
| 7,350,881 B2 | 4/2008 | Asahi | |
| 7,611,212 B2 | 11/2009 | Nakayama et al. | |
| 7,695,074 B2 | 4/2010 | Pongo | |
| 7,918,301 B2 | 4/2011 | Ito et al. | |
| 8,002,066 B2 | 8/2011 | Harada | |
| 8,140,236 B2 | 3/2012 | Eckert et al. | |
| 8,186,470 B2 | 5/2012 | Matayoshi | |
| 8,439,455 B2 | 5/2013 | Hayashi et al. | |
| 8,616,324 B2 | 12/2013 | Chipp | |
| 8,633,611 B2 | 1/2014 | Waida et al. | |
| 8,651,213 B2 | 2/2014 | Nagakubo et al. | |
| 8,887,859 B2 | 11/2014 | Matsushima | |
| 8,933,797 B2 | 1/2015 | Deigmoller et al. | |
| 8,973,696 B2 | 3/2015 | Hamauzu et al. | |
| 9,010,475 B2 | 4/2015 | Nagai et al. | |
| 9,022,157 B2 | 5/2015 | Konno et al. | |
| 9,033,429 B2 | 5/2015 | Waida et al. | |
| 9,085,287 B2 | 7/2015 | Moore et al. | |
| 9,120,520 B2 | 9/2015 | Miyamoto et al. | |
| 9,132,813 B2 | 9/2015 | Matsuda | |
| 9,156,453 B2 | 10/2015 | Takatsuka et al. | |
| 9,260,058 B2 | 2/2016 | Takasaki et al. | |
| 9,527,362 B2 | 12/2016 | Brady et al. | |
| 9,771,084 B2 | 9/2017 | Norstad | |
| 10,246,153 B2 | 4/2019 | Deckard et al. | |
| 10,369,886 B2 | 8/2019 | Safranski et al. | |
| 10,723,334 B2 | 7/2020 | Pongo et al. | |
| 2001/0030464 A1 | 10/2001 | Kouauki | |
| 2002/0063010 A1 | 5/2002 | Morin | |
| 2002/0088661 A1 | 7/2002 | Gagnon et al. | |
| 2003/0004632 A1 | 1/2003 | Walenty et al. | |
| 2004/0035629 A1 | 2/2004 | Morin et al. | |
| 2004/0239180 A1 | 12/2004 | Foust | |
| 2005/0134114 A1 | 6/2005 | Asahi | |
| 2005/0146207 A1 | 7/2005 | Wagner | |
| 2005/0206231 A1 * | 9/2005 | Lu | B60G 17/0162 303/146 |
| 2005/0228568 A1 | 10/2005 | Hack et al. | |
| 2006/0152071 A1 | 7/2006 | Takeuchi | |
| 2006/0175895 A1 | 8/2006 | Mahlo et al. | |
| 2007/0075582 A1 | 4/2007 | Nakayama et al. | |
| 2007/0139255 A1 | 6/2007 | Kamping et al. | |
| 2007/0145227 A1 | 6/2007 | Hasegawa | |
| 2007/0200430 A1 | 8/2007 | Tani | |
| 2007/0267916 A1 | 11/2007 | Mackovjak et al. | |
| 2009/0033144 A1 | 2/2009 | Ikeda | |
| 2009/0118961 A1 | 5/2009 | Eckert et al. | |
| 2009/0243378 A1 | 10/2009 | Ito et al. | |
| 2010/0000818 A1 | 1/2010 | Fukuyama et al. | |
| 2010/0304930 A1 | 12/2010 | Poulin | |
| 2011/0232987 A1 | 9/2011 | Chipp | |
| 2011/0297462 A1 | 12/2011 | Grajkowski et al. | |
| 2011/0315459 A1 | 12/2011 | Zuchoski et al. | |
| 2012/0150409 A1 | 6/2012 | Ogawa et al. | |
| 2012/0186895 A1 | 7/2012 | Hamauzu et al. | |
| 2012/0200148 A1 | 8/2012 | Waida et al. | |
| 2012/0211295 A1 | 8/2012 | Nagai et al. | |
| 2012/0247858 A1 | 10/2012 | Konno et al. | |
| 2012/0303234 A1 | 11/2012 | Matsuda | |
| 2013/0009378 A1 | 1/2013 | Nagakubo et al. | |
| 2013/0066533 A1 | 3/2013 | Moore et al. | |
| 2013/0110359 A1 | 5/2013 | Febrer et al. | |
| 2013/0180605 A1 | 7/2013 | Matsushima | |
| 2013/0241272 A1 | 9/2013 | Kim et al. | |
| 2014/0062048 A1 | 3/2014 | Schlangen et al. | |
| 2015/0041232 A1 | 2/2015 | Takatsuka et al. | |
| 2015/0096819 A1 | 4/2015 | Grajkowski et al. | |
| 2015/0191161 A1 | 7/2015 | Sagayama et al. | |
| 2016/0047450 A1 | 2/2016 | Steidl et al. | |
| 2016/0298744 A1 | 10/2016 | Bujold et al. | |
| 2018/0065465 A1 | 3/2018 | Ward et al. | |

(56) References Cited

U.S. PATENT DOCUMENTS

| | | | |
|---|---|---|---|
| 2018/0141543 A1 | 5/2018 | Krosschell et al. |
| 2018/0211454 A1 | 7/2018 | Carlson et al. |
| 2018/0257726 A1 | 9/2018 | Bagnariol et al. |
| 2018/0265056 A1 | 9/2018 | Hasegawa |
| 2018/0281764 A1 | 10/2018 | Pongo et al. |
| 2018/0304962 A1 | 10/2018 | Adachi et al. |
| 2019/0152493 A1 | 5/2019 | Pongo et al. |
| 2019/0337497 A1 | 11/2019 | Scheuerell et al. |
| 2021/0009097 A1 | 1/2021 | Pongo et al. |

FOREIGN PATENT DOCUMENTS

| | | |
|---|---|---|
| CN | 102730122 A | 10/2012 |
| CN | 103158692 A | 6/2013 |
| DE | 3803563 A1 | 8/1989 |
| DE | 3901923 A1 | 9/1990 |
| DE | 4329140 C1 | 12/1994 |
| DE | 4330121 A1 | 3/1995 |
| DE | 19501760 A1 | 7/1996 |
| DE | 19613903 A1 | 10/1997 |
| DE | 19731650 A1 | 1/1999 |
| DE | 102004034226 A1 | 3/2005 |
| DE | 102010031140 A1 | 1/2012 |
| EP | 0175843 A2 | 4/1986 |
| EP | 0422515 A2 | 4/1991 |
| EP | 1520763 A1 | 4/2005 |
| EP | 1568561 A1 | 8/2005 |
| EP | 1679243 A1 | 7/2006 |
| EP | 1702822 A1 | 9/2006 |
| EP | 1783018 A1 | 5/2007 |
| EP | 1842755 A1 | 10/2007 |
| EP | 2075168 A2 | 7/2009 |
| EP | 2075169 A2 | 7/2009 |
| EP | 2213536 A1 | 8/2010 |
| EP | 2216218 A1 | 8/2010 |
| EP | 2284071 A1 | 2/2011 |
| EP | 2311704 A1 | 4/2011 |
| EP | 2540587 A1 | 1/2013 |
| EP | 2548792 A1 | 1/2013 |
| EP | 2565090 A1 | 3/2013 |
| EP | 2574511 A1 | 4/2013 |
| EP | 2591962 A1 | 5/2013 |
| EP | 2765068 A1 | 8/2014 |
| EP | 2868958 A1 | 5/2015 |
| EP | 2915729 A1 | 9/2015 |
| EP | 2977281 A1 | 1/2016 |
| FR | 2843349 A1 | 2/2004 |
| ID | 201202332 | 10/2011 |
| ID | 201303965 | 11/2012 |
| IN | 201103052 | 1/2013 |
| IN | 201002229 | 10/2013 |
| IN | 201202995 | 4/2014 |
| IN | 201202996 | 4/2014 |
| IN | 201203002 | 4/2014 |
| IN | 201500699 | 1/2016 |
| JP | 11-311265 A | 11/1999 |
| JP | 11-314589 A | 11/1999 |
| JP | 11-314590 A | 11/1999 |
| JP | 11-314591 A | 11/1999 |
| JP | 2000-006779 A | 1/2000 |
| JP | 2000-071962 A | 3/2000 |
| JP | 2000-142343 A | 5/2000 |
| JP | 2001-253383 A | 9/2001 |
| JP | 2001-260848 A | 9/2001 |
| JP | 2002-029403 A | 1/2002 |
| JP | 2002-067913 A | 3/2002 |
| JP | 2002-193175 A | 7/2002 |
| JP | 2005-059629 A | 3/2005 |
| JP | 2005-178632 A | 7/2005 |
| JP | 2005-238901 A | 9/2005 |
| JP | 2006-175993 A | 7/2006 |
| JP | 2006-192980 A | 7/2006 |
| JP | 2007-008375 A | 1/2007 |
| JP | 2007-069870 A | 3/2007 |
| JP | 2007-076555 A | 3/2007 |
| JP | 2007-112155 A | 5/2007 |
| JP | 2007-296908 A | 11/2007 |
| JP | 2010-013067 A | 1/2010 |
| JP | 2010-058699 A | 3/2010 |
| JP | 2010-076511 A | 4/2010 |
| JP | 4451302 B2 | 4/2010 |
| JP | 2010-228543 A | 10/2010 |
| JP | 2011-051417 A | 3/2011 |
| JP | 2011-051433 A | 3/2011 |
| JP | 2011-079351 A | 4/2011 |
| JP | 2011-088631 A | 5/2011 |
| JP | 4739156 B2 | 8/2011 |
| JP | 2012-096753 A | 5/2012 |
| JP | 2012-210891 A | 11/2012 |
| JP | 2012-245843 A | 12/2012 |
| JP | 2013-014199 A | 1/2013 |
| JP | 2013-071589 A | 4/2013 |
| JP | 5189337 B2 | 4/2013 |
| JP | 2013-103524 A | 5/2013 |
| JP | 2013-103693 A | 5/2013 |
| JP | 2013-136356 A | 7/2013 |
| JP | 2014-031138 A | 2/2014 |
| JP | 2014-148308 A | 8/2014 |
| JP | 5667542 B2 | 2/2015 |
| JP | 5685172 B2 | 3/2015 |
| JP | 5715536 B2 | 5/2015 |
| JP | 5751989 B2 | 7/2015 |
| JP | 5764025 B2 | 8/2015 |
| JP | 2015-178335 A | 10/2015 |
| JP | 5816715 B2 | 11/2015 |
| JP | 5882803 B2 | 3/2016 |
| JP | 2016-137872 A | 8/2016 |
| JP | 5972706 B2 | 8/2016 |
| KR | 10-1479827 B1 | 1/2015 |
| TW | 484550 | 4/2002 |
| TW | 243401 | 9/2004 |
| TW | 247468 | 10/2004 |
| WO | 96/02409 A1 | 2/1996 |
| WO | 2004/002769 A1 | 1/2004 |
| WO | 2004/022395 A1 | 3/2004 |
| WO | 2011/027441 A1 | 3/2011 |
| WO | 2018/183452 A1 | 10/2018 |
| WO | 2019/213417 A1 | 11/2019 |

OTHER PUBLICATIONS

International Preliminary Report on Patentability received for PCT Patent Application No. PCT/EP2016/055734, dated Sep. 28, 2017, 18 pages.
International Preliminary Report on Patentability received for PCT Patent Application No. PCT/US2007/011268, dated Aug. 12, 2008, 11 pages.
International Search Report and Written Opinion issued by the European Patent Office, dated Jul. 24, 2018, for International Patent Application No. PCT/US2018/024775; 10 pages.
International Search Report and Written Opinion received for PCT Patent Application No. PCT/US2007/011268, dated Feb. 22, 2008, 7 pages.
International Search Report and Written Opinion received for PCT Patent Application No. PCT/US2018/062179, dated Feb. 13, 2019, 17 pages.
International Search Report issued by the International Searching Authority, dated Aug. 20, 2019, for International Patent Application No. PCT/US2019/030432; 4 pages.
Invitation to Restrict or Pay Additional Fees, and, Where Applicable, Protest Fee, issued by the European Patent Office, dated Apr. 4, 2019, for International Patent Application No. PCT/US2018/024775; 4 pages.
Office Action issued by the Canadian Intellectual Property Office, dated Jul. 30, 2020, for Canadian Patent Applicatior No. 3,055,074; 3 pages.

(56) References Cited

OTHER PUBLICATIONS

Written Opinion of the International Searching Authority, dated Aug. 20, 2019, for International Patent Application No. PCT/US2019/030432; 6 pages.

* cited by examiner

User Interface

|  | Pre-programed Default Driving Mode Settings (each setting can be reconfigured by end user) | | | |
| --- | --- | --- | --- | --- |
| Configurable System Modes Via Ride Command (or similar) | Aggressive | Sport | Comfort | User |
| Agility Control /ABS | | | | |
| Sport | X | X | | |
| Normal | | | X | X |
| Off | | | | |
| Dynamix Mode | | | | |
| Firm | X | | | |
| Sport | | X | | X |
| Comfort | | | X | |
| Rock Crawl | | | | |
| EPS Assist | | | | |
| Low | X | | | |
| Medium | | X | | X |
| High | | | X | |
| Throttle | | | | |
| Sport | X | X | | |
| Normal | | | | X |
| Comfort | | | X | |
| Transmission | | | | |
| Sport | X | X | | |
| Normal | | | | X |
| Quiet | | | X | |
| Fuel Econ | | | | |

Fig. 20

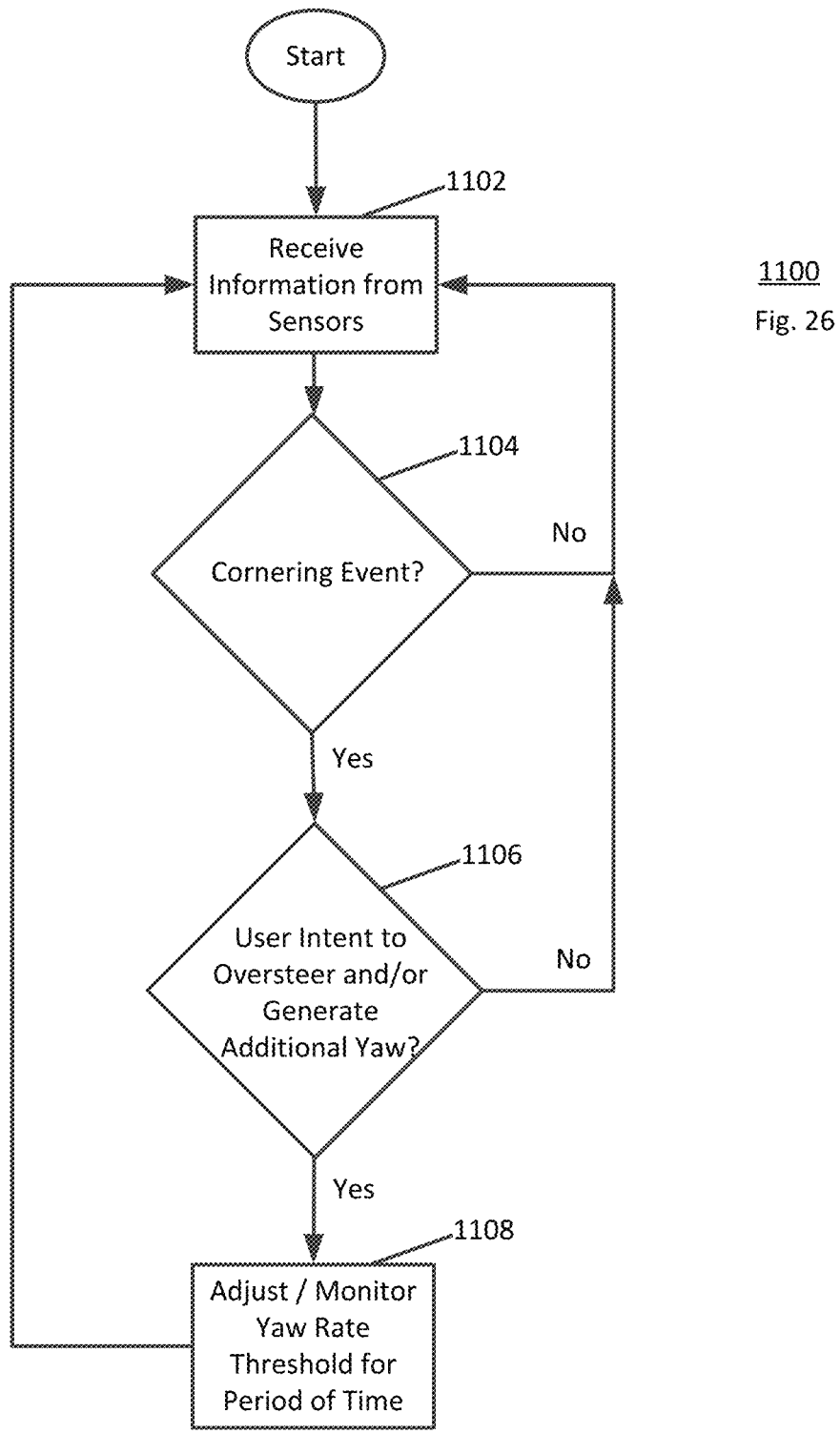

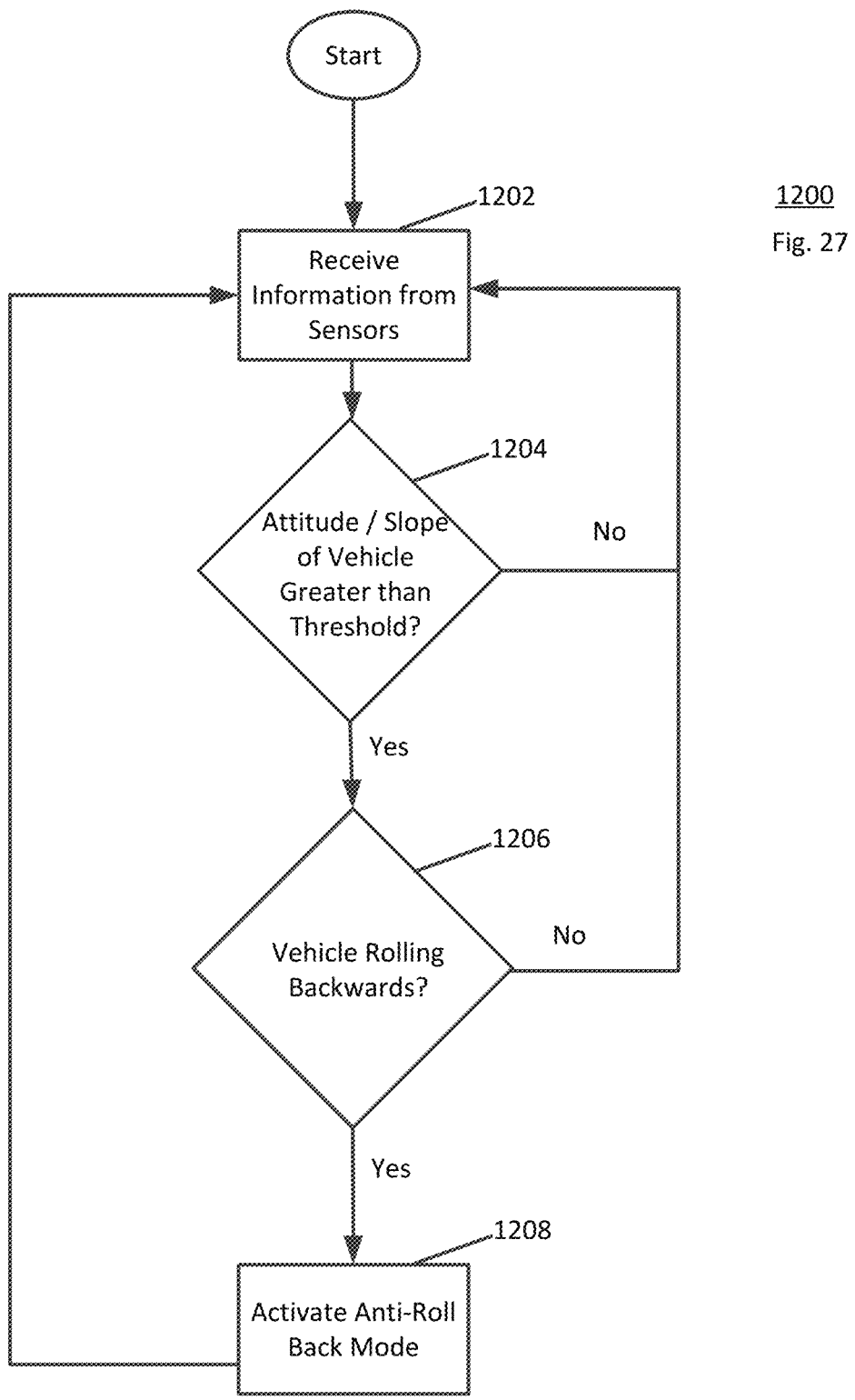

OPERATING MODES USING A BRAKING SYSTEM FOR AN ALL TERRAIN VEHICLE

CROSS-REFERENCE TO RELATED APPLICATIONS

This application is a divisional of U.S. patent application Ser. No. 16/401,933, filed on May 2, 2019, and titled "OPERATING MODES USING A BRAKING SYSTEM FOR AN ALL TERRAIN VEHICLE," which claims benefit of US Provision Application No. 62/767,097, filed Nov. 14, 2018, titled ACTIVATING A DRIVE MODE FOR AN ALL TERRAIN VEHICLE BASED ON EVENT DETECTION, and U.S. Provisional Application No. 62/665,850 filed May 2, 2018, titled OPERATING MODES USING ANTI-LOCK BRAKING SYSTEM FOR AN ALL TERRAIN VEHICLE, the entire disclosures of which are expressly incorporated by reference herein.

TECHNICAL FIELD OF THE DISCLOSURE

The present application relates to a braking system for a vehicle and, more particularly, to a braking system, such as an anti-lock braking system (ABS), for an all terrain vehicle configured for off-road applications.

BACKGROUND OF THE DISCLOSURE

Larger vehicles enable more cargo space, more comfort, and better rides through rough terrain. However, as manufacturers extend the length of the vehicles, the vehicles lose maneuverability and become cumbersome to navigate. For example, traditionally, larger vehicles require greater turning radiuses to make the same turn as smaller vehicles. It is especially important in off-road applications for larger vehicles to make the same turns as smaller vehicles.

In some embodiments, turning radiuses may be determined by two factors: wheelbase length and steered wheel cut angles. A shorter wheelbase length may cause a tighter turn radius. However, the mechanical design architecture of the vehicle may make it impossible to reduce the wheelbase length. Further, steered wheel cut angles (e.g., the amount a wheel is allowed to turn) may also cause a tighter turn radius. However, after maximizing the steered wheel cut angles, the larger vehicle may again not have the necessary turning radiuses. As such, there is a need for a system to reduce the turning radiuses for larger vehicles.

SUMMARY OF THE DISCLOSURE

In some embodiments, an all terrain vehicle comprises a frame and a plurality of ground-engaging members supporting the frame. Each of the plurality of ground-engaging members is configured to rotate about an axle. The all terrain vehicle further comprises a powertrain assembly supported by the frame and a braking system comprising a hydraulic and electric controller unit (HECU) operably coupled to the plurality of ground-engaging members and configured to generate yaw to reduce a turning radius of the all terrain vehicle. The HECU is further configured to control brake pressure to the plurality of ground-engaging members independent of a driver input indicating a braking event.

In some instances, the HECU is configured to generate the yaw to reduce the turning radius of the all terrain vehicle based on the ABS operating in a cutter brake mode. The HECU is configured to engage the cutter brake mode in response to satisfying one or more first criteria. In some examples, the HECU is configured to engage the cutter brake mode by applying brake pressure to one or more ground-engaging members of the plurality of ground-engaging members. In some variations, the one or more sensors comprises a user interface and the HECU is further configured to engage the cutter brake mode in response to receiving, from the user interface, user input indicating that a differential lock mode is off. In some instances, the one or more sensors comprises a sensor configured to detect a turning condition of the all terrain vehicle. The HECU engages the cutter brake mode based on receiving, from the sensor, the turning condition and comparing the turning condition with a pre-determined threshold.

In some examples, the one or more sensors comprises a vehicle speed sensor configured to detect a vehicle speed of the all terrain vehicle. The HECU engages the cutter brake mode based on receiving, from the vehicle speed sensor, the vehicle speed and comparing the vehicle speed with a pre-determined threshold. In some variations, the one or more sensors comprises a user interface. The HECU is further configured to engage the cutter brake mode in response to receiving user input indicating the cutter brake mode is on from the user interface. In some instances, the braking system is configured to operate in an agility control mode. The HECU is configured to engage the agility control mode based on satisfying one or more second criteria. In some variations, the satisfying the one or more second criteria comprises determining that the one or more first criteria has not been satisfied.

In some instances, the plurality of ground engaging members comprises a first front ground-engaging member, a second front ground-engaging member, a first rear ground-engaging member, and a second rear ground-engaging member. The braking system comprises a first front brake caliper operably coupled to the first front ground-engaging member, a second front brake caliper operably coupled to the second front ground-engaging member, a first rear brake caliper operably coupled to the first rear ground-engaging member, and a second rear brake caliper operably coupled to the second rear ground-engaging member. In some examples, the all terrain vehicle is operating in an all wheel drive. The HECU is configured to engage the cutter brake mode by distributing hydraulic fluid to the first front brake caliper operably coupled to the first front ground-engaging member and the first rear brake caliper operably coupled to the first rear ground-engaging member. The first front ground-engaging member and the first rear ground-engaging member are inner ground-engaging members when the all terrain vehicle is executing the turn.

In some variations, the all terrain vehicle is operating in a 2 wheel drive. The HECU is configured to engage the cutter brake mode by distributing hydraulic fluid to the first front brake caliper operably coupled to the first front ground-engaging member and the first rear brake caliper operably coupled to the first rear ground-engaging member. The first front ground-engaging member and the first rear ground-engaging member are inner ground-engaging members when the all terrain vehicle is executing the turn. In some instances, the all terrain vehicle is operating in a 2 wheel drive. The HECU is configured to engage the cutter brake mode by distributing hydraulic fluid to the first rear brake caliper operably coupled to the first rear ground-engaging member only. The first rear ground-engaging member is an inner ground-engaging member when the all terrain vehicle is executing the turn.

In some examples, the HECU is configured to generate yaw to reduce the turning radius by executing a cutter brake mode by receiving sensor information from the one or more sensors, providing a first cutter brake input corresponding to a first amount of brake pressure to one or more inner ground-engaging members of the plurality of ground-engaging members, wherein the providing the first cutter brake input generates yaw to reduce the turning radius of the all terrain vehicle, and adjusting, based on the sensor information, the first cutter brake input corresponding to the first amount of brake pressure. In some instances, the sensor information comprises a plurality of sensor inputs, wherein the plurality of sensor inputs comprises at least one of: an engine speed from an engine speed sensor, an engine torque from an engine control module (ECM), a vehicle speed from a vehicle speed sensor, a plurality of wheel speeds corresponding to the plurality of ground-engaging members from a plurality of wheel speed sensors, a pedal position, and a steering measurement from a steering sensor.

In some variations, the adjusting the first cutter brake input comprises determining a plurality of corresponding cutter brake inputs for the plurality of sensor inputs, determining a minimum corresponding cutter brake input from the plurality of corresponding cutter brake inputs, and adjusting the first cutter brake input based on the minimum corresponding cutter brake input. In some instances, the adjusting the first cutter brake input comprises determining, based on the sensor information, at least one of: an increase in the pedal position, an increase in the engine torque, and the vehicle speed is greater than a vehicle speed threshold and increasing the first cutter brake input based on the increase in the pedal position, the increase in the engine torque, or the vehicle speed is greater than the vehicle speed threshold. In some examples, the adjusting the first cutter brake input comprises determining, based on the sensor information, a greatest magnitude wheel speed from the plurality of wheel speeds or a transmission speed, determining a corresponding cutter brake input based on at least one of: the greatest magnitude wheel speed sensor, the transmission speed, and the engine speed, and adjusting the first cutter brake input based on the corresponding cutter brake input. In some variations, the HECU is configured to prevent damage to one or more components of the all terrain vehicle based on the adjusting the first cutter brake input corresponding to the first amount of brake pressure.

In some examples, the HECU is configured to generate yaw to reduce the turning radius by executing a cutter brake mode comprising receiving sensor information from the one or more sensors, gradually increasing a cutter brake input corresponding to an amount of brake pressure to one or more inner ground-engaging members of the plurality of ground-engaging members, wherein the cutter brake input generates yaw to reduce the turning radius of the all terrain vehicle, adjusting a cutter input threshold based on the sensor information, and adjusting the cutter brake input based on comparing a current cutter brake input to the cutter input threshold. In some instances, the adjusting the cutter input threshold comprises reducing the cutter input threshold based on the sensor information and the adjusting the cutter brake input comprises reducing the amount of brake pressure in response to determining the current cutter brake input exceeds the reduced cutter input threshold. In some variations, the adjusting the cutter input threshold comprises increasing the cutter input threshold in response to determining an increase in a steering measurement from a steering sensor. In some instances, the braking system is an anti-lock braking system (ABS).

In some embodiments, an all terrain vehicle comprises a frame and a plurality of ground-engaging members supporting the frame. Each of the plurality of ground-engaging members is configured to rotate about an axle. The all terrain vehicle further comprises a powertrain assembly supported by the frame and a braking system comprising a hydraulic and electric controller unit (HECU) operably coupled to the plurality of ground-engaging members and configured to prevent the all terrain vehicle from moving during start-up. The HECU is further configured to control brake pressure to the plurality of ground-engaging members independent of a driver input indicating a braking event.

In some instances, the HECU is configured to prevent the all terrain vehicle from moving during start-up based on the ABS operating in an engine flare hold mode, and wherein the HECU is configured to engage the engine flare hold mode in response to satisfying one or more criteria. In some examples, the one or more sensors comprises a vehicle speed sensor configured to detect a vehicle speed of the all terrain vehicle. The HECU engages the engine flare hold mode based on receiving, from the vehicle speed sensor, the vehicle speed. In some variations, the one or more sensors comprises an engine control module configured to detect engine speed for the all terrain vehicle. The HECU engages the engine flare hold mode based on receiving, from the engine control module, the engine speed and comparing the engine speed with a pre-determined threshold. In some instances, the HECU engages the engine flare hold mode in response to receiving engine start request information. In some examples, the engine start request information comprises a key position signal, an engine control module start signal, or an engine control module engine status signal. In some examples, the one or more sensors comprises a throttle pedal position sensor configured to detect a throttle pedal position for the all terrain vehicle. The HECU is configured to disengage the engine flare hold mode based on receiving, from the throttle pedal position sensor, information indicating that a user is directing movement of the all terrain vehicle. In some variations, the braking system is an anti-lock braking system (ABS).

In some embodiments, an all terrain vehicle comprises a frame and a plurality of ground-engaging members supporting the frame. Each of the plurality of ground-engaging members is configured to rotate about an axle. The all terrain vehicle further comprises a powertrain assembly supported by the frame and a braking system comprising a hydraulic and electric controller unit (HECU) operably coupled to the plurality of ground-engaging members and configured to engage a winch hold mode in response to satisfying one or more criteria. The HECU is configured to control brake pressure to the plurality of ground-engaging members independent of a driver input indicating a braking event.

In some instances, the one or more sensors comprises a user interface. The HECU engages the winch hold mode in response to receiving, from the user interface, user input indicating that the winch hold mode is on. In some examples, the one or more sensors comprises a vehicle speed sensor configured to detect a vehicle speed of the all terrain vehicle. The HECU engages the winch hold mode based on receiving, from the vehicle speed sensor, the vehicle speed and comparing the vehicle speed with a pre-determined threshold. In some variations, the braking system is an anti-lock braking system (ABS).

In some embodiments, an all terrain vehicle comprises a frame and a plurality of ground-engaging members supporting the frame. Each of the plurality of ground-engaging members is configured to rotate about an axle. The plurality of ground-engaging members comprising a first and a second ground-engaging member. The all terrain vehicle further comprises a powertrain assembly supported by the frame, at least one sensor configured to provide sensor information, and a controller operatively coupled to the at least one sensor. The controller is configured to receive user input indicating a change from a first driving mode to a second driving mode, receive, from the at least one sensor, the sensor information, determine, based on the sensor information, whether a first speed corresponding to the first ground-engaging member and a second speed corresponding to the second ground-engaging member are within a threshold percentage of each other, and in response to determining the first speed and the second speed are within the threshold percentage of each other, provide one or more commands to transition the all-terrain vehicle into the second driving mode.

In some instances, the first driving mode is a 2 wheel drive (WD) mode and the second driving mode is an all wheel drive (AWD) mode. In some examples, the controller is configured to determine whether the first speed and the second speed are within the threshold percentage by determining whether a difference between the first speed and the second speed is below a speed threshold. In some variations, the at least one sensor comprises a wheel speed sensor, and wherein the first speed is a first wheel speed for the first ground-engaging member and the second speed is a second wheel speed for the second ground-engaging member. In some instances, the first ground-engaging member is a front ground-engaging member and the second ground-engaging member is a rear ground-engaging member. In some examples, the at least one sensor comprises an axle speed sensor, and wherein the first speed is a first axle speed for the front ground-engaging member and the second speed is a second axle speed for the rear ground-engaging member.

In some variations, the controller is configured to determine whether the first speed corresponding to the first ground-engaging member and the second speed corresponding to the second ground-engaging member are within a threshold percentage of each other by determining, based on the sensor information, whether the vehicle is encountering an event. In some instances, the event is a direction change event. In some examples, the direction change event is a cornering event, a rock crawling event, or a hill sliding event. In some variations, the event is an airborne event and/or a speed change event. In some instances, the speed change event is a braking event, an acceleration event, or a deceleration event. In some examples, the controller is further configured to determine, based on the sensor information, an amount of time elapsed since the event and provide the one or more commands to transition the all-terrain vehicle into the second driving mode based on determining whether the amount of time elapsed is greater than a time threshold.

In some embodiments, an all terrain vehicle comprises a frame and a plurality of ground-engaging members supporting the frame. Each of the plurality of ground-engaging members is configured to rotate about an axle. The all terrain vehicle further comprises a powertrain assembly supported by the frame, at least one sensor configured to provide sensor information, and a controller operatively coupled to the at least one sensor. The controller is configured to receive, from the at least one sensor, the sensor information indicating event information, determine, based on the event information, whether the vehicle is encountering an event, and based on determining the vehicle is not encountering the event, provide one or more commands to transition the all-terrain vehicle into an all wheel drive (AWD) mode.

In some instances, the event is a direction change event. In some examples, the event is an airborne event. In some variations, the event is a speed change event. In some instances, the controller is further configured to determine, based on the event information, an amount of time elapsed since the event and provide the one or more commands to transition the all-terrain vehicle into the AWD mode based on determining the amount of time elapsed is greater than a time threshold.

In some embodiments, an all terrain vehicle comprises a frame and a plurality of ground-engaging members supporting the frame. Each of the plurality of ground-engaging members is configured to rotate about an axle. The all terrain vehicle further comprises a powertrain assembly supported by the frame, one or more sensors, and a braking system comprising a HECU operatively coupled to the plurality of ground-engaging members. The HECU is configured to receive sensor information from the one or more sensors, determine whether the all terrain vehicle is encountering a wheel locking event based on the sensor information, wherein the wheel locking event indicates the plurality of ground-engaging members are unable to turn, determine whether the all terrain vehicle is encountering a turning event based on the sensor information, operate in an HECU intervention mode based on an indication that the all terrain vehicle is encountering the wheel locking event and the turning event, wherein the HECU intervention mode permits the HECU to control the plurality of ground-engaging members based on steering input.

In some instances, the HECU is configured to operate in a non-HECU intervention mode based on an indication that the all terrain vehicle is encountering the wheel locking event and not encountering the turning event, wherein the HECU is unable to control the plurality of ground-engaging members based on the steering input in the non-HECU intervention mode. In some examples, the HECU determines whether the all terrain vehicle is encountering the wheel locking event based on determining, based on the sensor information, whether brakes have been applied and determining, based on the sensor information, whether a reference vehicle speed is greater than a threshold. In some variations, the sensor information indicates an inertial measurement unit (IMU) measurement and one or more ground-engaging member speeds. The HECU is configured to determine reference vehicle speed based on the wheels speeds and the IMU measurement.

In some instances, the sensor information indicates a steering measurement. The HECU determines whether the all terrain vehicle is encountering the turning event based on determining a user intent to turn the vehicle based on comparing the steering measurement with a steering measurement threshold. In some examples, the sensor information indicates an IMU measurement. The HECU determines whether the all terrain vehicle is encountering the turning event based on determining a change of direction of the all terrain vehicle based on the IMU measurement. In some variations, the HECU is configured to determine a detected terrain the all terrain vehicle is traversing based on the sensor information and operate in the HECU intervention mode based on the detected terrain. In some instances, the sensor information indicates a plurality of IMU measurements over a period of time, and the determining the detected terrain is based on the HECU performing signal processing on the plurality of IMU measurements over the period of time.

In some embodiments, an all terrain vehicle comprises a frame and a plurality of ground-engaging members supporting the frame. Each of the plurality of ground-engaging members is configured to rotate about an axle. The plurality of ground-engaging members comprises a first ground engaging member and a second ground engaging member. The all terrain vehicle further comprises a powertrain assembly supported by the frame, at least one sensor configured to provide sensor information, and a controller operatively coupled to the at least one sensor. The controller is configured to receive user input indicating to activate a differential lock for the plurality of ground-engaging members, receive, from the at least one sensor, the sensor information, determine, based on the sensor information, whether a first speed corresponding to the first ground-engaging member and a second speed corresponding to the second ground-engaging member are within a threshold percentage of each other, and in response to determining the first speed and the second speed are within the threshold percentage of each other, provide one or more commands activate the differential lock.

In some instances, the controller is configured to determine whether the first speed and the second speed are within the threshold percentage by determining whether a difference between the first speed and the second speed is below a speed threshold. In some examples, the at least one sensor comprises a wheel speed sensor. The first speed is a first wheel speed for the first ground-engaging member and the second speed is a second wheel speed for the second ground-engaging member. In some variations, the first ground-engaging member is a front left ground-engaging member and the second ground-engaging member is a front right ground-engaging member. In some instances, the first ground-engaging member is a rear left ground-engaging member and the second ground-engaging member is a rear right ground-engaging member. In some examples, the controller is configured to determine whether the first speed corresponding to the first ground-engaging member and the second speed corresponding to the second ground-engaging member are within a threshold percentage of each other by determining, based on the sensor information, whether the vehicle is encountering an event. In some variations, the event is a direction change event, a cornering event, a rock crawling event, a hill sliding event, a speed change event, a braking event, an acceleration event, and/or a deceleration event.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 20 illustrates a plurality of different driving modes and system modes for the all terrain vehicle;

FIG. 26 illustrates a control diagram of the all terrain vehicle inducing an oversteer conditions and/or increasing yaw rate thresholds; and FIG. 27 illustrates a control diagram of the all terrain vehicle operating in an anti-roll back mode.

Figure 1A:
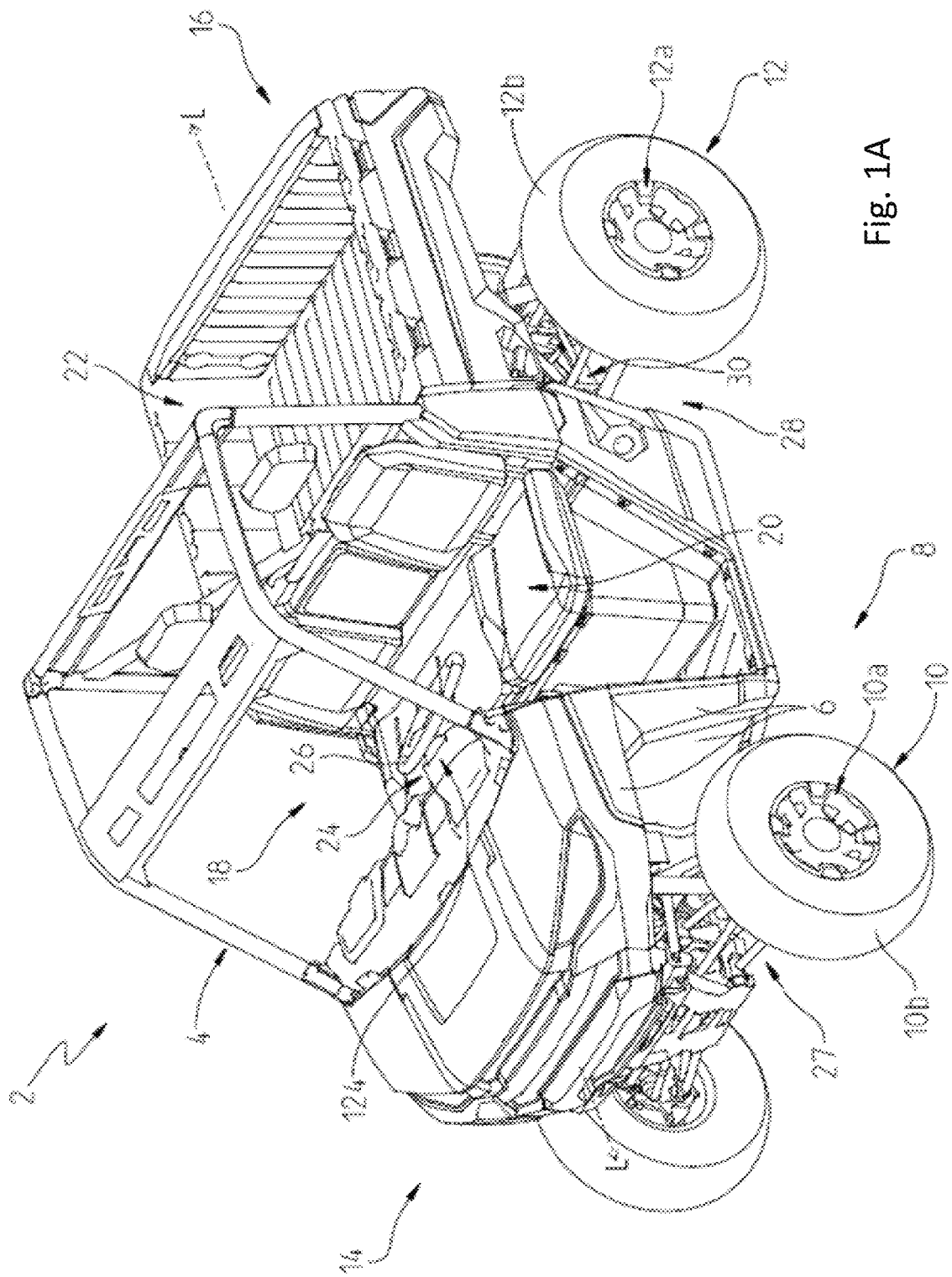
FIG. 1A illustrates a left front perspective view of an all terrain vehicle of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Figure 1B:
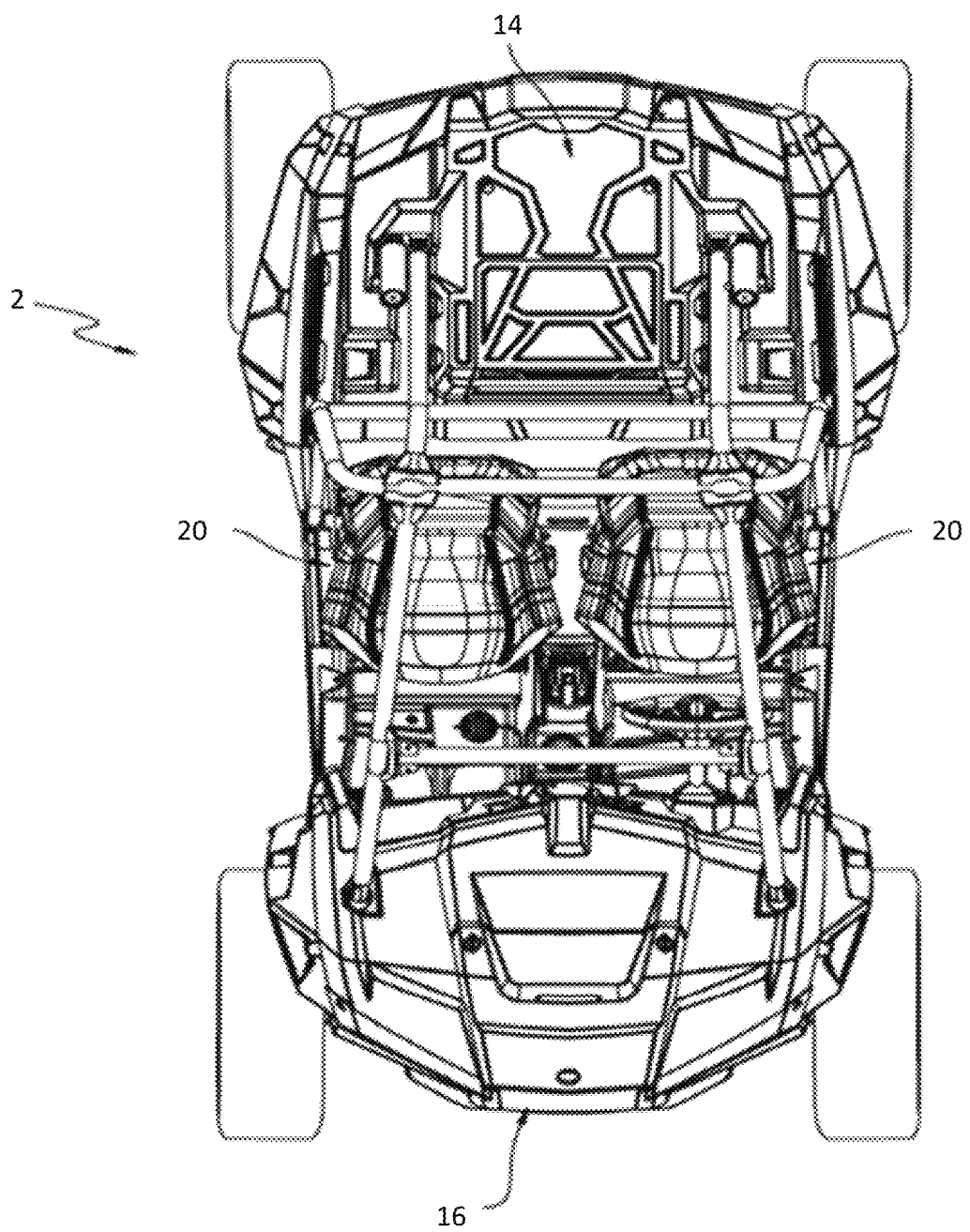
FIG. 1B illustrates a top view of another exemplary all terrain vehicle for use with a braking system disclosed herein.

As shown in FIG. 1, an all terrain vehicle 2 is disclosed and configured for off-road vehicle applications, such that all terrain vehicle 2 is configured to traverse trails and other off-road terrain. Additional details regarding vehicle 2 are provided in U.S. patent application Ser. No. 14/051,700, filed Oct. 11, 2013, titled SIDE-BY-SIDE VEHICLE, the entire disclosure of which is expressly incorporated by reference herein. Additionally, the systems and methodologies described herein are applicable and, in embodiments, may be incorporated into various other all terrain vehicles including the side-by-side all terrain vehicle disclosed in U.S. patent application Ser. No. 14/051,700, filed Oct. 11, 2013, titled SIDE-BY-SIDE VEHICLE, the entire disclosure of which is expressly incorporated by reference herein. Further, the systems and methodologies described herein are applicable and, in embodiments, may be incorporated into the including the side-by-side all terrain vehicle disclosed in U.S. patent application Ser. No. 15/790,691, filed Oct. 23, 2017, titled SIDE-BY-SIDE VEHICLE, the entire disclosure of which is expressly incorporated by reference herein.

Referring to FIG. 1, all terrain vehicle 2 includes a frame assembly 4 which supports a plurality of body panels 6 and is supported on a ground surface by a plurality of ground-engaging members 8. Illustratively, ground-engaging members 8 include front ground-engaging members 10 and rear ground-engaging members 12. In one embodiment of vehicle 2, each of front ground-engaging members 10 may include a wheel assembly 10a and a tire 10b supported thereon. Similarly, each of rear ground-engaging members 12 may include a wheel assembly 12a and a tire 12b supported thereon. A front suspension assembly 27 may be operably coupled to front ground-engaging members 10 and a rear suspension assembly 28 may be operably coupled to rear ground-engaging members 12.

Referring still to FIG. 1, all terrain vehicle 2 extends between a front end portion 14 and a rear end portion 16 along a longitudinal axis L and supports an operator area 18 there between. Operator area 18 includes seating 20 for at least the operator and also may support one or more passengers. In one embodiment, seating 20 includes side-by-side bucket-type seats while, in another embodiment, seating 20 includes a bench-type seat. A cargo area 22 is positioned rearward of operator area 18 and is supported by frame assembly 4 at rear end portion 16.

Figure 2:
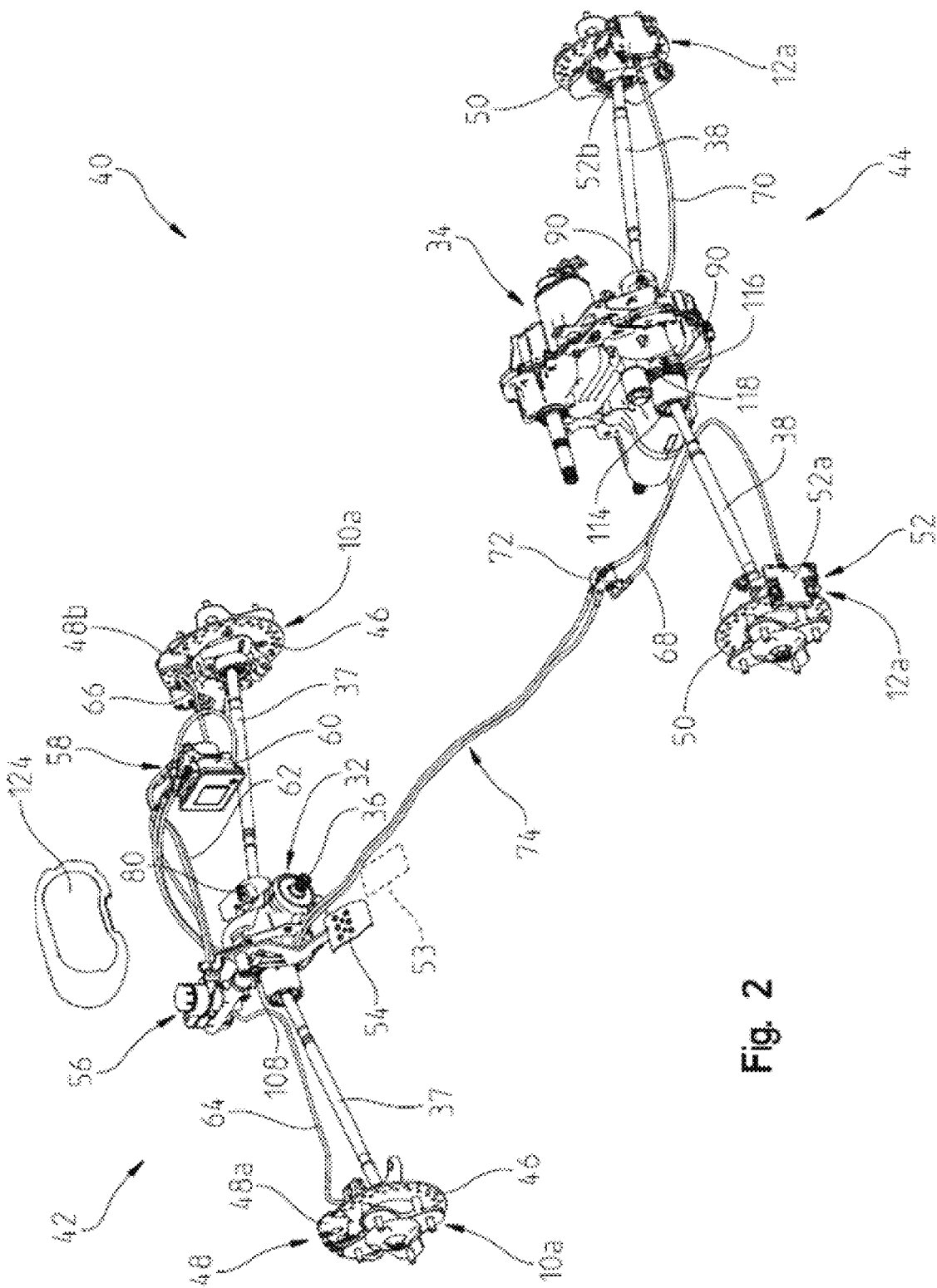
FIG. 2 illustrates a left rear perspective view of a braking assembly of the all terrain vehicle of FIG. 1.

As shown in FIG. 1, operator area 18 includes operator controls 24, such as steering assembly 26, which may be operably coupled to one or more of ground-engaging members 8. Additional operator controls 24 may include other inputs for controlling operation of vehicle 2, as disclosed further herein, such as an accelerator member or pedal 53 and a brake member or pedal 54 (FIG. 2). More particularly, various operator controls 24 may affect operation of a powertrain assembly 30 of vehicle 2. Powertrain assembly 30 may be supported by rear end portion 16 of vehicle 2 and includes an engine (not shown), a transmission (not shown) operably coupled to the engine, a front final drive member 32 (FIG. 2) operably coupled to front ground-engaging members 10 through front half shafts or axles 37, and a rear final drive member 34 (FIG. 2) operably coupled to rear ground-engaging members 12 through rear half shafts or axles 38. Additionally, the transmission of powertrain assembly 30 may include a continuously variable transmission ("CVT") alone, a shiftable transmission alone, or a combination of a CVT and shiftable transmission. Exemplary powertrain assemblies are disclosed in U.S. patent application Ser. No. 14/051,700, filed Oct. 11, 2013, titled SIDE-BY-SIDE VEHICLE, and U.S. patent application Ser. No. 15/790,691, filed Oct. 23, 2017, titled SIDE-BY-SIDE VEHICLE, the entire disclosures of which are expressly incorporated by reference herein. A drive shaft (not shown) may be operably coupled to front final drive member 32 at an input 36 (FIG. 2) for supplying motive power from the engine and/or transmission to front ground-engaging members 10. Rear final drive member 34 is operably coupled the engine and/or transmission to supply power therefrom to rear ground-engaging members 12.

FIG. 1 illustrates one embodiment of an exemplary off-road vehicle. However, in some embodiments, the all terrain vehicle 2 may be extended along the longitudinal axis L and/or retracted along the longitudinal axis L, allowing the all terrain vehicle 2 to be larger and/or smaller than the exemplary off-road vehicle 2 shown in FIG. 1. For instance, the all terrain vehicle 2 may include two or more rows of seating 20, which may extend the all terrain vehicle 2 along the longitudinal axis L. Additionally, and/or alternatively, in some embodiments, the cargo area 22 may be larger—allowing a user to store more cargo in the all terrain vehicle 2. Additionally, and/or alternatively, in some embodiments, the all terrain vehicle 2 may be wider than the embodiment shown in FIG. 1. For example, the seating 20 might not be side-by-side bucket-type seats. Instead, the seating 20 may include three or more seats that are side-by-side. The present disclosure encompasses the exemplary embodiment shown in FIG. 1, along with all other exemplary embodiments of off-road vehicles, such as the example shown in FIG. 1A.

Figure 3:
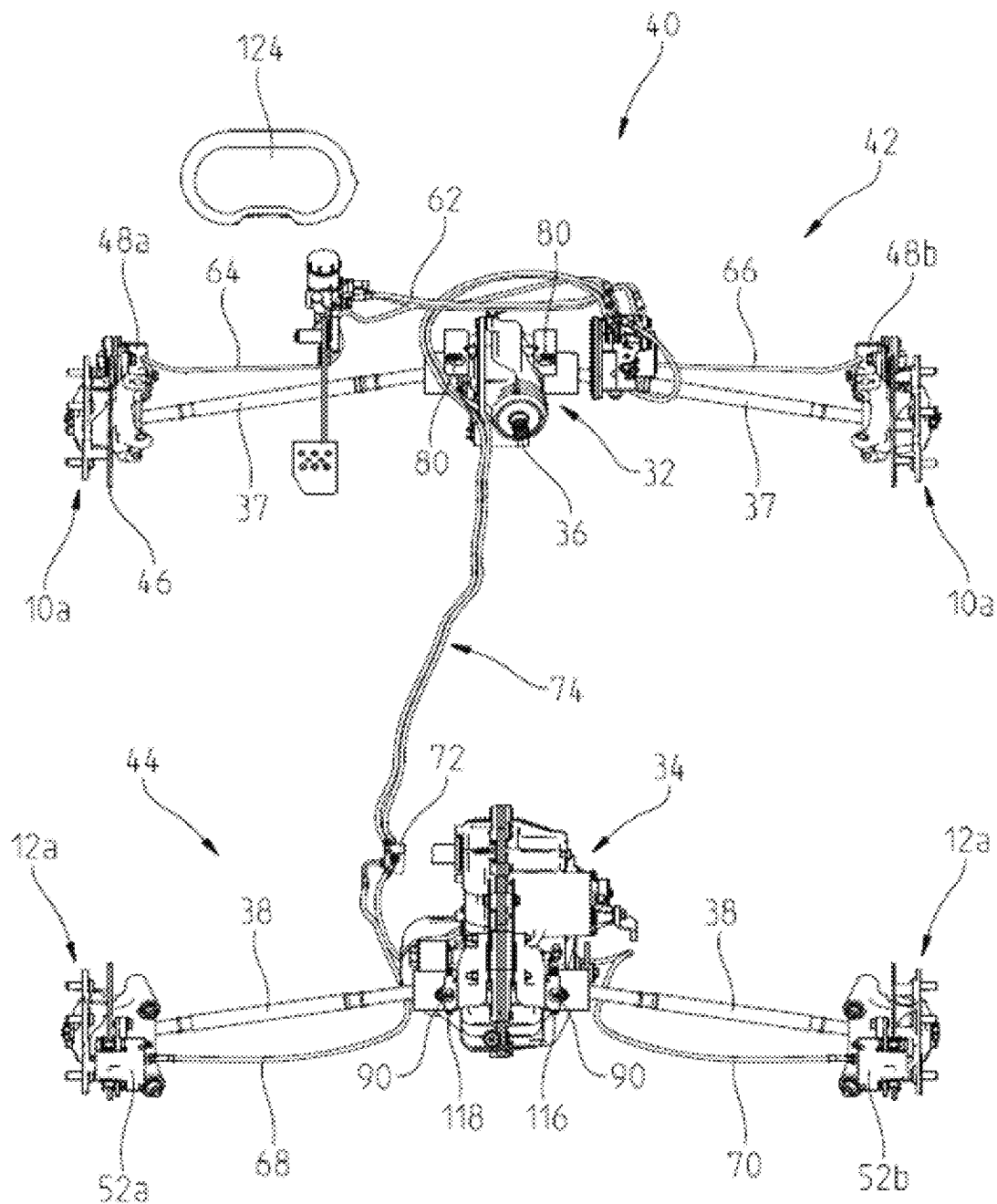
FIG. 3 illustrates a rear perspective view of the braking assembly of FIG. 2.
Figure 4:
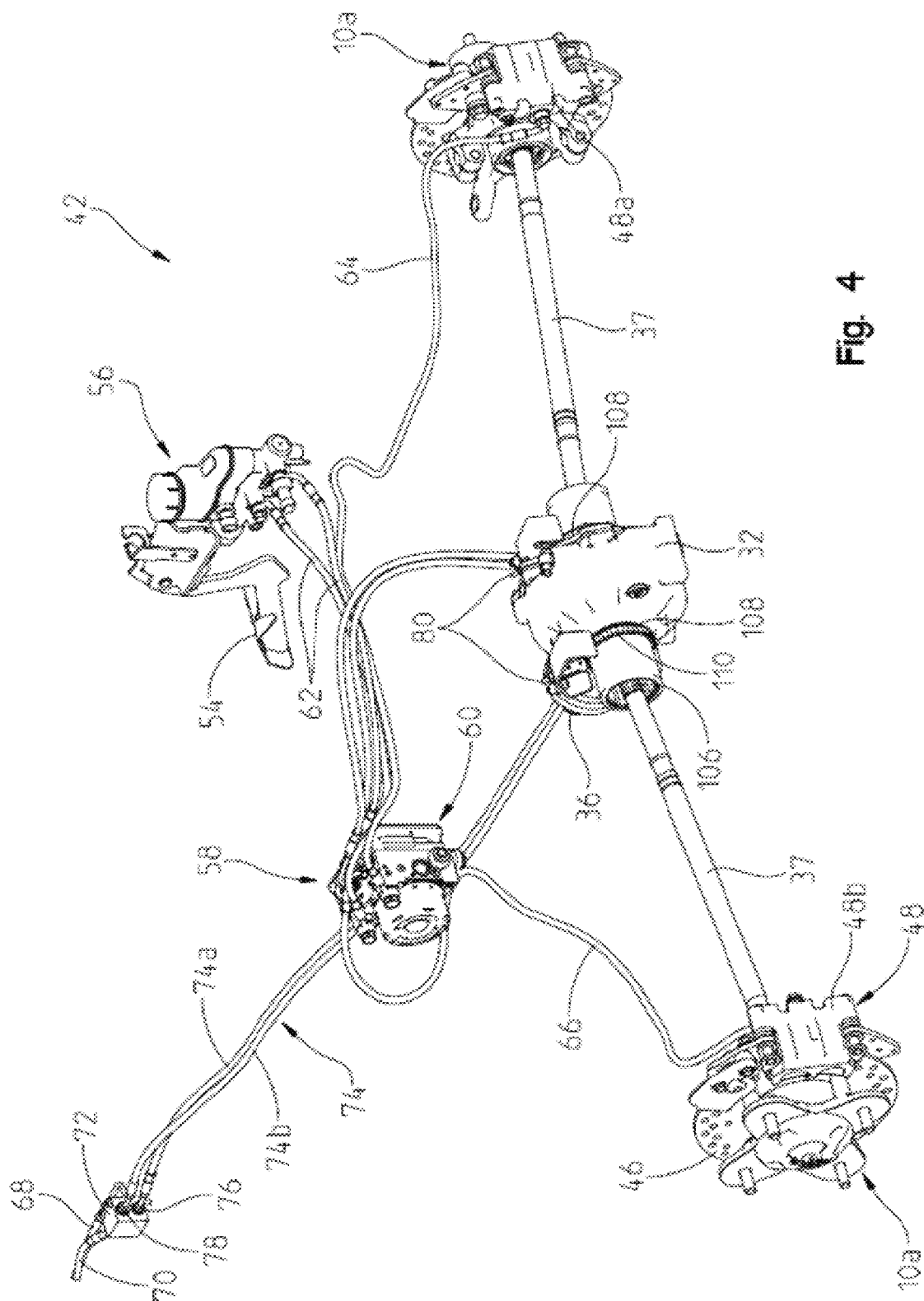
FIG. 4 illustrates a right front perspective view of a front portion of the braking assembly of FIG. 2.

Referring to FIGS. 2-4, vehicle 2 includes a braking assembly 40, illustratively an anti-lock braking system ("ABS"), which includes a front end braking portion 42 positioned generally at front end portion 14 of vehicle 2 and is operably coupled to front ground-engaging members 10 and a rear end braking portion 44 positioned generally at rear end portion 16 of vehicle 2 and is operably coupled to rear ground-engaging members 12. Front end braking portion 42 includes front brake discs 46 and front brake calipers 48 operably coupled to front wheel assemblies 10a. Rear end braking portion 44 includes rear brake discs 50 and rear brake calipers 52 operably coupled to rear wheel assemblies 12a.

As shown in FIGS. 2-4, braking assembly 40 also includes brake member 54, illustratively a brake pedal, positioned within operator area 18 and is defined as one of the operator controls 24 (FIG. 1). Brake member 54 is operably coupled to a brake master cylinder 56 such that braking input from the operator of vehicle 2 is applied to brake member 54 and is transmitted to brake master cylinder 56.

Referring still to FIGS. 2-4, brake master cylinder 56 is operably coupled to a braking control system 58 which includes a hydraulic and electric controller unit (HECU) 60. More particularly, brake master cylinder 56 is fluidly coupled to HECU 60 through conduit(s) or line(s) 62. Illustratively, HECU 60 may be hydraulically actuated such that pressurized hydraulic fluid is configured to assist with the operation of braking assembly 40.

Figure 10:
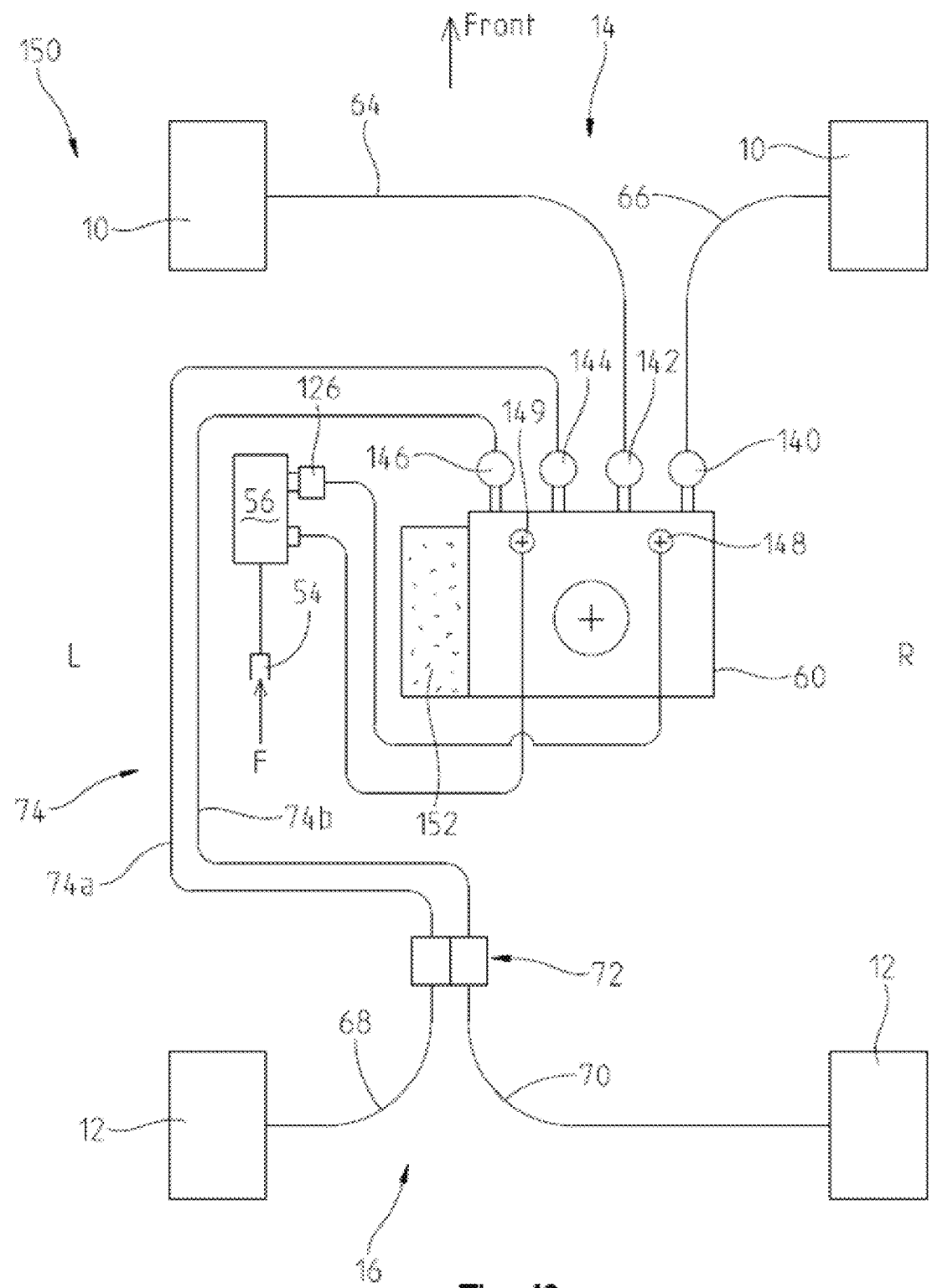
FIG. 10 illustrates a schematic view of a hydraulic circuit of the braking assembly of FIG. 2.

HECU 60 also is fluidly coupled with brake calipers 48, 52. Illustratively, as shown in FIGS. 2-4, braking assembly 40 further includes a front left conduit or line 64, a front right conduit or line 66, a rear left conduit or line 68, and a rear right conduit or line 70 which are all fluidly coupled to HECU 60 through four channels, namely a front left channel 140, a front right channel 142, a rear left channel 144, and a rear right channel 146, respectively (FIG. 10). In this way, front left conduit 64 fluidly couples front left brake caliper 48a with HECU 60, front right conduit 66 fluidly couples front right brake caliper 48b with HECU 60, rear left conduit 68 fluidly couples rear left brake caliper 52a with HECU 60, and rear right conduit 70 fluidly couples rear right brake caliper 52b with HECU 60. HECU 60 also may include a front master cylinder output 148 and a rear master cylinder output 149, both of which are operably coupled to brake master cylinder 56 (FIG. 10), as disclosed herein.

Referring to FIGS. 2-5, with respect to rear end braking portion 44, conduits 68, 70 are fluidly coupled to HECU 60 through a junction member or box 72. Illustratively, at least one junction conduit or line 74 (illustratively first and second junction conduits 74a, 74b) extends from HECU 60 to junction member 72 such that HECU 60 is fluidly coupled with rear brake calipers 52a, 52b through junction conduit 74, junction member 72, and respective rear left and right conduits 68, 70.

Figure 5:
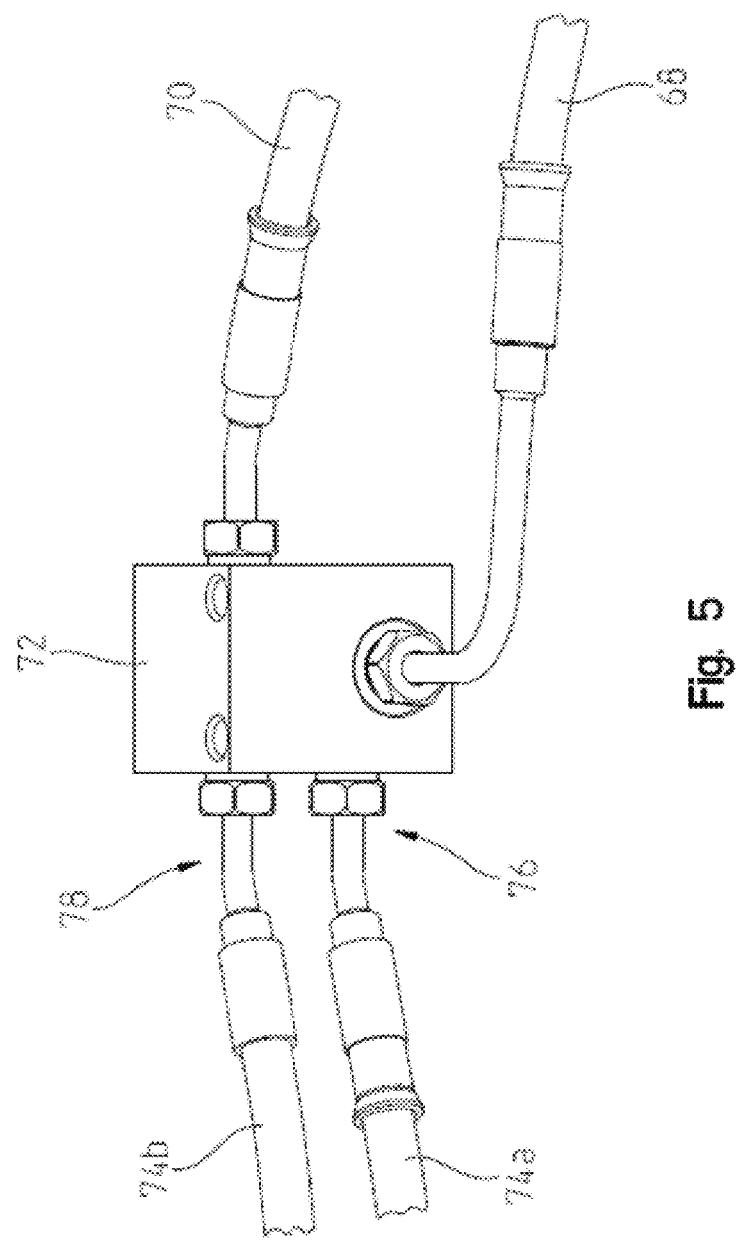
FIG. 5 illustrates a junction member of the braking assembly of FIG. 2.

As shown best in FIG. 5, junction member 72 includes a first input 76 fluidly coupled to rear left conduit 68 through first junction conduit 74a and a second input 78 fluidly coupled to rear right conduit 70 through second junction conduit 74b. Junction member 72 facilitates serviceability of braking assembly 40 because if a repair or replacement is needed to rear end braking portion 44, then the repair or replacement may be made at the location of junction member 72, rather than having to fully disassemble all of braking assembly 40 for a repair to only a portion thereof. Additionally, junction member 72 is provided to allow for different braking pressures to be transmitted to rear brake calipers 52a, 52b. For example, a first braking pressure may be provided to rear brake caliper 52a through first junction conduit 74a and rear left conduit 68 while a greater or lesser braking pressure may be provided rear brake caliper 52b through second junction conduit 74b and rear right conduit 70.

Figure 6:
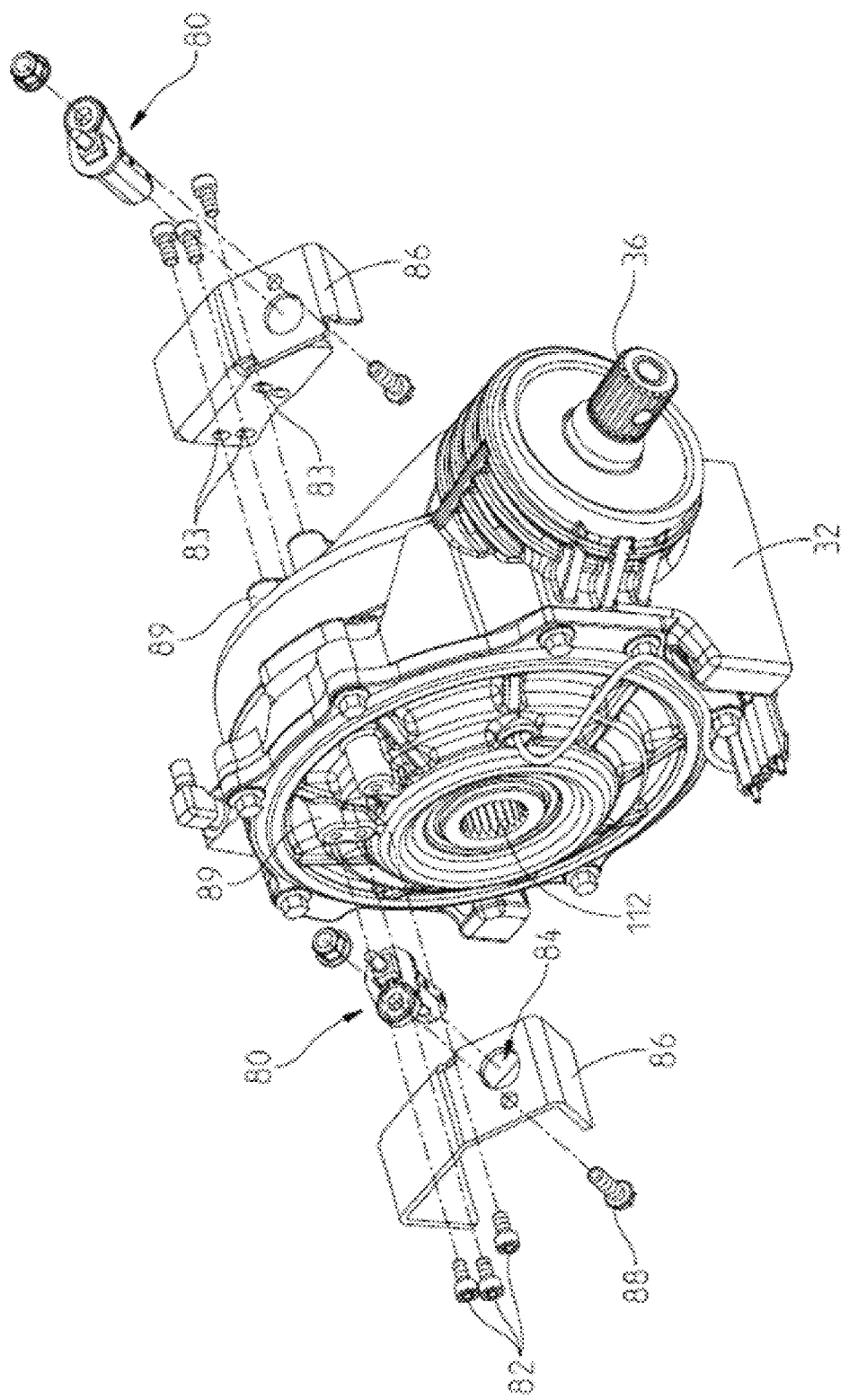
FIG. 6 illustrates a left rear perspective view of a front drive member of the all terrain vehicle of FIG. 1.

Referring now to FIG. 6, braking control system 58 further includes front wheel speed sensors 80 configured to determine the rotational speed of front ground-engaging members 10 (FIG. 1). Illustratively, each of front ground-engaging members 10 includes an individual wheel speed sensor 80. In one embodiment, wheel speed sensor 80 is coupled to a portion of front final drive member 32 through fasteners 82. As shown in FIG. 6, wheel speed sensor 80 is received through an aperture 84 of a mounting bracket 86. Mounting bracket 86 is coupled to a lateral portion of front final drive member 32 with fasteners 82 which are received within mounting bores 89 on the lateral portions of front final drive member 32. More particularly, fasteners 82 are received within openings 83 on bracket 86, which have an oval or oblong shape, thereby allowing the position of bracket 86 and sensor 80 to be adjustable relative to axle 37. Additional fasteners or couplers 88 are configured to removably couple sensor 80 on mounting bracket 86. It may be appreciated that sensor 80 is generally surrounded by mounting bracket 86 such that mounting bracket 86 conceals at least a portion of sensor 80 from debris and/or objects that may travel towards sensor 80 when vehicle 2 is moving, thereby minimizing damage to sensor 80 during operation of vehicle 2.

As shown best in FIG. 4, each of front half shafts 37 includes a drive coupling with a splined shaft 106. Splined shaft 106 may couple with an output 112 (FIG. 6) of front final drive member 32. Additionally, a gear ring 108 is positioned on the outer surface of each of the drive couplings and is held in position relative to half shafts 37. As such, gear ring 108 is configured to rotate with its corresponding half shaft 37. Each of gear rings 108 includes a plurality of teeth 110 which cooperate with sensor 80 to determine the speed of each half shaft 37. Sensors 80 are positioned in proximity to teeth 110 but do not contact teeth 110; rather sensors 80 count teeth 110 as teeth 110 pass sensor 80 over a specific time period to calculate an angular velocity. Sensors 80 may be speed sensors such as Hall Effect speed sensors.

Figure 7:
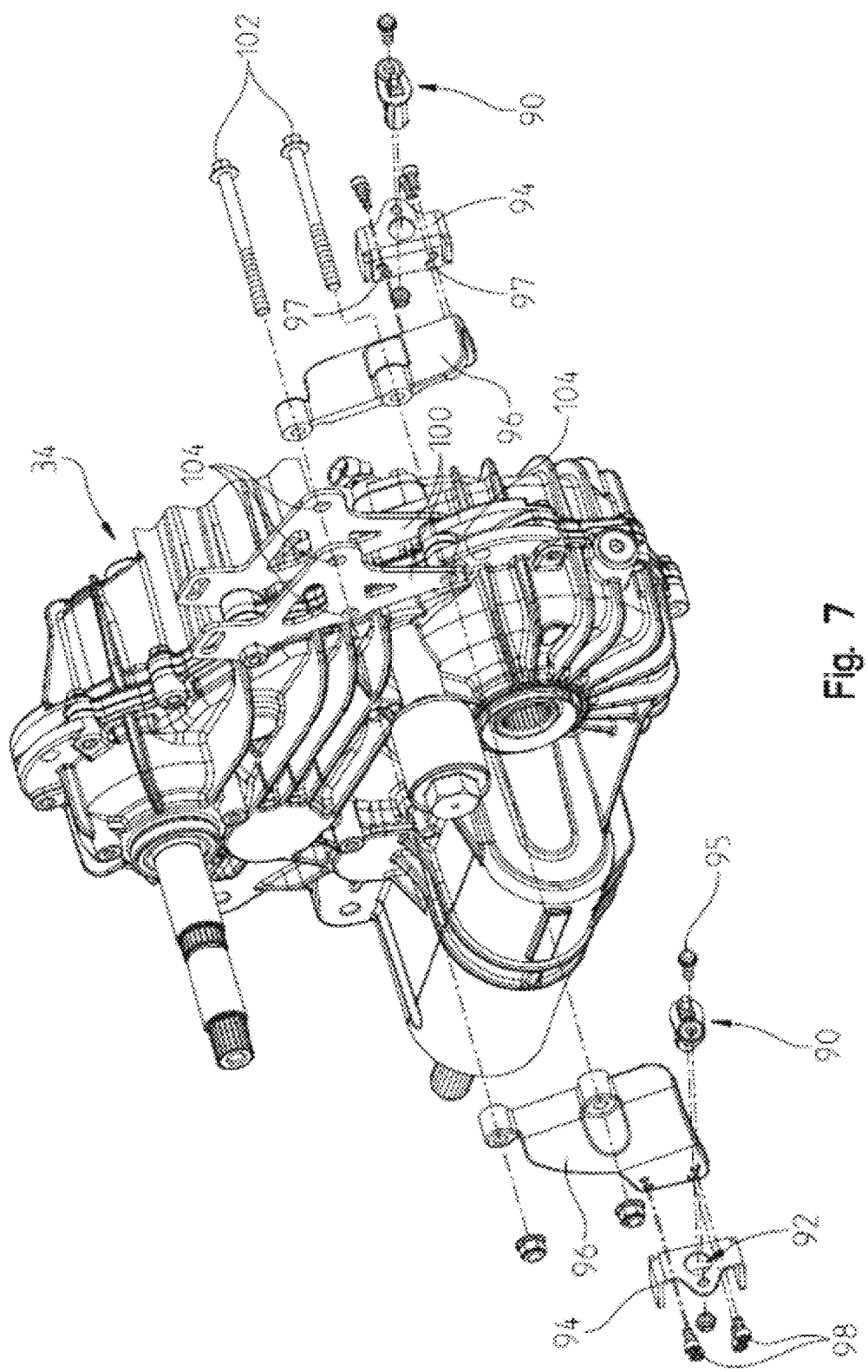
FIG. 7 illustrates a left rear perspective view of a rear drive member of the all terrain vehicle of FIG. 1.

Referring to FIG. 7, braking control system 58 also includes rear wheel speed sensors 90 configured to determine the rotational speed of rear ground-engaging members 12 (FIG. 1). Illustratively, each of rear ground-engaging members 12 includes an individual wheel speed sensor 90. In one embodiment, wheel speed sensor 90 is coupled to a portion of rear final drive member 34. As shown in FIG. 7, wheel speed sensor 90 is received through an aperture 92 of a first mounting bracket 94 and is coupled to first mounting bracket 94 with fasteners 95. It may be appreciated that sensor 90 is generally surrounded by first mounting bracket 94 such that mounting bracket 94 conceals at least a portion of sensor 90 from debris and/or objects that may travel towards sensor 90 when vehicle 2 is moving, thereby minimizing damage to sensor 90 during operation of vehicle 2.

First mounting bracket 94 is coupled to a second mounting bracket 96 through fasteners 98. More particularly, fasteners 98 are received within openings 97 on first mounting bracket 94, which have an oval or oblong shape, thereby allowing the position of first mounting bracket 94 and sensor 90 to be adjustable relative to axle 38. And, second mounting bracket 96 is coupled to retainer members 100 on lateral portions of rear final drive member 34. Additional fasteners or couplers 102 are configured to removably couple second mounting bracket 96 to retainers 100 because fasteners 102 are received through apertures 104 of retainers 100. It may be appreciated that retainers 100 include a plurality of apertures 104 such that fasteners 102 can be received through any of apertures 104 to adjust the position of second mounting bracket 96 relative to axle 38, thereby also allowing for the position of sensor 90 to be adjustable relative to axle 38.

As shown best in FIGS. 2 and 3, each of rear half shafts 38 includes a drive coupling with a splined shaft 114 (FIG. 3). Splined shaft 114 couples with an output (not shown) of rear final drive member 34. Additionally, a gear ring 116 is positioned on the outer surface of each of the rear drive couplings and is held in position relative to its corresponding rear half shaft 38. As such, gear ring 116 is configured to rotate with its corresponding rear half shaft 38. Each of gear rings 116 includes a plurality of teeth 118 which cooperate with sensor 90 to determine the speed of each rear half shaft 38. Sensors 90 are positioned in proximity to teeth 118 but do not contact teeth 118; rather sensors 90 count teeth 118 as teeth 118 pass sensor 90 over a specific time period to calculate an angular velocity. Sensors 90 may be speed sensors such as Hall Effect speed sensors.

Figure 8:
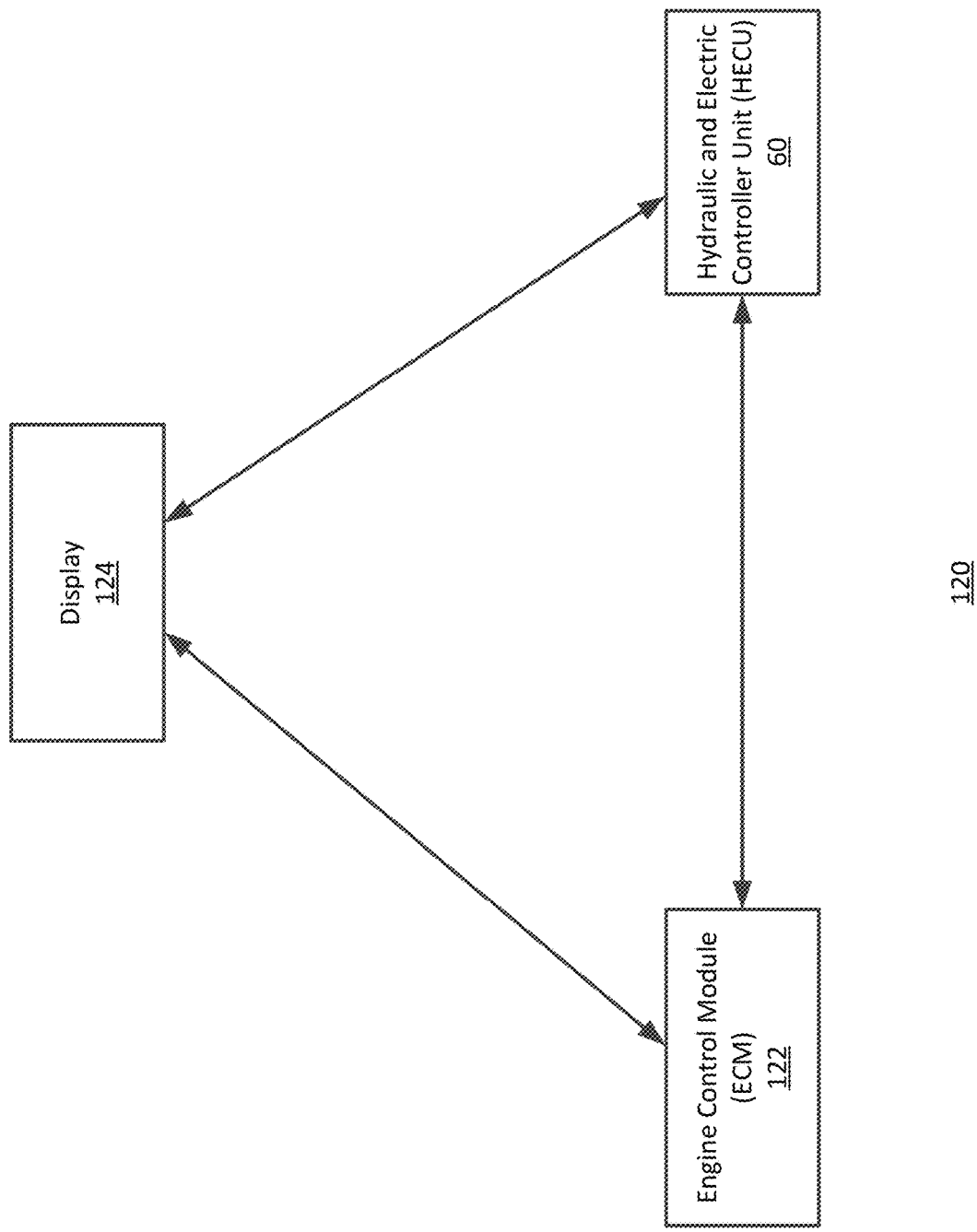
FIG. 8 illustrates a schematic view of a portion of an electrical system of the all terrain vehicle of FIG. 1.

Referring to FIG. 8, the HECU 60 is electronically coupled or integrated with an overall electrical system 120 of vehicle 2. In some embodiments, the HECU 60 may provide electronic control of the various components of vehicle 2. Further, the HECU 60 is operatively coupled to a plurality of vehicle sensors and/or devices (described below in FIG. 11) that monitor various parameters of vehicle 2 or the environment surrounding vehicle 2. The HECU 60 performs certain operations to control one or more subsystems of other vehicle components, such as the operation of the braking assembly 40. For example, referring back to FIG. 2, the HECU 60 may be configured to hydraulically actuate the ABS system to assist with the operation of the braking assembly 40 (e.g., transfer and/or displace hydraulic fluid to one or more brake calipers, such as brake calipers 48*a*, 48*b*, 52*a*, and/or 52*b*, to cause the one or more ground-engaging members 10 or 12 to brake). In some examples, instead of an ABS system, the vehicle 2 may include a non-ABS type of braking system. The HECU 60 may be configured to control any type of braking system that permits the vehicle 2 to control the brake pressure on one or more ground-engaging members 10 or 12 as needed without a driver depressing/actuating a brake member, such as brake pedal 54. In other words, the HECU 60 may be configured to perform any of the processing sequences below, such as processing sequences 300-1200, for any type of braking system that permits the vehicle 2 to control (e.g., apply and/or remove) brake pressure to the ground engaging members 10 and/or 12 independent of the driver input indicating a braking event (e.g., applying brake pressure without needing a driver to depress the brake pedal 54). The HECU 60 may determine the braking event based on actuation of the brake member 54 (e.g., a brake pedal). In some instances, the HECU 60 may be configured to operate in an HECU intervention mode (e.g., an anti-lock brake system (ABS) mode and/or an electronic stability control (ESC) mode). For example, in some variations, when operating in the ABS mode, the HECU 60 may be configured to reduce brake pressure to one or more of the ground engaging members 10, 12. In other variations, when operating in the ESC mode, the HECU 60 may be configured to control (e.g., reduce, maintain, and/or increase) brake pressure to one or more of the ground engaging members 10, 12. The HECU 60, the processing sequences 300-1200, and the braking event are described in more detail below.

In some embodiments, the HECU 60 forms a portion of a processing subsystem including one or more computing devices having memory, processing, and communication hardware. The HECU 60 may be a single device (e.g., controller) or a distributed device, and the functions of the HECU 60 may be performed by hardware and/or as computer instructions on a non-transitory computer readable storage medium.

Electrical system 120 of vehicle 2 may include an engine control module ("ECM") 122 and at least one display, gauge, and/or user interface 124. Display 124 is supported within operator area 18 (FIG. 1) and is configured to provide information about vehicle 2 to the operator. In one embodiment, HECU 60 may communicate with the display 124 such that the operator may provide a user input or user selection through display 124. Illustrative display 124 may include toggle switches, buttons, a touchscreen, or any other type of surface or member configured to receive and transmit a selection made by the user. For instance, the user may activate and/or toggle a button on the display 124. The display 124 may transmit a signal to the HECU 60 indicating the button has been actuated. Based on the particular button, the HECU 60 may generate one or more commands for the braking assembly 40 (e.g., displacing hydraulic fluid to one or more brake calipers 48*a*, 48*b*, 52*a*, and/or 52*b*) based on the actuation of the user input and/or on the actuation of the user input and one or more monitored parameters, such as sensor values.

Additionally, and/or alternatively, HECU 60 is configured to transmit information about braking assembly 40 to display 124 to provide such information to the operator. For example, the HECU 60 may be configured to transmit a fault signal to display 124 to indicate to the operator that a fault has occurred within a portion of braking assembly 40, such as a fault of the ABS feature of braking assembly 40. The fault indicator provided on display 124 may be a light, an alphanumeric code or message, or any other indication configured to alert the user of the fault.

Additionally, and/or alternatively, ECM 122 is in electronic communication with the display 124 and/or the HECU 60 to provide information to the operator and/or controller about the engine (not shown) or other components of powertrain assembly 30. Illustratively, ECM 122 transmits various signals to provide information such as engine speed (RPM), engine torque, engine temperature, oil pressure, the driving gear or mode, and/or any other information about powertrain assembly 30. Additionally, as shown in FIG. 8, display 124 is configured to provide inputs and other information to ECM 122. For example, if illustrative vehicle 2 is configured with an adjustable speed limiting device and feature, the user may input speed limits to display 124 which are transmitted to ECM 122 from display 124 to control the speed of vehicle 2, as disclosed further herein.

Figure 9:
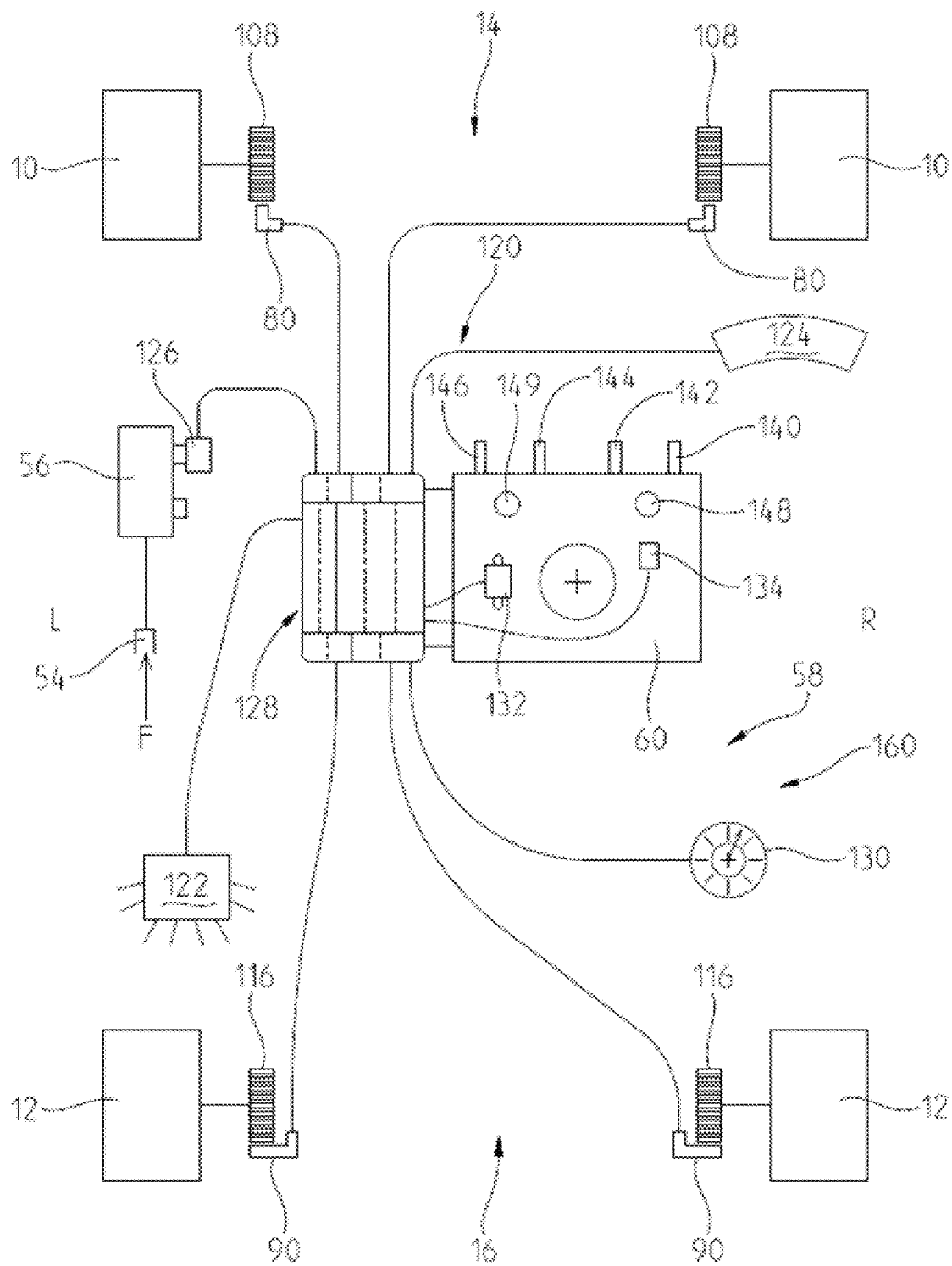
FIG. 9 illustrates a schematic view of an electronic braking circuit of the electrical system of FIG. 8.

Referring to FIG. 9, a schematic view of braking control system 58 and at least a portion of electrical system 120 is disclosed with respect to operation of braking assembly 40. As denoted, front end portion 14 and rear end portion 16 are shown and the left side of vehicle 2 is denoted with "L" and the right side of vehicle 2 is denoted with "R." As shown in FIG. 9, when the operator depresses brake member 54 with a force F, force F is transmitted to brake master cylinder 56, which may be a tandem master cylinder in one embodiment. Brake master cylinder 56 is configured to transmit braking input information to a brake pressure switch 126. Brake pressure switch 126 is then configured to transmit a signal indicative of braking pressure information to a multi-pin connector 128. Multi-pin connector 128 also may be configured to transmit and/or receive information to and from ECM 122, a steering angle sensor 130 of electrical system 120, the display 124, and/or the HECU 60.

HECU 60 may include a multi-axis G sensor 132 and a pressure sensor 134, one or both of which may be internal or external sensors and are configured for communication with multi-pin connector 128. Additionally, multi-pin connector 128 is electrically coupled with front wheel speed sensors 80 and rear wheel speed sensors 90.

Referring now to FIG. 10, a schematic view of a hydraulic system 150 of vehicle 2 is disclosed with respect to operation of braking assembly 40. Hydraulic system 150 includes a hydraulic reservoir 152 fluidly coupled to HECU 60 and also fluidly coupled to junction member 72, and ground-engaging members 10, 12 through any of conduits 64, 66, 68, 70, 74. In operation, as force F is applied to brake member 54 by the operator, brake master cylinder 56 transmits force F to HECU 60 through at least brake pressure switch 126. More particularly, brake master cylinder 56 is in communication with front and rear master cylinder outputs

148, 149 which allows hydraulic fluid from hydraulic fluid reservoir 152 to flow to front and rear ground-engaging members 10, 12 through channels 140, 142, 144, 146.

Illustratively, and still referring to FIG. 10, as force F is applied to brake member 54, brake master cylinder 56 provides an input to front master cylinder output 148 through brake pressure switch 126 to initiate a flow of hydraulic fluid through front left channel 140 and front left conduit 64 to front left ground-engaging member 10. Additionally, the input provided to front master cylinder output 148 through brake pressure switch 126 also initiates a flow of hydraulic fluid through front right channel 142 and front right conduit 66 to front right ground-engaging member 10. With respect to rear ground-engaging members 12, as force F is applied to brake member 54, brake master cylinder 56 provides an input to rear master cylinder output 149 to initiate a flow of hydraulic fluid through rear left channel 144, first junction conduit 74a, junction member 72, and rear left conduit 68 to rear left ground-engaging member 12. Additionally, the input provided to rear master cylinder output 149 from brake master cylinder 56 also initiates a flow of hydraulic fluid through rear right channel 146, second junction conduit 74b, junction member 72, and rear right conduit 70 to rear right ground-engaging member 12. In this way, a single actuation of braking assembly 40 when the operator depresses brake member 54 allows for braking of all ground-engaging members 10, 12 through the four channels 140, 142, 144, 146 of HECU 60. It may be appreciated that, in certain modes, the HECU 60 may control the flow of hydraulic fluid to any of the brake calipers 48 or 52. For example, as described below, the HECU 60 may initiate a flow to one or more brake calipers of the vehicle 2. For instance, to allow for greater turning radiuses, the HECU 60 may slow down the inner rear ground-engaging member 12a (e.g., initiate flow of hydraulic fluid to only 52a) while maintaining the speed of the outer rear ground-engaging member 12b. By slowing down the inner rear ground-engaging member 12a, the HECU 60 may cause the vehicle 2 to achieve greater turning radiuses.

Figure 11:
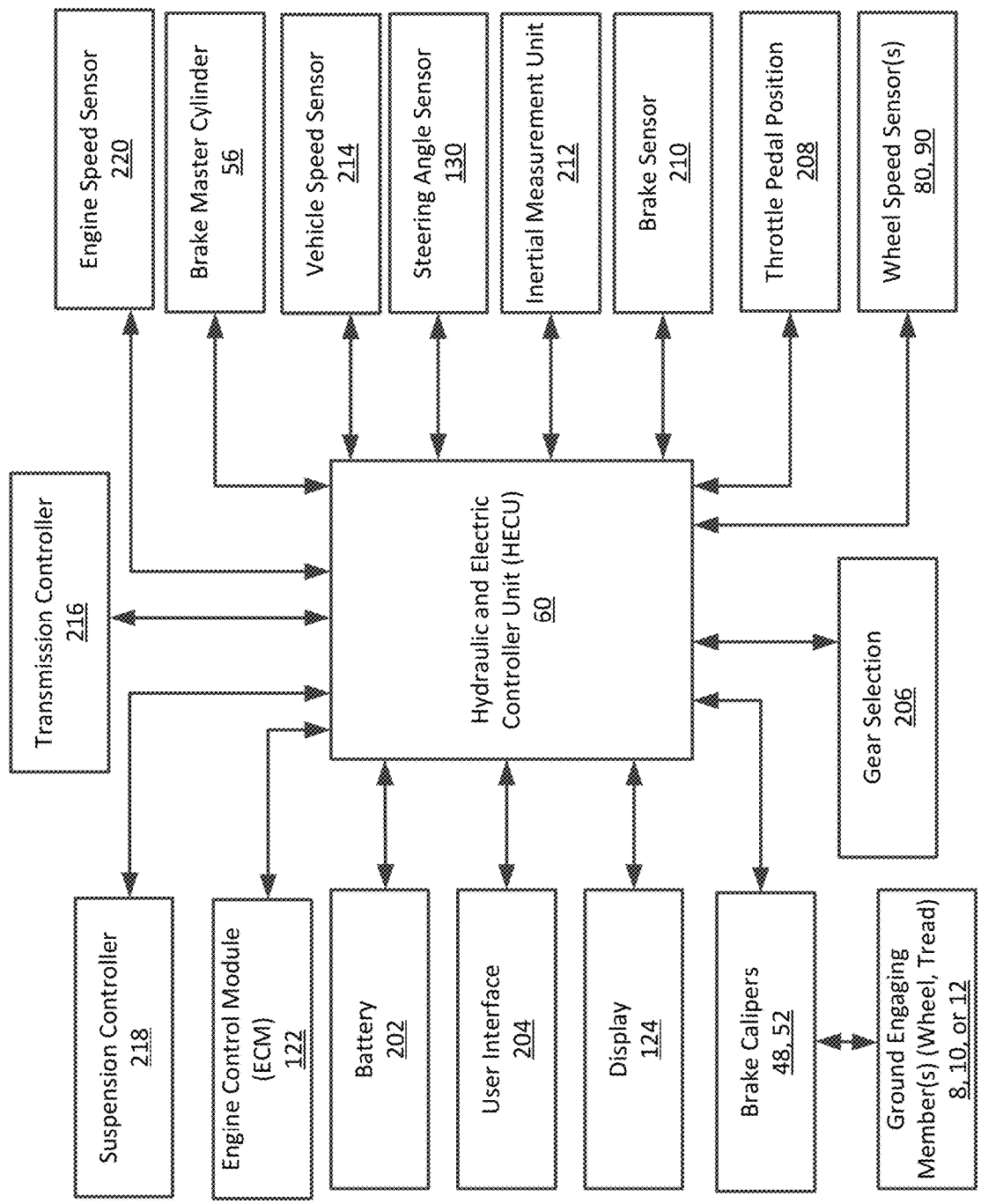
FIG. 11 illustrates a representative view of components of a vehicle of the present disclosure having an ABS system with a plurality of sensors, devices, and/or sub-systems integrated with a control unit of the vehicle.

Referring now to FIG. 11, the HECU 60 may be connected to a plurality of devices, sensors, and/or sub-systems of vehicle 2. In an illustrated embodiment of the present disclosure, the HECU 60 is connected and/or in communication with a plurality of devices, sensors, and/or sub-systems such as the ECM 122, the battery 202, the user interface 204, the display 124, the brake calipers 48, 52, the gear selection 206, the wheel speed sensor(s) 80, 90, the throttle pedal position 208, the brake sensor 210, the inertial measurement unit (IMU) 212, the steering angle sensor 130, the vehicle speed sensor 214, the brake master cylinder 56, the engine speed sensor 220, the suspension controller 218, and/or the transmission controller 216. For example, the HECU 60 may be in electrical communication (e.g., transmits and/or receives information) with the devices, sensors, and/or sub-systems of vehicle 2. The HECU 60 may communicate with the sensors, devices, and/or sub-systems via a bus (e.g., a data bus) and/or wirelessly. Additionally, and/or alternatively, the HECU 60 may be hydraulically connected to the devices, sensors, and/or sub-systems of vehicle 2. For example, the HECU 60 may be hydraulically and/or electrically connected to the brake master cylinder 56 and/or the brake calipers 48, 52. As mentioned previously, the brake calipers 48 or 52 may be connected to the front ground-engaging member(s) 10 and/or the rear ground-engaging members 12. In embodiments, each of left front, right front, left rear, and right rear ground engaging members have an associated brake caliper controlled by HECU 60. In some instances, the ECM 122 may include one or more controllers and/or units, such as the transmission controller 216, the suspension controller 218, and/or the HECU 60. In other instances, the ECM 122, the transmission controller 216, the suspension controller 218, and/or the HECU 60 may be a collection of controllers. Additionally, and/or alternatively, these controllers/units 60, 218, 216, 122 and/or additional controllers and units may work together to implement and/or perform the logic or blocks described below.

Referring now to the devices, sensors, and/or sub-systems of vehicle 2, a user interface 204 is provided in a location easily accessible to the driver operating the vehicle 2. In some embodiments, the display 124 described above may be integrated with the user interface 204. User interface 204 (e.g., display 124) includes user input devices to allow the driver or a passenger to manually adjust HECU intervention modes described below during and/or before the operation of the vehicle 2.

Exemplary input devices for user interfaces 204 include levers, buttons, switches, soft keys, and other suitable input devices. User interface 204 may also include output devices to communicate information to the operator. Exemplary output devices include lights, displays, audio devices, tactile devices, and other suitable output devices. In another illustrated embodiment, the user input and/or output devices of the user interface 204 may be on a steering wheel, handle bar, and/or other steering control of the vehicle 2.

In some embodiments, the display 124 and the user interface 204 may be separate (e.g., the user interface 204 is mounted adjacent the driver's seat on the dashboard of the vehicle 2 and next to the display 124 shown in FIG. 1). The display 124 may display information related to the HECU intervention modes, and the user interface 204 may include input and output devices as described above.

The transmission controller 216 may control the transmission system of vehicle 2. For example, the transmission controller 216 may transmit information to the HECU 60 such as gear position (e.g., drive, neutral, reverse, and/or park), differential status (e.g., locked, unlocked), and/or wheel torque. The HECU 60, in response to the transmitted information, may generate one or more signals and may transmit them back to the transmission controller 216.

Cutter Brake Mode

FIGS. 12-16 illustrate modes to reduce the turning radius of a vehicle, such as a cutter brake mode and/or an agility control mode, using a braking system such as an ABS system. For example, a vehicle, such as vehicle 2, may reduce the turning radius of the vehicle 2 by generating yaw using the braking assembly 40 (e.g., the ABS system). For instance, when the vehicle 2 executes a turn, the ABS system 40 may slow the inside ground-engaging members 10, 12 of the vehicle 2, which may cause the outside ground-engaging members 10, 12 to speed up relative to the inside ground-engaging members 10, 12. This may cause a mild "skid steer" that may amplify the yaw of the vehicle and reduce the turn radius of the vehicle. Further, as mentioned previously, by using the yaw amplifying mode described below, larger vehicles may be able to reduce their turn radiuses. In other words, the HECU 60 may be configured to generate yaw to reduce a turning radius by applying brake pressure to one or more ground engaging members 10, 12 in response to satisfying one or more criteria. In some instances, the one or more criteria may include receiving information from one or more sensors, devices, and/or sub-systems. FIG. 12A shows an exemplarily flowchart for implementing a yaw amplifying mode.

In operation, as represented by block 302, the HECU 60 receives information (e.g., inputs) from sensors, devices, and/or subsystems. As described above, FIG. 11 shows a plurality of sensors, devices, and/or subsystems that may be connected (e.g., electrically or hydraulically) with the HECU 60. The HECU 60 may receive (e.g., retrieve and/or obtain) information (e.g., data packets and/or signals indicating sensor readings) from the one or more sensors, devices, and/or subsystems in FIG. 11. Then, the process moves to block 304.

As represented by block 304, the HECU 60 determines the information received from the sensors, devices, and/or subsystems. In some instances, the HECU 60 may receive information indicating the yaw rate, the steering angle (e.g., steering wheel angle), the vehicle speed, the cutter mode indication, the differential lock indication, and/or the agility control mode indication.

In some examples, the HECU 60 receives the yaw rate from the inertial measurement unit 212. The inertial measurement unit 212 may be a mechanical and/or electrical sensor or device that measures the conditions of the vehicle 2, such as the angular rate and/or yaw rate of the vehicle 2. Exemplary sensors include accelerometers, gyroscopes, and other suitable sensors. Exemplary sensors and monitoring systems are disclosed in U.S. patent application Ser. No. 15/816,368, filed Nov. 17, 2017, titled VEHICLE HAVING ADJUSTABLE SUSPENSION, the entire disclosure of which is expressly incorporated herein by reference. The yaw rate may indicate a vehicle's (e.g., vehicle 2) angular velocity when executing a turn. The HECU 60 may receive the steering angle (e.g., a steering wheel angle) from the steering angle sensor 130. The steering angle may indicate an angle of the steering wheel for vehicle 2. The HECU 60 may receive the vehicle speed from the vehicle speed sensor 214. The vehicle speed may indicate a speed of the vehicle 2. The HECU 60 may receive the cutter mode indication, the differential lock indication, and/or the agility control mode indication from the display 124 and/or the user interface 204. For example, the display 124 and/or the user interface 204 may include switches, buttons, and/or touchscreens. The user may use the display 124 and/or user interface 204 to select and turn on or off the cutter mode, the agility control mode, and/or the differential lock. Afterwards, the display 124 and/or the user interface 204 may transmit the user input to the HECU 60.

As represented by block 306, the HECU 60 determines whether the differential lock is on. When the differential lock is turned on, the vehicle 2 may lock the front ground-engaging members 10 so that both the front ground-engaging members 10 rotate in unison. Additionally, and/or alternatively, when the differential lock is turned on, the vehicle 2 may lock the rear ground-engaging members 12 so that both the rear ground-engaging members 12 rotate in unison. If the HECU 60 determines that the differential lock is on, then the process moves back to block 302. For example, since the front or rear ground-engaging members 10, 12 rotate in unison, then the HECU 60 might not be able to slow the inside ground-engaging members 10, 12 using the ABS system.

However, if the HECU 60 determines that the differential lock is off, then the process moves to block 308. As represented by block 308, the HECU 60 determines whether the vehicle speed is greater than a threshold, such as a pre-determined or pre-programmed threshold. For example, the HECU 60 may determine whether the vehicle speed is greater than a threshold, such as greater than 10, 15, or 20 miles per hour (MPH). If the vehicle speed is greater than the threshold, then the process moves to block 316. If the vehicle speed is less than the threshold, then the process moves to block 310.

As represented by block 310, the HECU 60 determines whether the steering detection is greater than a threshold, such as a pre-determined threshold. In other words, the HECU 60 determines whether the vehicle 2 is entering a turn, such as a sharp turn. If so, then the process moves to block 312. For example, the HECU 60 may use the information indicating the steering angle to determine whether the steering detection is greater than a pre-determined or pre-programmed threshold. For instance, if the steering angle is maximized or near maximum, then the HECU 60 may determine it is greater than the pre-determined threshold, and the process moves to block 312. If the steering wheel angle is less than the threshold, then the process may return back to block 302. In such instances, the HECU 60 does not turn on the cutter brake mode.

Additionally, and/or alternatively, in some instances, the HECU 60 may use the yaw rate, either alone or in combination with the steering angle, to determine whether to execute the cutter brake mode. For example, the vehicle 2 may include a sensor configured to detect a turning condition (e.g., yaw rate and/or steering wheel angle) of the vehicle 2. The HECU 60 may receive information indicating the turning condition, such as the yaw rate, and compare the yaw rate with a pre-determined threshold. If the yaw rate is greater than the pre-determined threshold, then the process moves to 312. If not, then the process may return to block 302.

As represented by block 312, the HECU 60 determines whether the cutter mode is on. For example, the user might not want or need reduced turn radiuses. As such, the user may turn the cutter mode off, and the process moves back to block 302. If the HECU 60 determines the cutter mode is on, then the process moves to block 314.

As represented by block 314, the HECU 60 executes the cutter brake modifier. For example, the HECU 60 may modulate cycles of brake pressure, using hydraulic fluid from hydraulic fluid reservoir 152 (FIG. 10), to distribute pressurized braking fluid to one or more brake calipers 48, 52. By distributing the pressurized braking fluid to the one or more brake calipers 48, 52 (e.g., brake caliper 48a and not brake caliper 48b), the HECU 60 may reduce the wheel speed of the inner ground-engaging member 10, 12, which may cause the outer ground-engaging members 10, 12 to speed up relative to the inside ground-engaging members 10. The HECU 60 may use the steering wheel angle, yaw rate, and/or the vehicle speed to determine the amount of braking used on the one or more ground-engaging members (e.g., the one or more inner ground-engaging members 10, 12). In other words, depending on the steering wheel angle, yaw rate, and/or the vehicle speed, the HECU 60 may slow down the inner-ground engaging members 10, 12 by a certain amount or percentage. Additionally, and/or alternatively, by distributing the pressurized braking fluid to the one or more brake calipers 48, 52, the HECU 60 may increase the yaw of the vehicle 2, and reduce the turning radius. FIGS. 13-16 describe this in more detail.

Figure 13:
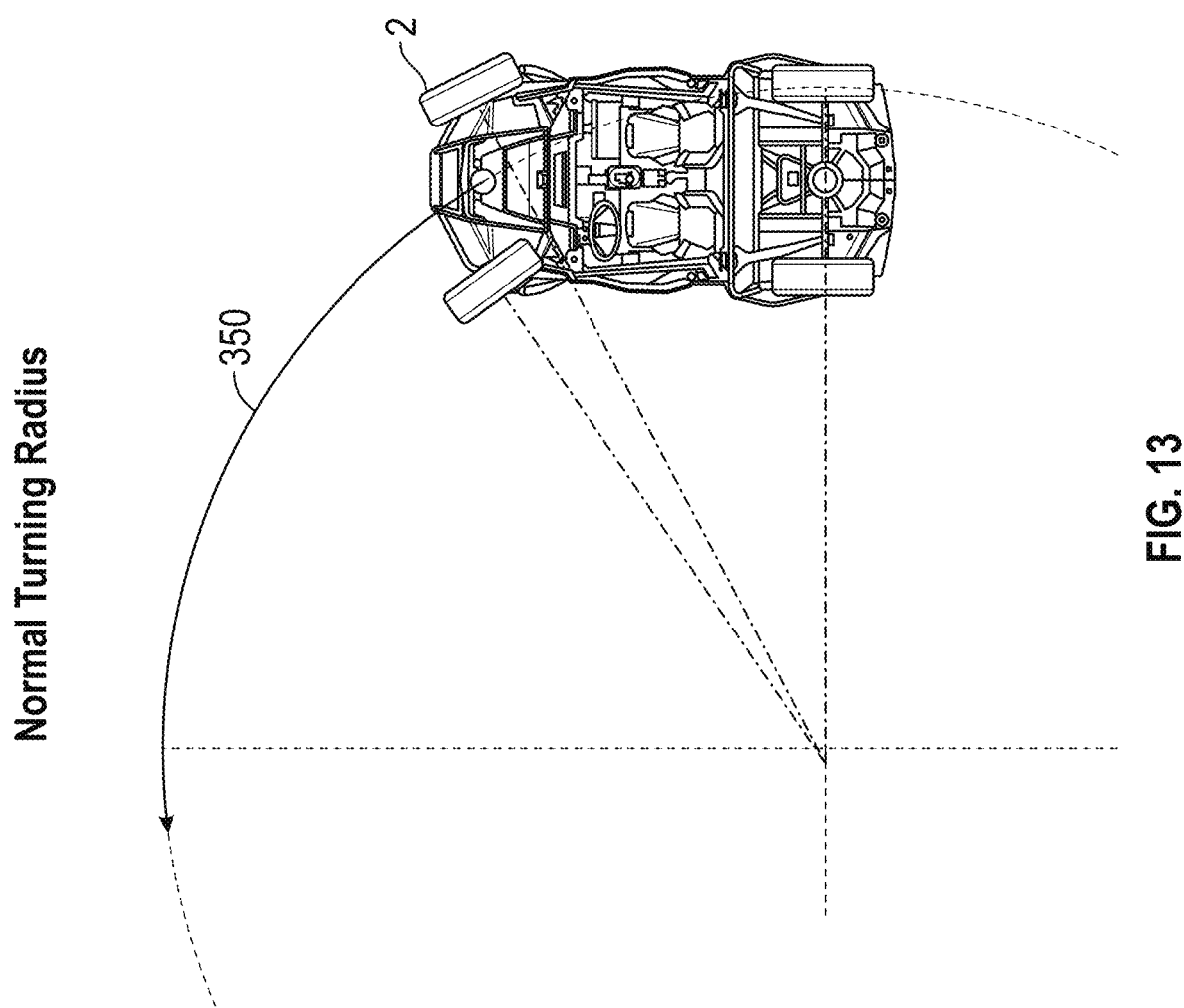
FIG. 13 illustrates a top perspective view of the all terrain vehicle executing a left turn.
Figure 14:
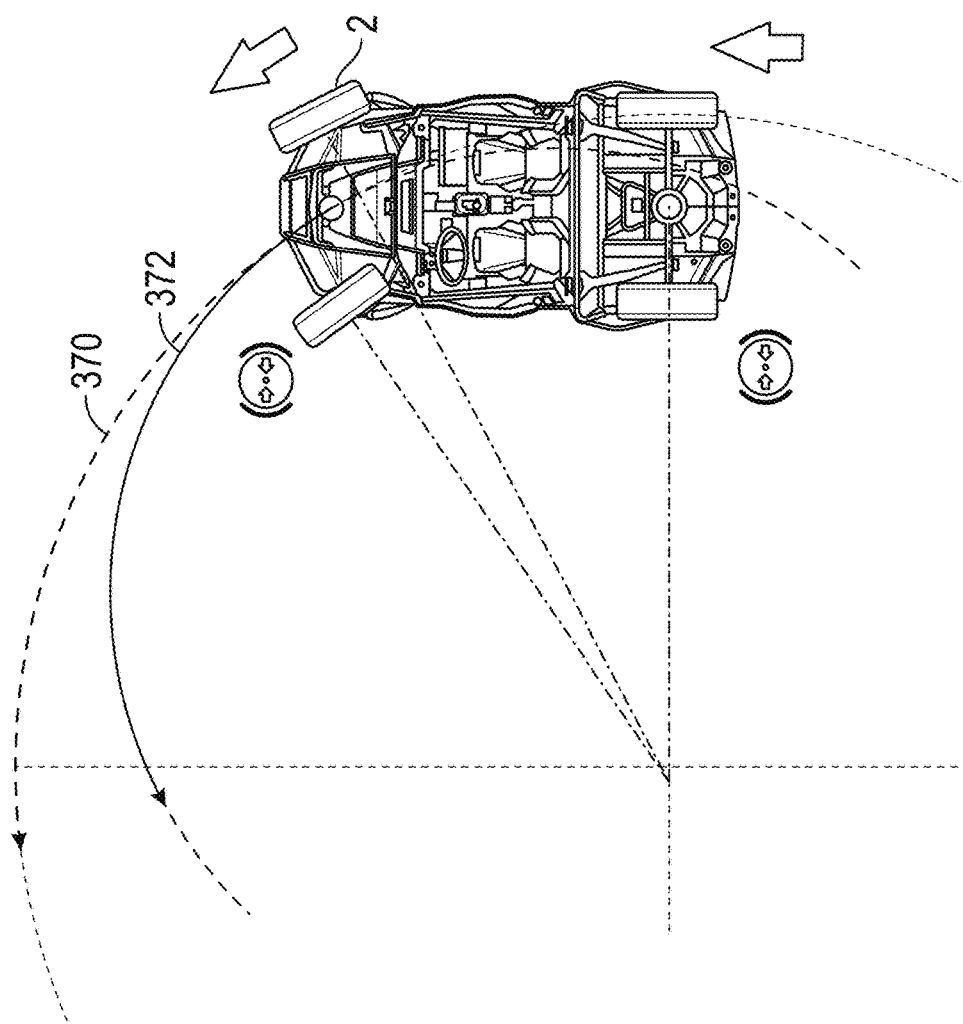
FIG. 14 illustrates a top perspective view of the all terrain vehicle executing an exemplary left turn using the cutting brake mode.

Referring to FIG. 13, the vehicle 2 is shown without executing the cutter brake modifier. For example, the vehicle 2 has a normal (e.g., wide) turning radius 370. Referring to FIG. 14, the vehicle 2 is shown with and without the cutting brake mode. For example, the vehicle 2, without the cutting brake mode, has the same turning radius 370 as shown in FIG. 13. Now, using the cutting brake mode described above, the vehicle 2 has a reduced turning radius 372 (see FIG. 14).

Figure 15:
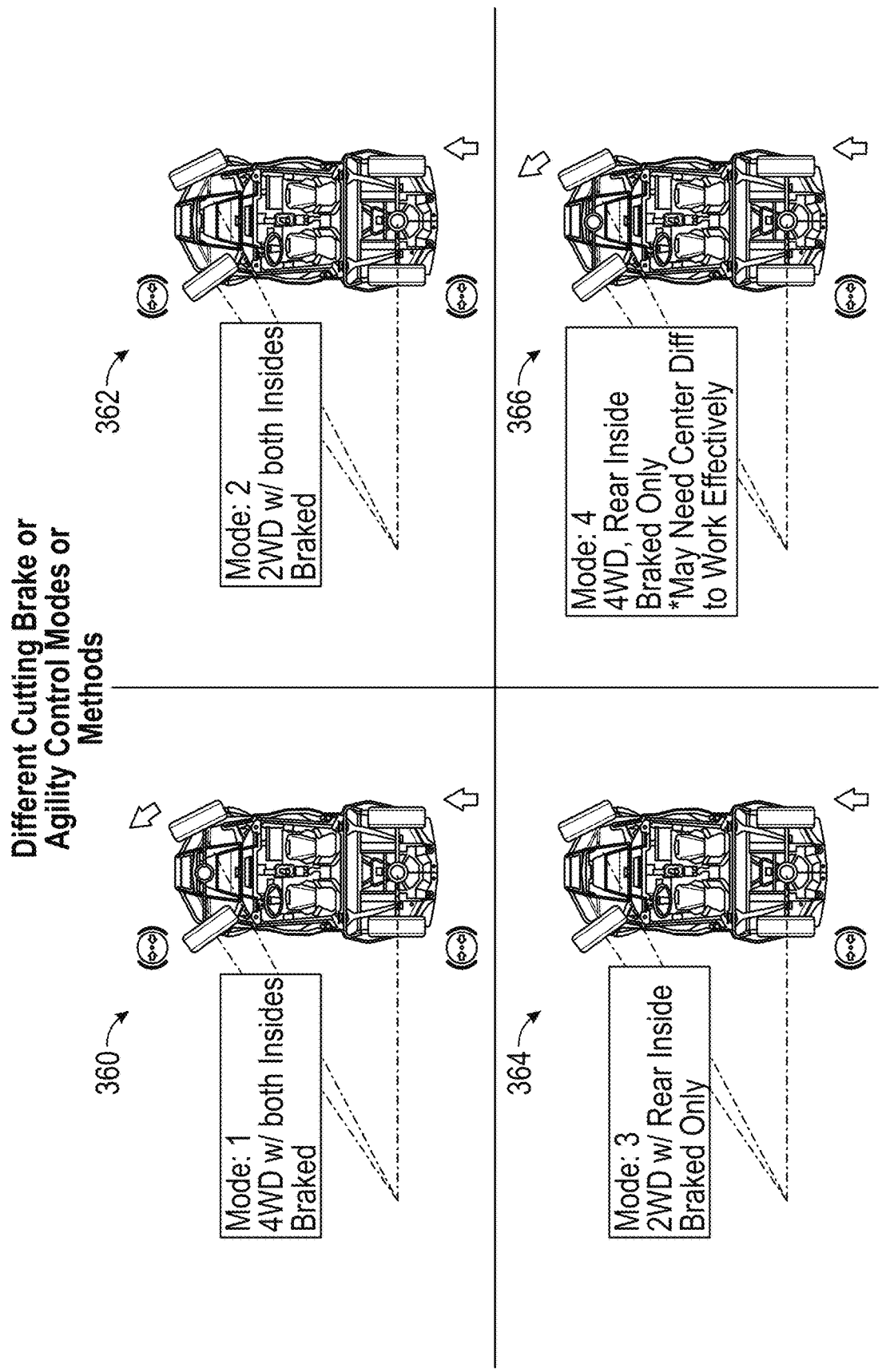
FIG. 15 illustrates top perspective views of the all terrain vehicle executing different exemplary cutting brake or agility control modes or methods.

FIG. 15 shows an exemplary list of different cutting brake and agility control modes or methods. However, further cutting brake and/or agility control modes or methods may be implemented and the modes or methods shown in FIG. 15 are non-exhaustive. The user, using the user interface 204 and/or the display 124, may indicate one of the four cutting brake modes or methods 360-366. In mode 360, which may be an all wheel drive (AWD) mode, both inside ground-engaging members 10 and 12 may be braked. For example, the HECU 60 may distribute pressurized braking fluid to brake calipers 48a and 52a for the inner ground-engaging members 10a and 12a. In such examples, the HECU 60 may slow the speed of the inner ground-engaging members 10a and 12a while increasing the speed of the outer ground-engaging members 10b and 12b relative to the speed of the inner ground-engaging members 10a and 12a, causing a reduced turning radius.

In mode 362, which may be a 2 wheel drive (2WD) mode, both inside ground-engaging members 10 and 12 may be braked. For example, the HECU 60 may distribute pressurized braking fluid to the inner brake calipers 48a and 52a for the inner ground-engaging members 10a and 12a. In such examples, the HECU 60 may slow the speed of the inner ground-engaging members 10a and 12a while maintaining or increasing the speed of the outer ground-engaging members 10b and 12b relative to the speed of the inner ground-engaging members 10a and 12a, causing a reduced turning radius.

In mode 364, which may be a 2WD mode, only the rear inside ground-engaging member 12 may be braked. For example, the HECU 60 may distribute pressurized braking fluid to brake caliper 52a for the inner ground-engaging member 12a. In such examples, the HECU 60 may slow the speed of the inner ground-engaging member 12a, causing a reduced turning radius.

In mode 366, which may be an AWD mode, only the rear inside ground-engaging member 12 may be braked. For example, the HECU 60 may distribute pressurized braking fluid to brake caliper 52a for the inner ground-engaging member 12a. In such examples, the HECU 60 may slow the speed of the inner ground-engaging member 12a, causing a reduced turning radius.

In some embodiments, the HECU 60 may use different thresholds of the steer detection described at block 308 to determine the amount of cutter input. Additionally, and/or alternatively, the HECU 60 may correlate the amount of cutter input with the vehicle speed (e.g., the vehicle speed thresholds described at block 310). For example, depending the different thresholds within blocks 308 and/or 310, the HECU 60 may distribute different amounts of braking fluid to the one or more brake calipers 48 or 52 described above.

In some examples, based on the sensor information, the HECU 60 adjusts the amount (e.g., magnitude) of cutter input and/or a cutter input threshold to prevent one or more components of the vehicle 2 from being damaged. For example, the transmission may be a CVT with a rubber belt. Due to the sensor information, the HECU 60 may determine one or more components, such as the rubber belt of the CVT, may receive damage based on executing the cutter brake modifier. For instance, the cutter brake modifier may cause an increased driveline load due to the brakes being applied, especially around the clutch engagement. This may cause the CVT to "spin burn", which may damage the belt. For example, during a spin-burn event, the belt temperatures may rapidly reach over 200 degrees Fahrenheit without any warning, and may continue to rise if no remedial action is taken. At this point, the drive belt is irreparably damaged, and without replacing the damaged drive belt, the vehicle 2 cannot operate. Exemplary conditions, such as the spin burn condition, that may be prevented based on adjusting the amount of cutter input/threshold are disclosed in U.S. patent application Ser. No. 15/876,343, filed Jan. 22, 2018, titled DIAGNOSTIC SYSTEMS AND METHODS OF A CONTINUOUSLY VARIABLE TRANSMISSION, the entire disclosure of which is expressly incorporated herein by reference.

Figure 12A:
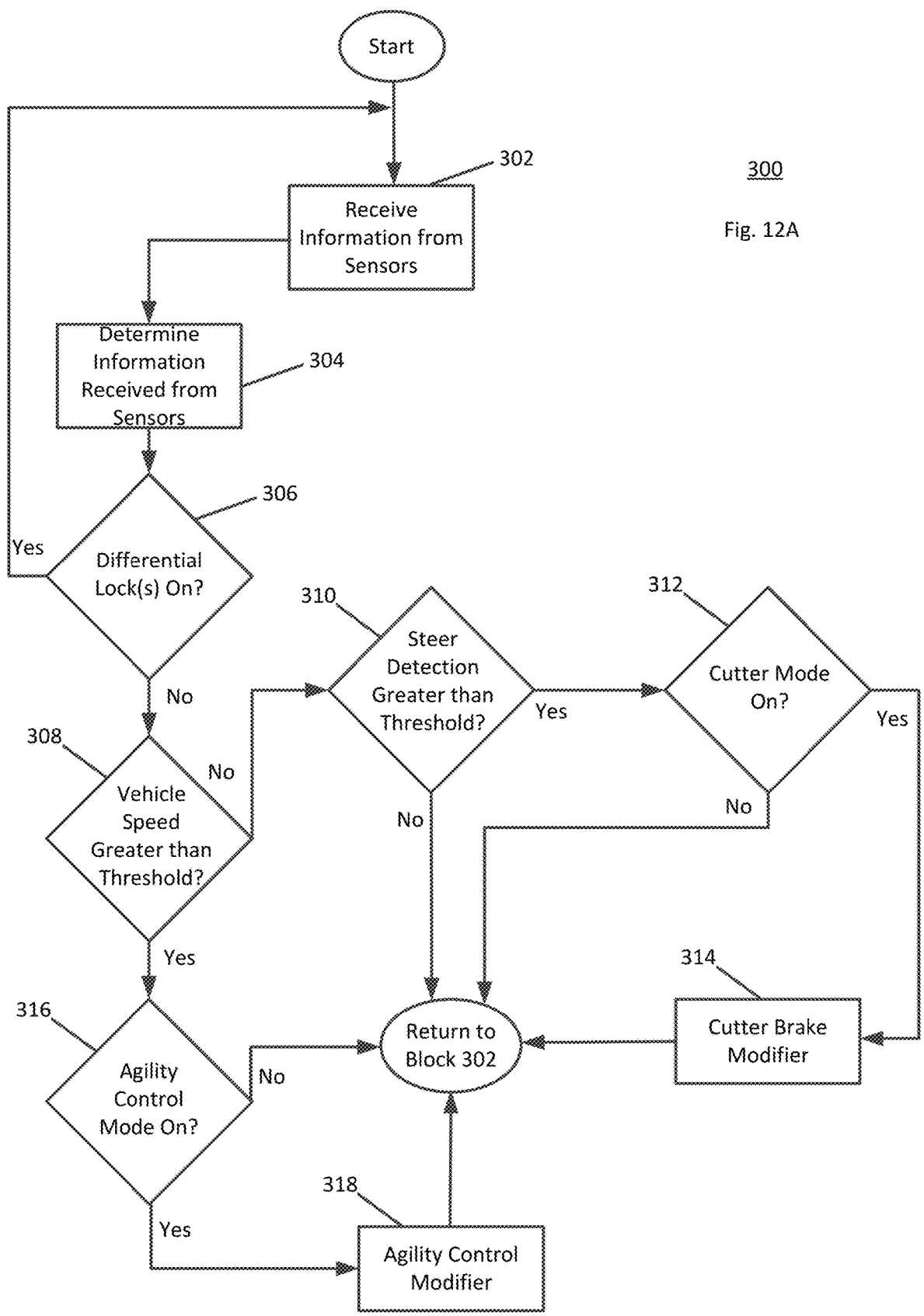
FIG. 12A illustrates a control diagram (e.g., flowchart) of the all terrain vehicle operating in an exemplary cutter brake mode.
Figure 12B:
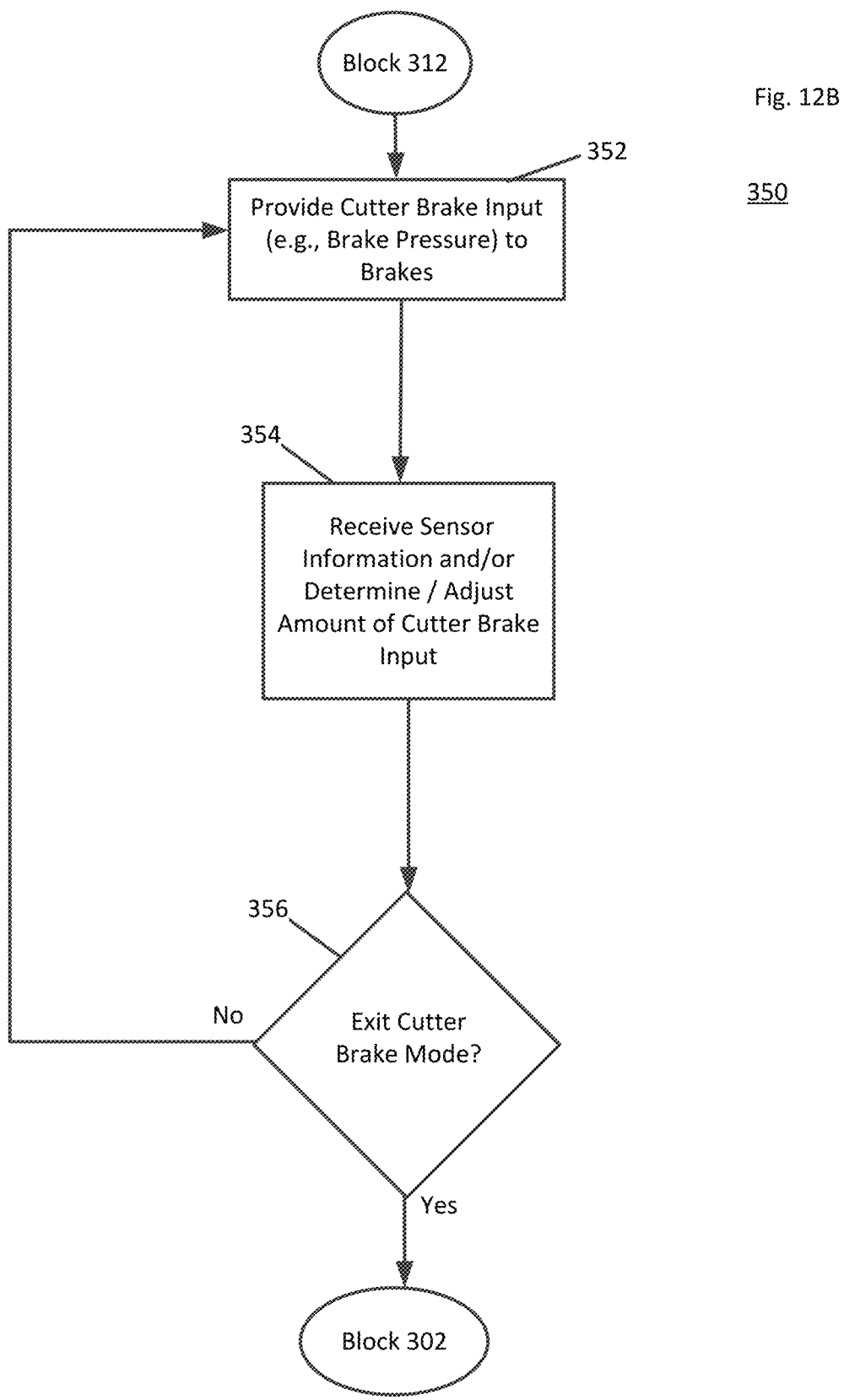
FIG. 12B illustrates another control diagram of the all terrain vehicle operating in an exemplary cutter brake mode.

FIG. 12B illustrates an exemplary processing sequence 350 to adjust the cutter input and/or cutter input threshold to prevent and/or reduce damage to one or more components of the vehicle 2. In other words, processing sequence 350 shows an example of the HECU 60 implementing block 354 (cutter brake modifier). In operation, as represented by block 352, the HECU 60 provides cutter brake input (e.g., apply brake pressure) to the inner front and rear brake calipers 48, 52 of the inner ground-engaging members 10, 12.

As represented by block 354, the HECU 60 receives sensor information (e.g., sensor information from block 302 and/or new sensor information). The HECU 60 determines/adjusts a cutter brake input to prevent damage to one or more components (e.g., prevent "spin burn" of the CVT belt). For example, the HECU 60 determines/adjusts the amount of cutter brake input based on engine speed information (e.g., from an engine speed sensor 220), vehicle speed information (e.g., from the vehicle speed sensor 214 and/or IMU 212), wheel speed information (e.g., from the wheel speed sensors 80, 90), steering information such as steering rate, position, and/or angle (e.g., from the steering angle sensor 130), engine information (e.g., engine torque from the ECM 122), throttle position information (e.g., an actual throttle pedal position from the ECM 122 or throttle pedal position 208), and/or pedal position information (e.g., from the throttle pedal position 208).

In some examples, the HECU 60 adjusts the amount of cutter brake input using one or more functions, algorithms, and/or look-up tables (LUTs) stored in memory, such as memory within the HECU 60 and/or ECM 122. For example, the HECU 60 may monitor the sensor inputs such as vehicle speed, engine speed, wheel speeds, steering rate, steering position, steering angle, and/or pedal positions. For one or more of these inputs, the HECU 60 may use the functions, algorithms, and/or LUTs (e.g., 1-D or one-variable LUTs, 2-D or two-variable LUTs, and/or 3-D or three-variable LUTs) to determine one or more corresponding cutter brake inputs and adjust based on the corresponding cutter brake inputs.

In some instances, the HECU 60 may select the minimum corresponding cutter brake input from the sensor inputs. For example, as each of the sensor inputs indicate that the CVT is further away from the spin burn risk, the HECU 60 may increase the cutter brake input for the brake pressure of the inner ground-engaging members 10, 12. As such, the HECU 60 may further decrease the turning radius without damaging the belt of the CVT.

In some examples, the HECU 60 may compare the wheel speeds from the wheel speed sensors 80, 90. The HECU 60 may determine one or more corresponding cutter brake inputs based on the greatest magnitude wheel speed and/or engine speed. Additionally, and/or alternatively, the HECU 60 use a 2-D LUT based on two sensor inputs (e.g., the greatest magnitude wheel speed and the engine speed) to determine a corresponding cutter brake input for the inner front and/or rear brake calipers 48, 52, and then may adjust accordingly. In other words, if the wheel speeds are indicating movement (e.g., greater than a threshold), then the CVT belt may be rotating through the clutching and the HECU 60 may be able to increase the amount of cutter brake input. Further, the engine speed may indicate the slip risk of the belt of the CVT and the HECU 60 may adjust accordingly.

In some variations, the HECU 60 may determine a transmission speed from the vehicle speed sensor 214 and/or the gear selection 206. For example, the HECU 60 may determine the transmission speed based on a gear ratio and a vehicle speed. The HECU 60 may determine one or more corresponding cutter brake inputs based on the transmission speed, the greatest magnitude wheel speed, and/or engine speed. For example, the HECU 60 may use an LUT, such as a 1-D, 2-D, and/or 3-D LUT to determine the corresponding cutter brake input.

Additionally and/or alternatively, based on the HECU 60 determining an increase in the pedal position (e.g., throttle position from the throttle pedal position), an increase in engine torque, and/or the vehicle speed (e.g., the vehicle speed is greater than a threshold), the HECU 60 determines an increased cutter brake input. If the increased cutter brake input for the pedal position and/or vehicle speed is the minimum cutter brake input, the HECU 60 may apply this amount of brake pressure to the inner ground engaging members 10, 12. In other words, if the vehicle 2 has enough vehicle speed, then the CVT might not be spin burning and the HECU 60 may apply a greater amount of cutter brake input.

Additionally and/or alternatively, if the HECU 60 detects an increase in the steering angle, rate, and/or position, then the HECU 60 determines an increased cutter brake input based on the steering angle, rate, and/or position. By increasing the cutter brake input based on the increase in the steering angle, rate, and/or position, the HECU 60 may enable a smoother entry and/or exit into the cutter brake mode for the vehicle 2. Additionally, and/or alternatively, in some examples, in order to provide a smoother cutter brake mode, the HECU 60 may gradually increase the cutter brake input (e.g., brake pressure) to the inner ground engaging members 10, 12. For example, the HECU 60 may slowly increase the brake pressure until it reaches a maximum amount or threshold (e.g., the cutter input threshold). The HECU 60 may adjust the cutter input threshold based on one or more sensor inputs (e.g., the sensor inputs described above). For example, for each iteration of processing sequence 350, the HECU 60 may adjust a new cutter input threshold. The HECU 60 may compare the gradually increasing cutter brake input with the new cutter input threshold to determine whether to increase (e.g., if the new threshold is above the previous cutter brake input), maintain (e.g., if the new threshold substantially equals the previous cutter brake input), and/or reduce (e.g., if the new threshold is below the previous cutter brake input) the previous cutter brake input. In other words, as the user indicates more turn, the HECU 60 may increase the maximum brake pressure allowed, causing a smoother transition of applying the brake pressure. This gradual increase of brake pressure may produce a smoother entry into the cutter brake mode.

As represented by block 356, the HECU 60 determines whether to exit the cutter brake mode. For example, based on the sensor information (e.g., the vehicle speed, the steering angle, steering position, steering rate, and/or detection of an end of a cornering event), the HECU 60 determines whether to exit the cutter brake mode. In other words, if the vehicle speed is greater than the threshold from block 308 and/or the steering detection is greater than the threshold from block 310, the HECU 60 exits the cutter brake mode and the processing sequence 350 moves back to block 302. Additionally, and/or alternatively, based on detecting an end of a cornering event (as described below in FIG. 23), the HECU 60 exits the cutter brake mode and the processing sequence 350 moves back to block 302. If the HECU 60 determines not to exit the cutter brake mode, the processing sequence 350 moves to block 352 and provides the adjusted cutter brake input (e.g., amount of brake pressure) from block 354 to the brakes calipers 52.

Referring back to FIG. 12A, after executing the cutter brake modifier, the process may return to block 302 and may repeat continuously. Referring back to block 308, the HECU 60 may determine that the vehicle speed is greater than the threshold, and the process moves to block 316. As represented by block 316, the HECU 60 determines whether the agility control mode is on. If not, the process moves to block 302. If so, the process moves to block 318.

As represented by block 318, the HECU 60 executes an agility control modifier. The agility control modifier may be a more aggressive version of the stability control. For example, the agility control modifier may cause the HECU 60 to start braking the inside wheel sooner for a more nimble vehicle and/or proactively generate vehicle yaw. This may cause the turning radius to decrease, even in very high yaw rate scenarios. After executing the agility control modifier, the process moves back to block 302, and may repeat continuously.

Figure 16:
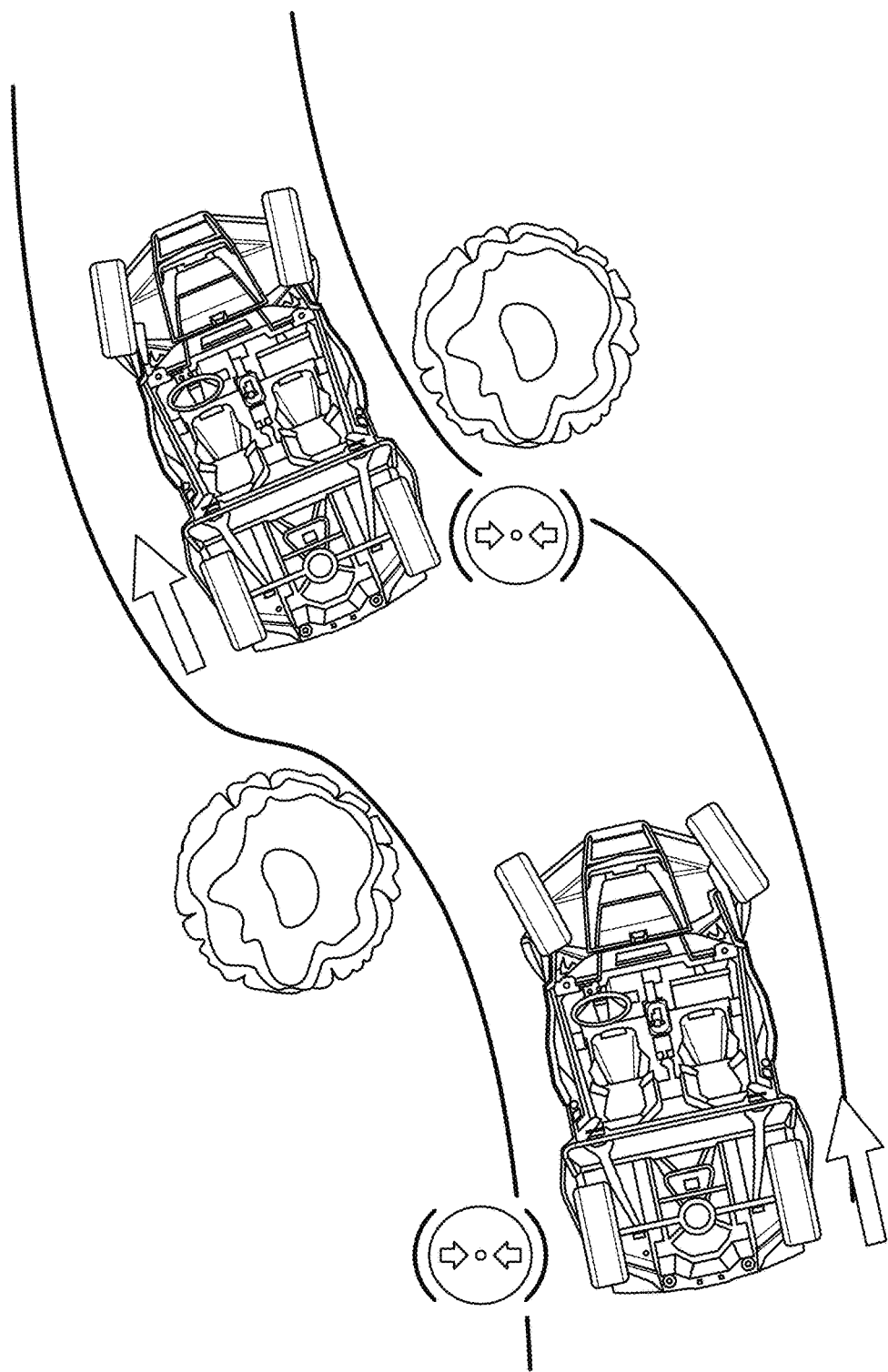
FIG. 16 illustrates a top perspective view of the all terrain vehicle using an exemplary agility control mode.

In some embodiments, the agility control mode may include a torque vectoring mode. FIG. 16 shows the vehicle 2 executing the agility control mode (e.g., torque vectoring of the vehicle 2). For example, torque vectoring increases the yaw of vehicle 2 in a quicker controllable manner. Thus, the inside rear ground engaging member may be slowed by the ABS system 40. For instance, the HECU 60 may distribute pressurized braking fluid to the inner brake calipers (e.g., brake caliper 52a for the inner ground-engaging member 12a). In the agility control mode, the HECU 60 may receive the vehicle speed, steering position, yaw rate from the inertial measurement unit (IMU) 212, the brake, and/or the throttle position.

Engine Flare Hold

Figure 17:
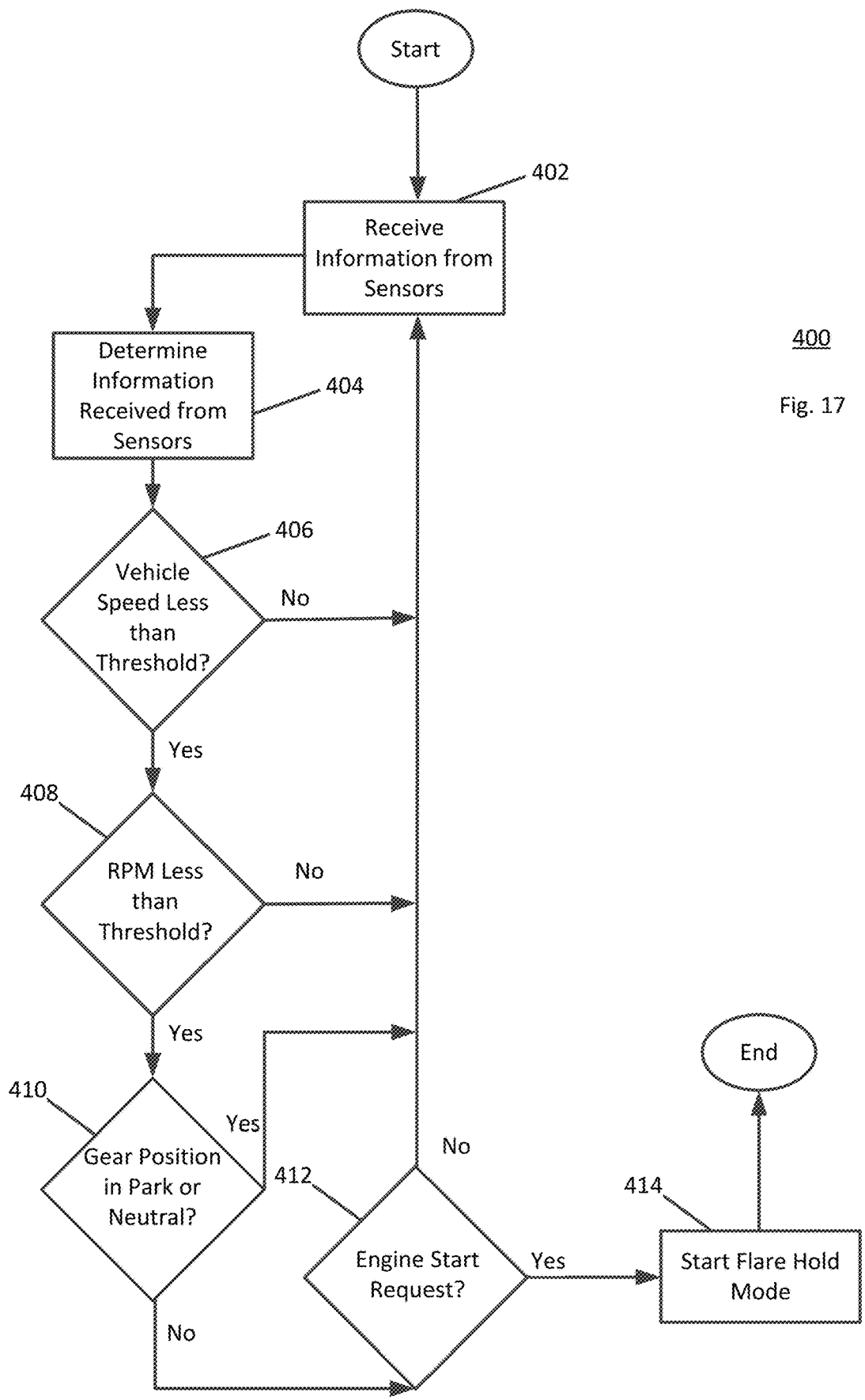
FIG. 17 illustrates a control diagram of the all terrain vehicle operating in an engine flare hold mode.

FIG. 17 illustrates an engine flare hold using a braking system such as an ABS system. For example, during start-up, a user might not intend a vehicle, such as vehicle 2, to move. Thus, the vehicle 2, may use an engine flare hold to prevent the vehicle 2 from moving during start-up. For instance, when a user starts the vehicle 2, an engine flare may occur, temporarily moving the vehicle 2. Using the ABS system, the HECU 60 may hold or brake (e.g., distribute hydraulic fluid to the brake calipers 48, 52) the ground-engaging members 10, 12 of the vehicle 2 for a pre-determined time period (e.g., two seconds) to prevent the vehicle 2 from moving during start-up. In other words, during start-up, the HECU 60 may be configured to apply brake pressure to one or more ground engaging members 10, 12 in response to satisfying one or more criteria (e.g., in response to receiving information from one or more sensors, devices, and/or sub-systems).

In some instances, vehicles with continuously variable transmissions ("CVT") may use the engine flare hold mode. For example, as mentioned above, vehicle 2 may include a CVT. During start-up of vehicle 2, an engine flare may occur, causing an increase in torque from the engine. Based on the increase in torque, the CVT may be engaged to transfer the torque to the driven pulley, thus moving the vehicle 2 forward. Therefore, to prevent a vehicle with a CVT, such as vehicle 2, from moving forward, the HECU 60 may be configured to apply brake pressure to one or more ground engaging members 10, 12 as described below.

In operation, as represented by block 402, the HECU 60 receives information (e.g., inputs) from sensors, devices, and/or subsystems. As described above, FIG. 11 shows a plurality of sensors, devices, and/or subsystems that may be connected (e.g., electrically or hydraulically) with the HECU 60. The HECU 60 may receive (e.g., retrieve and/or obtain) information (e.g., data packets and/or signals indicating sensor readings) from the one or more sensors, devices, and/or subsystems in FIG. 11. Then, the process moves to block 404.

As represented by block 404, the HECU 60 determines the information received from the sensors, devices, and/or subsystems. In some instances, the HECU 60 may receive information indicating the vehicle speed, key position, electronic control unit (ECU) or ECM engine start signal, ECM or ECU engine state, rotations per minute (RPM), the gear position, and/or the throttle pedal position.

In some examples, the HECU 60 may receive the vehicle speed from the vehicle speed sensor 214. The vehicle speed may indicate a speed of the vehicle 2. The HECU 60 may receive the key position from the user interface 204 and/or display 124. The key position may indicate a vehicle start-up. The HECU 60 may receive the ECM engine start signal, the engine state, and/or the RPM from the ECM 122. The ECM engine start signal may indicate that the signal is in start-up. The ECM engine state may indicate a state of the engine, such cranking (e.g., starting). The RPM may indicate the engine speed of the vehicle 2. The HECU 60 may receive the gear position from the transmission controller 216. The gear position may indicate whether the vehicle 2 is in park, neutral, reverse, drive, forward, and/or other states. The HECU 60 may receive the gear position from a sensor, such as a gear position sensor. The gear position sensor may be included in the transmission controller 216.

As represented by block 406, the HECU 60 determines whether the vehicle speed is less than a threshold, such as a pre-determined or pre-programmed threshold. For example, at start-up, the vehicle 2 is stopped or substantially stopped. Thus, the threshold may be low, such as five MPH or zero MPH. If the vehicle speed is greater than the threshold, then the process moves back to block 402. If the vehicle speed is less than the threshold, then the process moves to block 408.

As represented by block 408, the HECU 60 determines whether the RPM (engine speed) is less than a threshold, such as a pre-determined or pre-programmed threshold. This threshold may be different than the threshold described at block 406. For example, at start-up, the RPM of the engine for vehicle 2 is close to zero. Thus, the threshold may be low, such as five, ten, or zero. If the engine speed is greater than the threshold, then the process moves back to block 402. If the engine speed is less than the threshold, then the process moves to block 410.

As represented by block 410, the HECU 60 determines whether the gear position is in park or neutral. For example, at start-up, the gear position is usually at park or neutral. If the HECU 60 determines the gear position is in park or neutral, then the process moves back to block 402. If not (e.g., the HECU 60 determines the gear position is in drive), then the process moves to block 412. In some embodiments, block 410 may be optional. For example, regardless if the vehicle 2 is in park or neutral, the process moves to block 412.

As represented by block 412, the HECU 60 determines whether it has received an engine start request. For example, the engine start request may be indicated by the key position (e.g., received from the user interface 204 and/or the display 124), the ECM start signal (e.g., received from the ECM 122), and/or the ECM engine status (e.g., received from the ECM 122). If the HECU 60 determines it has received one or more of the engine start requests, then the process moves to block 414. If the HECU 60 determines it has not received any of the engine start requests, then the process moves back to block 402.

As represented by block 414, the HECU 60 executes or starts the flare hold mode. For example, when the vehicle speed and/or the engine speed (RPM) is less than a certain threshold value and the HECU 60 verifies an engine start, then the HECU 60 may apply brake pressure and hold for a pre-determined amount of time after the engine start. For example, the HECU 60 may distribute hydraulic fluid to the brake calipers 48, 52 to stop the rotation or movement of the ground-engaging members 10 and 12. The pre-determined amount of time may be any amount of time, such as one second, two seconds, two and a half seconds, and/or three seconds. Additionally, and/or alternatively, the HECU 60 may apply brake pressure until the throttle pedal (e.g., received from the throttle pedal position 208) is depressed. Additionally, and/or alternatively, the HECU 60 may apply brake pressure until the engine RPM falls below a certain speed. After block 414, the process may end.

In some embodiments, the HECU 60 might not execute or disengage the flare hold mode if the user is requesting vehicle movement. For example, the HECU 60 may receive information from the throttle pedal position 208 (e.g., a pedal position sensor) indicating the user is requesting vehicle movement. The pedal position sensor may detect a pedal position of the vehicle 2 (e.g., the user may be trying to drive the vehicle 2). Based on the received information, the HECU 60 might not execute the flare hold mode. Additionally, and/or alternatively, the HECU 60 may have already executed the flare hold mode. In response to receiving the indication that the user is requesting vehicle movement, the HECU 60 may disengage the flare hold mode.

All Wheel Drive (AWD) Engaged on the Fly

Figure 18:
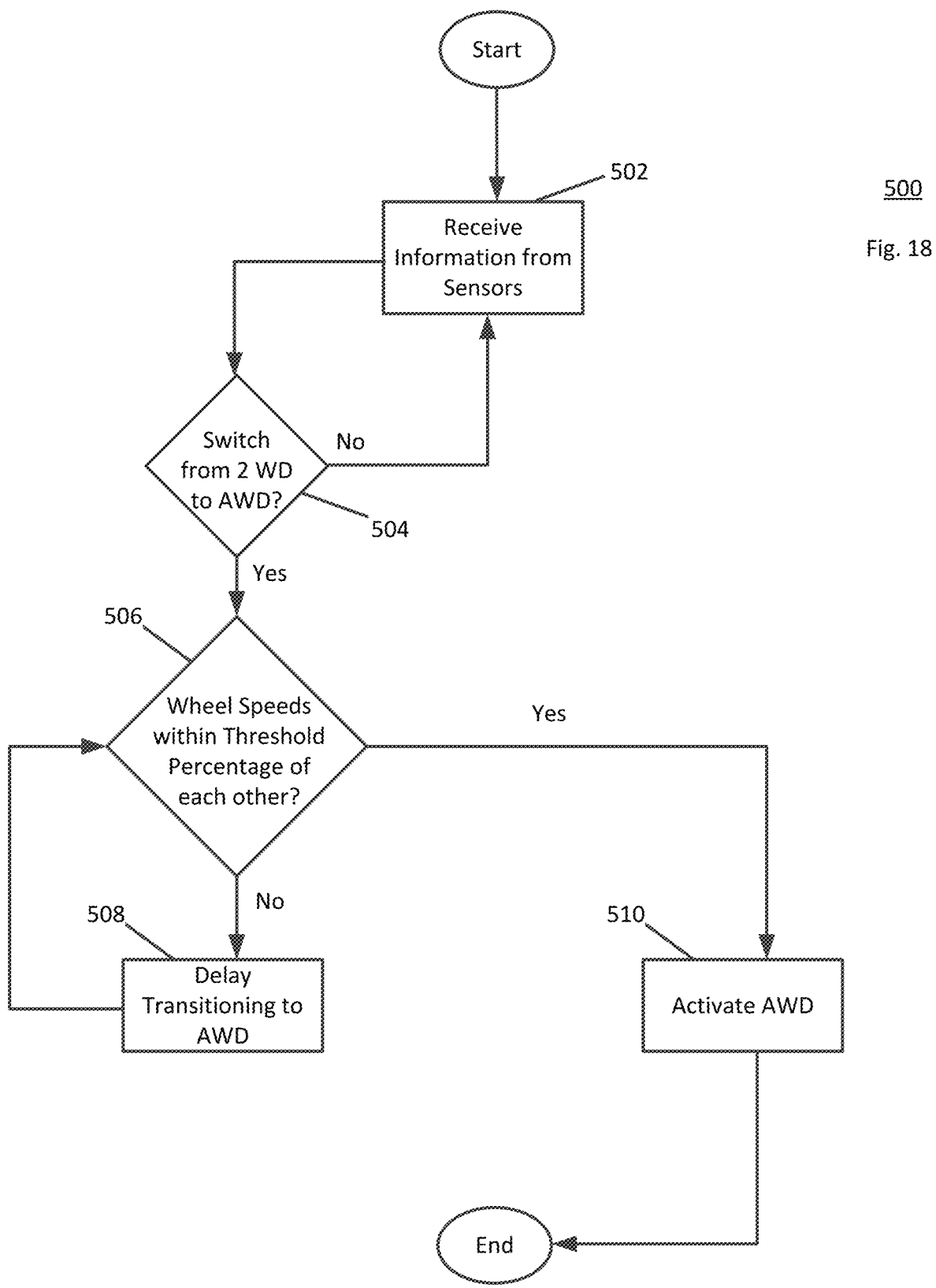
FIG. 18 illustrates a control diagram of the all terrain vehicle switching between a 2 wheel drive mode and an all-wheel drive mode.

FIG. 18 illustrates an AWD that may be engaged on the fly (e.g., vehicle 2 engages AWD when a switch is toggled rather than having to bring the speed of vehicle 2 below a pre-determined threshold, such as five or ten MPH). For example, in some embodiments, the HECU 60 may switch from two wheel drive (2WD) to AWD based on the wheel speeds being within a certain percentage of each other. In some implementations, the HECU 60 might not be used and another controller, such as the ECM 122 may be used to implement the process described below.

In operation, as represented by block 502, the HECU 60 receives information (e.g., inputs) from sensors, devices, and/or subsystems. As described above, FIG. 11 shows a plurality of sensors, devices, and/or subsystems that may be connected (e.g., electrically or hydraulically) with the HECU 60. The HECU 60 may receive (e.g., retrieve and/or obtain) information (e.g., data packets and/or signals indicating sensor readings) from the one or more sensors, devices, and/or subsystems in FIG. 11. Then, the process moves to block 504.

As represented by block 504, the HECU 60 determines whether to switch from 2WD to AWD (e.g., based on whether the user has requested a switch from 2 WD to AWD). For example, the HECU 60 may receive from the display 124 and/or the user interface 204, a user input indicating a switch from 2WD to AWD. If the user input is received, the process moves to block 506. If not, the process moves back to block 502.

As represented by block 506, the HECU 60 determines whether the wheel speeds are within a threshold percentage (e.g., pre-determined and/or pre-programmed) of each other. For example, the HECU 60 may receive wheel speeds from one or more wheel speed sensors 80 or 90. As described above, each wheel or ground-engaging member may include a wheel speed sensor. Thus, the HECU 60 may receive wheel speeds for one or more (e.g., front right, front left, rear right, and rear left) ground-engaging members 10, 12. The HECU 60 may compare the wheel speeds of the ground-engaging members to determine whether they are within percentages of each other. For example, vehicle 2 might not be able to effectively switch from 2WD to AWD if the wheel speeds are substantially different. Thus, the HECU 60 may compare the wheel speeds with a threshold percentage, such as five percent or ten percent. If the wheel speeds are within a threshold percentage, then the process moves to block 510. If not, the process moves to block 508.

In some embodiments, the vehicle 2 may only include two front wheel speed sensors 80. The HECU 60 may determine whether the wheel speeds of the two front wheel sensors are within a threshold percentage, and if so, the process moves to block 510. If not, the process moves to block 508. Additionally, and/or alternatively, in some embodiments, the vehicle 2 may include two front wheel sensors 80 and a transmission speed sensor configured to detect the speed of the rear ground engaging members 12. The HECU 60 may determine whether the wheel speeds from the front wheel sensors 80 and the wheel speeds from the transmission speed sensor are within a threshold percentage. If so, the process moves to block 510. If not, the process moves to block 508.

As represented by block 508, the HECU 60 delays transitioning from the 2WD to the AWD (e.g., wait). In some instances, the HECU 60 may wait a pre-determined or pre-programmed amount of time prior to switching to the AWD. In some examples, the HECU 60 may continuously collect information, such as the wheel speeds. Then, the process moves back to block 506 to determine whether the wheel speeds are within the threshold percentage. In the next iteration, if the wheel speeds are within the threshold percentage, then the HECU 60 moves to block 510.

As represented by block 510, the HECU 60 transitions from the 2WD to the AWD. For example, the HECU 60 may generate a command to direct the vehicle 2 to execute the ground-engaging members 10 and/or 12 in the AWD.

Driving Modes

Figure 19:
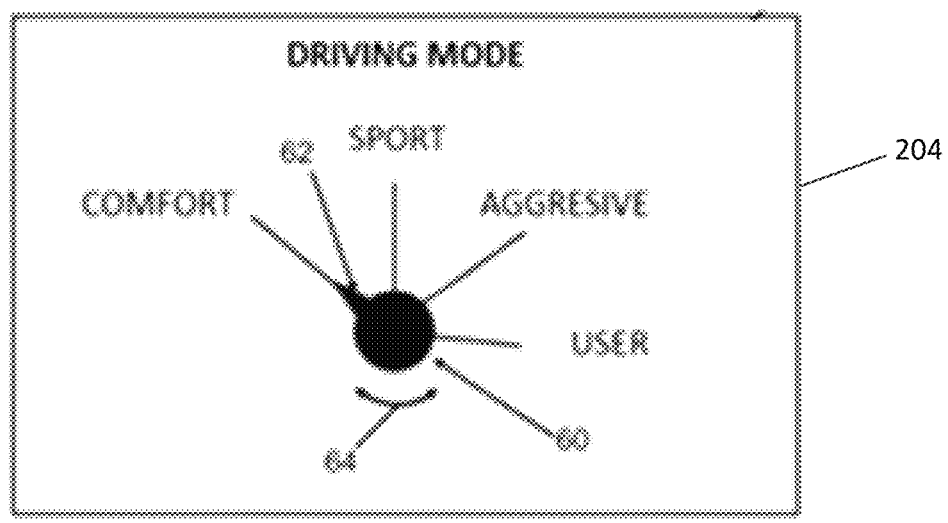
FIG. 19 illustrates a user interface indicating different exemplary driving modes.

FIGS. 19 and 20 illustrate different exemplary driving modes for vehicle 2 and the braking assembly 40 (e.g., the ABS system). Referring to FIG. 19, a user interface 204 is shown. The user interface 204 may include a toggle that allows the user to select driver modes (e.g., comfort, sport, aggressive, and/or user). FIG. 20 illustrates the plurality of driver modes. Each driver mode represents an array of system modes. Further, each driver mode may be reconfigured by the user via a "Ride Command" display, such as display 124 and/or user interface 204. For example, an operator through display 124 may alter the DYNAMIX mode (suspension stiffness) for the Aggressive driving mode to be a "Sport" setup instead of a "Firm" setup. The driver modes may be pre-programmed (e.g., factory default settings). The system modes may be added and/or deleted to match the vehicle's configuration. FIGS. 19 and 20 show one such example of the nomenclature, functionality, and quantity of driving modes, and the present disclosure encompasses additional and/or other nomenclature, functionality, and quantity of driving modes. Additional details regarding various drive modes are disclosed in U.S. patent application Ser. No. 15/816,368, filed Nov. 17, 2017, titled VEHICLE HAVING ADJUSTABLE SUSPENSION, the entire disclosure of which is expressly incorporated herein by reference.

Launch Mode Logic

Figure 21:
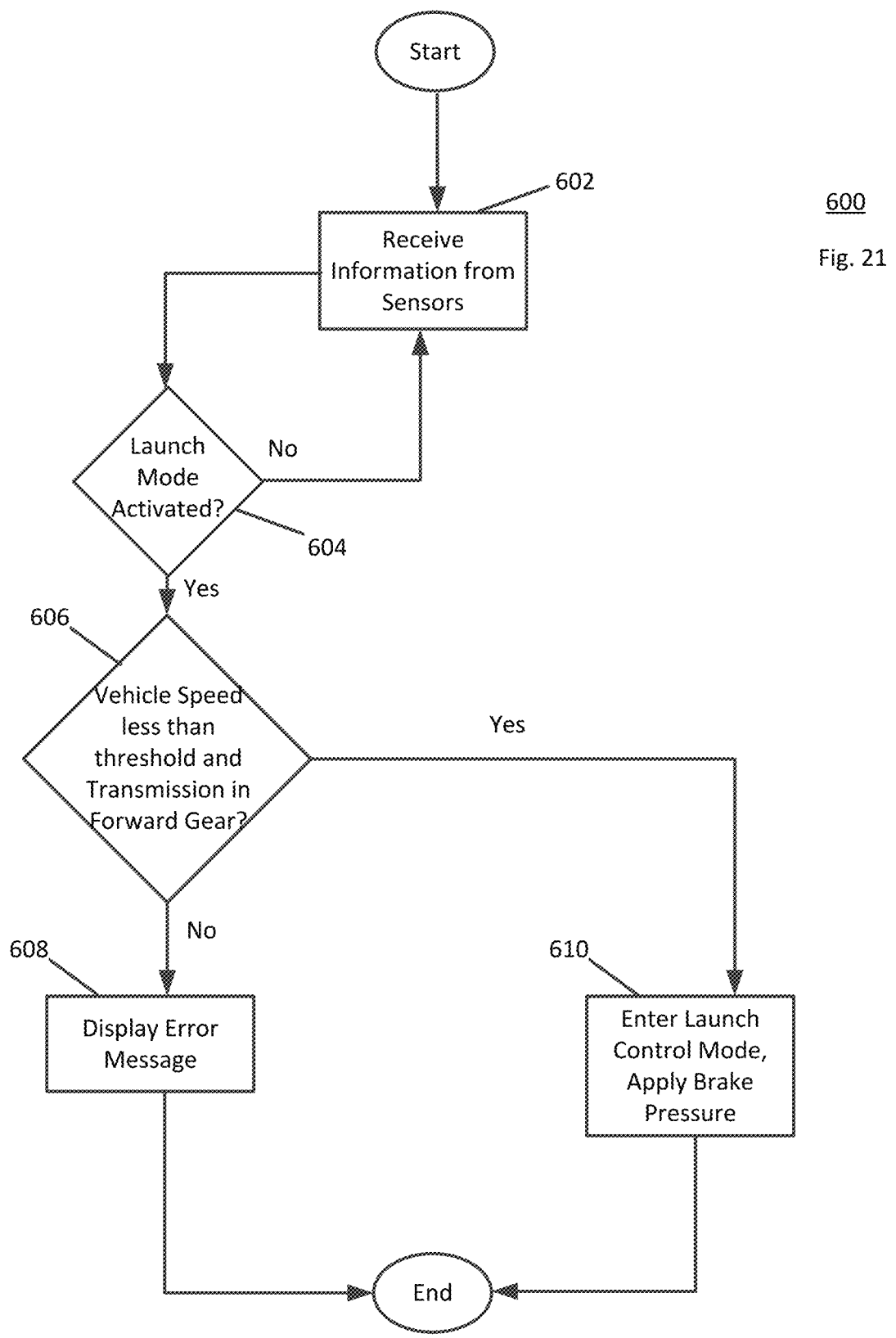
FIG. 21 illustrates a control diagram of the all terrain vehicle operating in a launch control mode.

FIG. 21 illustrates launch mode logic using an ABS system 40. For example, in some embodiments, a user may seek to engage vehicle 2 in a launch mode. The launch mode may allow vehicle 2 to accelerate rapidly after start-up. For instance, using the ABS system 40, the HECU 60 may apply brake pressure to (e.g., distribute hydraulic fluid to the brake calipers 48, 52) the ground-engaging members 10, 12 of the vehicle 2. In other words, the HECU 60 may be configured to engage the launch mode by applying brake pressure to one or more ground engaging members 10,12 in response to satisfying one or more criteria. In some instances, the one or more criteria may include receiving information from one or more sensors, devices, and/or sub-systems.

In operation, as represented by block 602, the HECU 60 receives information (e.g., inputs) from sensors, devices, and/or subsystems. As described above, FIG. 11 shows a plurality of sensors, devices, and/or subsystems that may be connected (e.g., electrically or hydraulically) with the HECU 60. The HECU 60 may receive (e.g., retrieve and/or obtain) information (e.g., data packets and/or signals indicating sensor readings) from the one or more sensors, devices, and/or subsystems in FIG. 11. Then, the process moves to block 604.

As represented by block 604, the HECU 60 determines whether the launch mode has been activated. For example, the HECU 60 may receive from the display 124 and/or the user interface 204, a user input indicating that the launch mode is activated. If the user input is received, the process moves to block 606. If not, the process moves back to block 602.

As represented by block 606, the HECU 60 determines whether the vehicle speed is less than a threshold and the transmission is in forward gear. For example, the HECU 60 may receive the vehicle speed from the vehicle speed sensor 214. The vehicle speed may indicate a speed of the vehicle 2. The HECU 60 may receive an indication that the transmission is in forward gear from the transmission controller 216. After receiving the information, the HECU 60 may determine whether the vehicle speed is less than a threshold (e.g., pre-determined and/or pre-programmed). The threshold may be low, such as less than five MPH or zero MPH. Further, the HECU 60 may determine whether the transmission is in forward gear. If both conditions are met (e.g., transmission is in forward gear and the vehicle speed is less than a threshold), then the process moves to block 610. If not, the process moves to block 608. In some embodiments, if either condition is met, then the process moves to block 610.

As represented by block 608, the HECU 60 causes display an error message. For example, the HECU 60 may generate a signal and/or other information to cause display an error message on the user interface 204 and/or the display 124. The error message may indicate a failure of the launch mode activation. Additionally, and/or alternatively, the error message may indicate that one or more of the two conditions (e.g., transmission is in forward gear and the vehicle speed is less than a threshold) failed.

As represented by block 610, the HECU 60 executes the launch control mode. For example, the HECU 60 may apply brake pressure (e.g., distribute hydraulic fluid to the brake calipers 48, 52) and execute the launch control mode. The HECU 60 may hold the vehicle 2 in the launch control mode until the HECU 60 receives one or more inputs from the sensors, devices, and/or subsystems. For example, after detecting a controlled amount of slippage by one or more ground engaging members 10, 12, the HECU 60 may release the vehicle 2 from the launch control mode (e.g., stop applying brake pressure). Additionally, and/or alternatively, based on a percentage of wheel slip bias between the front ground engaging members 10 and the rear engaging members 12, the HECU 60 may release the vehicle 2 from the launch control mode.

Winch Hold Mode

Figure 22:
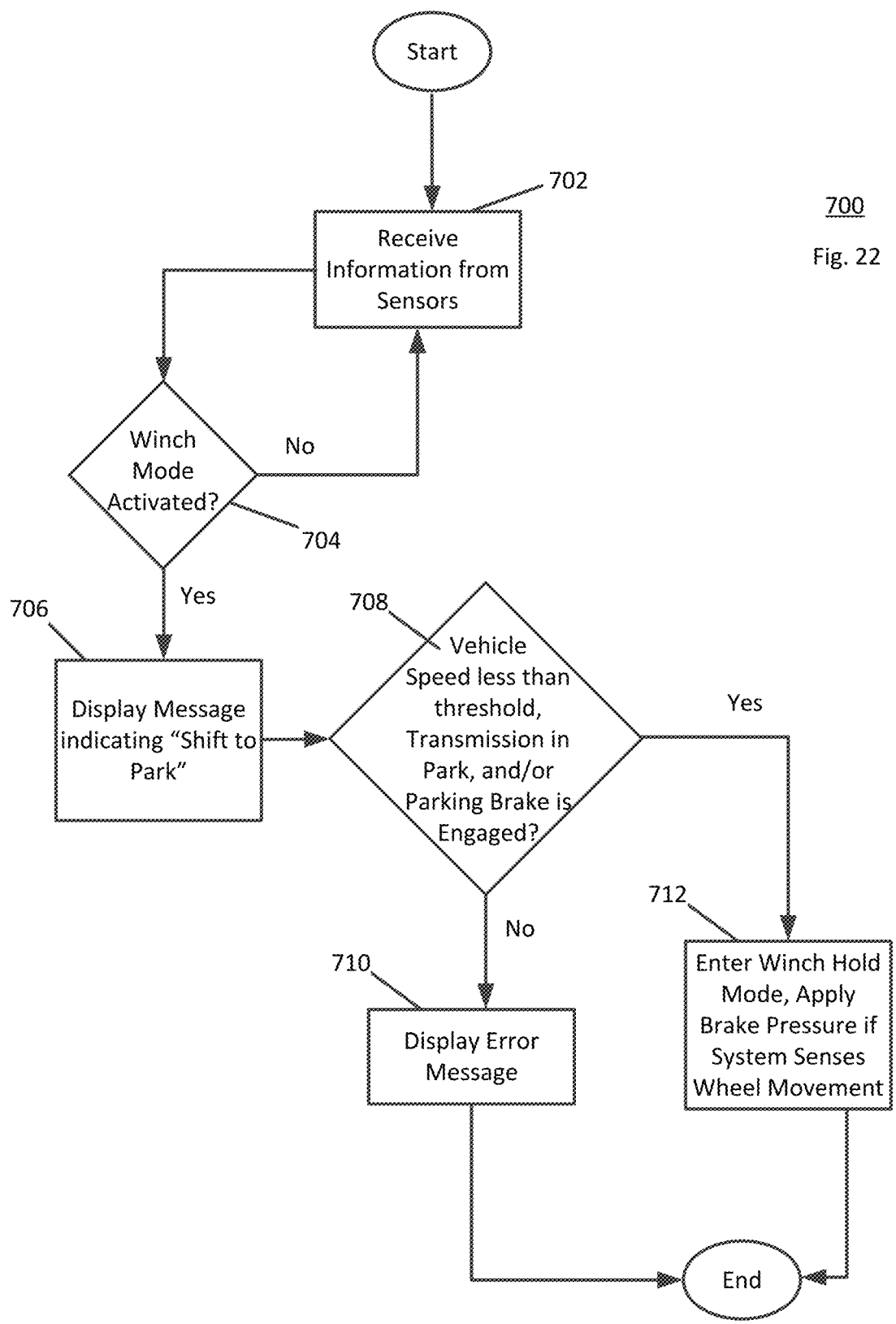
FIG. 22 illustrates a control diagram of the all terrain vehicle operating in a winch hold mode.

FIG. 22 illustrates winch hold mode logic using an ABS system. For example, in some embodiments, a user may seek to engage vehicle 2 in a winch hold mode. In the winch hold mode, if the HECU 60 determines any wheels (e.g., ground-engaging members 10 or 12) are moving, the HECU 60 may apply the ABS system (e.g., distribute hydraulic fluid to the brake calipers 48, 52) to brake the wheels. In other words, the HECU 60 may be configured to engage the winch hold mode by applying brake pressure to one or more ground engaging members 10, 12 in response to satisfying one or more criteria. In some instances, the one or more criteria may include receiving information from one or more sensors, devices, and/or sub-systems.

In operation, as represented by block 702, the HECU 60 receives information (e.g., inputs) from sensors, devices, and/or subsystems. As described above, FIG. 11 shows a plurality of sensors, devices, and/or subsystems that may be connected (e.g., electrically or hydraulically) with the HECU 60. The HECU 60 may receive (e.g., retrieve and/or obtain) information (e.g., data packets and/or signals indicating sensor readings) from the one or more sensors, devices, and/or subsystems in FIG. 11. Then, the process moves to block 704.

As represented by block 704, the HECU 60 determines whether the winch mode has been activated. For example, the HECU 60 may receive from the display 124 and/or the user interface 204, a user input indicating that the winch mode is activated. If the user input is received, the process moves to block 706. If not, the process moves back to block 702.

As represented by block 706, the HECU 60 displays a message indicating "shift to park." For example, the HECU 60 may cause display a message on the display 124 and/or the user interface 204 indicating that the user should shift the transmission to the park mode. After causing display the message, the process moves to block 708.

As represented by block 708, the HECU 60 determines whether the vehicle speed is less than a threshold, the transmission is in the park gear, and/or the parking brake is engaged. For example, the HECU 60 may receive the vehicle speed from the vehicle speed sensor 214. The vehicle speed may indicate a speed of the vehicle 2. The HECU 60 may receive an indication that the transmission is park from the transmission controller 216. After receiving the information, the HECU 60 may determine whether the vehicle speed is less than a threshold (e.g., pre-determined and/or pre-programmed). The threshold may be low, such as less than five MPH or zero MPH. Further, the HECU 60 may determine whether the transmission is park and/or if the parking brake is engaged. If one or more of the conditions are met (e.g., transmission is in park, the parking brake is engaged, and/or the vehicle speed is less than a threshold), then the process moves to block 712. If not, the process moves to block 710. In some embodiments, if either condition is met, then the process moves to block 712.

As represented by block 710, the HECU 60 causes display an error message. For example, the HECU 60 may generate a signal and/or other information to cause display an error message on the user interface 204 and/or the display 124. The error message may indicate a failure of the winch mode activation. Additionally, and/or alternatively, the error message may indicate that one or more of the two conditions (e.g., transmission is in park and the vehicle speed is less than a threshold) failed.

As represented by block 712, the HECU 60 executes the winch hold mode. For example, in response to detecting wheel movement (e.g., received from the wheel sensors 80 or 90 and/or from the vehicle speed sensor 214), the HECU 60 may apply brake pressure (e.g., distribute hydraulic fluid to the brake calipers 48, 52) to stop the vehicle 2 from moving.

In some embodiments, the HECU 60 may execute the winch hold mode regardless if the vehicle 2 is in park. For example, the HECU 60 may detect the vehicle 2 is in a drive gear (e.g., receive an indication that the transmission is a drive gear from the transmission controller 216), but the user might not be intending movement. Thus, based on an indication that the winch mode is activated from block 704, the HECU 60 may execute the winch hold mode.

Disabling Strategy—ABS Module Overheat

In some embodiments, the HECU 60 may initiate a disabling strategy for the ABS system (e.g., the braking assembly 40) to prevent the ABS module, such as the HECU 60, from overheating. For example, the HECU 60 may prevent the ABS system (e.g., the hydraulic system of the HECU 60 shown in FIG. 10) from overheating in response to one or more inputs described below.

In some examples, the HECU 60 may prevent the ABS module from overheating in response to detecting that the seatbelt is disengaged, the seat sensor does not detect a driver, and/or when the ABS solenoid is nearing the overheat condition. For example, the HECU 60 may receive information indicating whether the seatbelt is disengaged from a seatbelt sensor. Further, the HECU 60 may receive information indicating whether the seat sensor detects or does not detect a driver. Also, the HECU 60 may receive information indicating the solenoid is nearing an overheat condition (e.g., greater than a pre-determined and/or pre-programmed temperature).

In response to detecting at least one of these conditions, the HECU 60 may disable the ABS system and/or prevent the ABS system from overheating. For example, the HECU 60 may activate an electronic parking brake for the vehicle 2 or electronically shift the vehicle 2 (e.g., transmitting a command signal to the transmission controller 216) to park mode. Additionally, and/or alternatively, the HECU 60 may transmit information, such as a command signal, to the user interface 204 and/or display 124 that causes an audible warning message. The audible warning message may alert the user that the ABS system is overheating. Additionally, and/or alternatively, the HECU 60 may initiate a small, intermittent vehicle movement. For example, the HECU 60 may release the braking mechanism for the ground engaging-members 10 or 12 for a short time, such as for a few (e.g., one to five) seconds. Then, the HECU 60 may apply brakes to the ground engaging-members again. Additionally, and/or alternatively, the HECU 60 may slow a vehicle speed of the vehicle 2 until the vehicle speed reaches zero. In response to detecting the vehicle speed reaches zero, the HECU 60 may release the brake pressure. The above blocks disable and/or prevent the ABS system from overheating may be performed simultaneously and/or in sequence (e.g., the HECU 60 may first activate the electronic parking park, then cause an audible warning message, initiate a small vehicle movement, and finally release brake pressure when reaching zero). Further, the HECU 60 may perform the above steps out of order and/or skip some steps above.

In some embodiments, the above methods to disable the ABS system and/or prevent the ABS system from overheating may be performed in response to determining the vehicle 2 is in a hill hold mode (e.g., a sensor, such as an accelerometer, detects the vehicle 2 is on a hill) and/or in a winch hold mode as described above.

Disabling Strategy—Brake System Overheat

In some embodiments, the HECU 60 may initiate a disabling strategy for the ABS system (e.g., the braking assembly 40) to prevent the brake system from overheating. For example, applying brakes to one or more ground-engaging members 10 or 12 may cause the braking assembly 40 to overheat. The HECU 60 may disable the ABS system to prevent the braking assembly 40 from overheating. For instance, the HECU 60 may disable the ABS system in response to one or more inputs.

In some examples, the HECU 60 may disable the braking assembly 40 in response to determining that the brake rotors and/or brake calipers (e.g., one or more of the brake calipers 48 or 52) are nearing an overheat temperature. Additionally, and/or alternatively, the HECU 60 may disable the braking assembly 40 based on the individual corner brake pressure, the vehicle speed, and/or the ambient temperature.

In response to detecting at least one of these conditions above, the HECU 60 may transmit information, such as a command signal, to display a visual warning on the user interface 204 and/or the display 124. The visual warning may alert the user that the braking assembly 40 is overheating. Additionally, and/or alternatively, the HECU 60 may transmit information, such as a command signal, to the user interface 204 and/or display 124 that causes an audible warning message. The audible warning message may alert the user that the braking assembly 40 is overheating. Additionally, and/or alternatively, the HECU 60 may reduce the engine output torque amount by transmitting a command to the ECM 122. Additionally, and/or alternatively, the HECU 60 may transmit a command to the ECM 122 to reduce the engine power and/or reduce the vehicle maximum speed. The above steps may be performed simultaneously and/or in sequence. Further, the HECU 60 may perform the above steps out of order and/or skip some steps above.

Disabling Strategy—Low Voltage

In some embodiments, the HECU 60 may detect that the chassis voltage for the vehicle 2 is nearing a low voltage limit. For example, the HECU 60 may receive information from the battery 202 and indicating the chassis voltage for the vehicle 2. In response to an indication that the chassis voltage is low, the HECU 60 may determine whether the vehicle 2 is in a hill hold mode or moving.

In some examples, the HECU 60 determines that the vehicle 2 is in a hill hold mode. For example, a sensor, such as a longitudinal accelerometer, may detect that the vehicle 2 is on a hill. The HECU 60 may receive information from the longitudinal accelerometer indicating the vehicle 2 is on a hill. Based on the received information, the HECU 60 may execute the hill hold mode (e.g., apply brakes to the one or more ground engaging members 10, 12).

If the HECU 60 detects the vehicle 2 is in a hill hold mode and the chassis voltage is nearing a low voltage limit, the HECU 60 may activate an electronic parking brake or electronically shift to park as described above. Additionally, and/or alternatively, the HECU 60 may display a warning message as described above. Additionally, and/or alternatively, the HECU 60 may cause an audible warning message as described above. Additionally, and/or alternatively, the HECU 60 may target a slow vehicle speed until zero speed occurs and then release the brake pressure. For example, the HECU 60 may slow a vehicle speed of the vehicle 2 until the vehicle speed reaches zero. In response to detecting the vehicle speed reaches zero, the HECU 60 may release the brake pressure.

In some instances, the HECU 60 may determine that the vehicle is still moving (e.g., receiving an indication from the vehicle speed sensor 214 that the vehicle is still moving) and the chassis voltage is low. In such instances, the HECU 60 may display a visual warning, cause an audible warning, reduce the torque vectoring amount, and/or reduce the engine power and reduce the vehicle maximum speed as described above. The above steps may be performed simultaneously and/or in sequence. Further, the HECU 60 may perform the above steps out of order and/or skip some steps above.

All Wheel Drive (AWD) Engaged Based on the Vehicle Encountering Events

Figure 23:
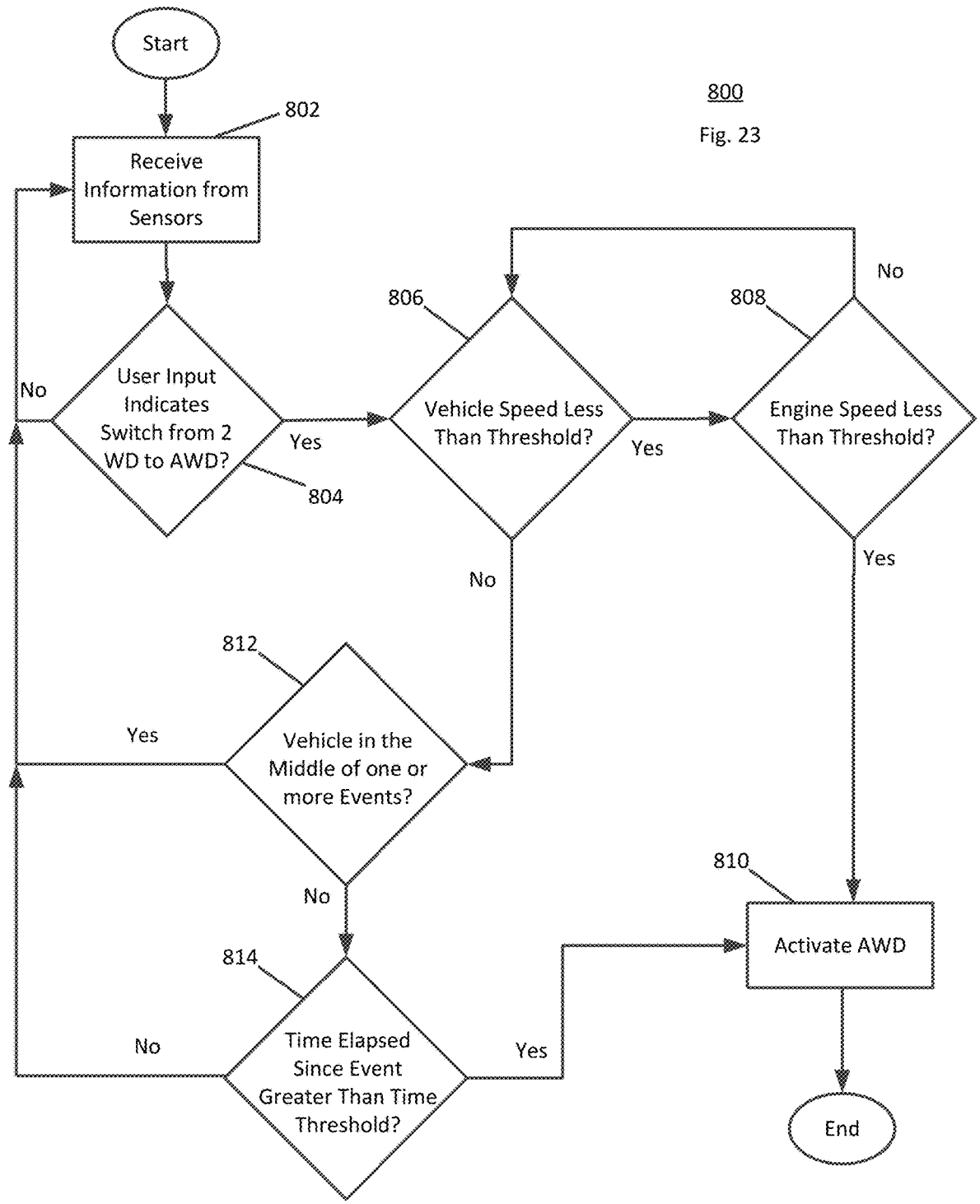
FIG. 23 illustrates another control diagram of the all terrain vehicle switching between a 2 wheel drive mode and an all-wheel drive mode.

FIG. 23 illustrates an AWD mode that may be engaged based on the vehicle encountering one or more events. For example, in some variations, the HECU 60 may or may not switch from a first drive mode (e.g., a two wheel drive (WD) mode) to a second wheel drive mode (e.g., an AWD mode) based on determining whether an event, such as a direction change event, an airborne event, and/or a speed change event is occurring and/or has occurred within a certain time period. In some implementations, the HECU 60 might not be used and another controller, such as the ECM 122 and/or the suspension controller 218 may be used to implement the process described below.

In operation, as represented by block 802, the HECU 60 receives information (e.g., inputs) from one or more sensors, devices, and/or subsystems. As described above, FIG. 11 shows a plurality of sensors, devices, and/or subsystems that may be connected (e.g., electrically or hydraulically) with the HECU 60. The HECU 60 may receive (e.g., retrieve and/or obtain) information (e.g., data packets and/or signals indicating sensor readings) from the one or more sensors, devices, and/or subsystems in FIG. 11.

As represented by block 804, the HECU 60 determine whether it has received user input indicating a switch from the 2WD mode to AWD mode. For example, the HECU 60 may receive from the display 124 and/or the user interface 204, user input indicating a switch from 2WD to AWD. If the user input is received, the process moves to block 806. If not, the process moves back to block 802.

As represented by block 806, the HECU 60 determines whether the vehicle speed is less than a threshold. For example, the HECU 60 may receive the vehicle speed from the vehicle speed sensor 214. By comparing the vehicle speed with a vehicle speed threshold (e.g., pre-determined, pre-programmed, and/or user-defined), the HECU 60 may determine whether the vehicle speed is less than the vehicle speed threshold. If the vehicle speed is less than the vehicle speed threshold, then the process moves to block 808. If not, the process moves to block 812.

As represented by block 808, the HECU 60 determines whether the engine speed is less than a threshold. For example, the HECU 60 may receive the engine speed from the engine speed sensor 220. By comparing the engine speed with an engine speed threshold (e.g., pre-determined, pre-programmed, and/or user-defined), the HECU 60 may determine whether the engine speed is less than the engine speed threshold. If the engine speed is less than the engine speed threshold, then the process moves to block 810. If not, the process moves to block 806.

As represented by block 810, the HECU 60 activates the AWD mode (e.g., transition from the 2WD mode to the AWD mode). For example, the HECU 60 may generate and/or provide one or more commands to transition the vehicle 2 from the 2WD mode to the AWD mode (e.g., turn the AWD mode on).

Returning back to block 806, if the vehicle speed is less than the vehicle speed threshold, the process moves to block 812. As represented by block 812, the HECU 60 determines whether the vehicle 2 has detected an event and/or is in the middle of one or more events. For example, the HECU 60 and/or another controller, such as the suspension controller 218, may detect one or more events. Additionally, and/or alternatively, in response to the detection, the HECU 60 may determine that the vehicle 2 is in the middle of one or more events (e.g., the detected event has not ended). The one or more events may include, but is not limited to, a direction change event, an airborne event (e.g., the vehicle 2 is airborne), and/or a speed change event.

In some instances, the HECU 60 may determine the vehicle 2 is in the middle of a direction change event. The direction change event may include a cornering event (e.g., the vehicle 2 is turning), a hill or rock climbing/crawling event (e.g., the vehicle 2 is traversing a hill or rock), a hill or dune sliding event (e.g., the vehicle 2 is sliding across a hill and/or dune), and/or a spinning event (e.g., the vehicle 2 is spinning). For example, based on sensor information, such as a steering rate information, steering angle information, yaw rate information, and/or acceleration information (e.g., lateral/longitudinal acceleration information), the HECU 60 may determine the vehicle 2 is encountering and/or in the middle of a direction change event.

In some examples, the HECU 60 may determine the vehicle 2 is in the middle of an airborne event. For example, based on acceleration values, the HECU 60 may determine the vehicle 2 is encountering and/or in the middle of an airborne event.

In some variations, the HECU 60 may determine the vehicle 2 is in the middle of a speed change event. The speed change event may include an acceleration event (e.g., the vehicle 2 is accelerating), a deceleration event (e.g., the vehicle 2 is decelerating), and/or a braking event (e.g., the vehicle 2 is braking). For example, based on the acceleration values (e.g., longitudinal acceleration/deceleration values), input from the brake sensor 210, input from the vehicle speed sensor 214, and/or input from the engine speed sensor 220, the HECU 60 may determine the vehicle 2 is encountering and/or in the middle of a speed change event.

Exemplary detection of the events, such as the airborne event, the cornering event, the acceleration event, hill sliding event, and/or the braking event, are described in US Published Patent Application No. 2016/0059660 (filed Nov. 6, 2015, titled VEHICLE HAVING SUSPENSION WITH CONTINUOUS DAMPING CONTROL), US Published Application 2018/0141543 (filed Nov. 17, 2017, titled VEHICLE HAVING ADJUSTABLE SUSPENSION), and U.S. application Ser. No. 16/198,280 (filed Nov. 21, 2018, titled VEHICLE HAVING ADJUSTABLE COMPRESSION AND REBOUND DAMPING), all assigned to the present assignee and the entire disclosures of each expressly incorporated by reference herein, If the HECU 60 determines the vehicle 2 is in the middle of one or more events, the process moves back to block 802. If the HECU 60 determines the vehicle 2 is not in the middle of one or more events, the process moves to block 814. As represented by block 814, the HECU 60 determines whether the time elapsed since the one or more events (e.g., the direction change event, the airborne event, and/or the speed change event) is greater than a time threshold. If so, the process moves to block 810, and the HECU 60 may activate the AWD mode (e.g., transition from the 2WD mode to the AWD mode) as described above. If not, the process moves back to block 802.

For example, the HECU 60 may initiate a timer when an event ends. As represented by block 814, the HECU 60 compares the time lapsed indicated by the timer with a time threshold, and if the time lapsed is greater than the time threshold, the HECU 60 may activate the AWD mode. In other words, the HECU 60 might not switch to the AWD mode if an event has occurred recently. Instead, if the event has occurred recently, the HECU 60 may delay transitioning the vehicle 2 into an AWD mode until a certain amount of time has elapsed and/or not transition the vehicle 2 into the AWD mode.

In some examples of processing sequence 800, instead of receiving (e.g., measuring) the wheel speeds from the one or more wheel speed sensors 80 or 90 as described in the AWD Engaged on the Fly embodiment, the HECU 60 may determine that the wheel speeds are not within a threshold percentage of each other based on detecting one or more events, such as the events described above. For example, referring back to FIG. 18, the HECU 60 may receive wheel speeds for one or more ground-engaging members 8 from one or more wheel speed sensors 80 or 90, and may determine whether to transition from a 2WD mode to an AWD mode based on determining whether the wheel speeds are within a threshold percentage of each other. In processing sequence 800, by detecting an event, the HECU 60 may assume that the wheel speeds are not within a threshold percentage of each other, and the HECU 60 may delay and/or not transition from a 2 WD mode to the AWD mode.

In some variations, another controller, such as the suspension controller 218 and/or the ECM 122 may perform processing sequence 800. For example, the suspension controller 218 and/or the ECM 122 may detect an event and/or determine the vehicle 2 is in the middle of the event. Based on the detection and/or determination, the ECM 122 and/or the suspension controller 218 may delay transitioning the vehicle 2 from the 2 WD mode to the AWD mode. If the suspension controller 218 and/or the ECM 122 does not detect an event and determines the time elapsed since an event is greater than a time threshold, then the suspension controller 218 and/or the ECM 122 may transition the vehicle 2 from the 2 WD mode to the AWD mode.

In some instances, blocks 806 and/or 808 may be included in AWD Engaged on the Fly embodiment above. For example, referring back to FIG. 18, blocks 806 and/or 808 may be included between block 504 and block 506. In other words, after the HECU 60 determines whether to switch from 2WD to AWD (e.g., based on whether the user has requested a switch from 2 WD to AWD as explained above), the HECU 60 may determine whether the vehicle speed is less than a vehicle speed threshold and/or the engine speed is less than an engine speed threshold. If the HECU 60 determines the vehicle speed is less than the vehicle speed threshold and/or the engine speed is less than the engine speed threshold, the HECU 60 may bypass block 506 and/or 508 and move to block 510. As represented by block 510, the HECU 60 activates the AWD mode. If the HECU 60 determines the vehicle speed is greater than the vehicle speed threshold and/or the engine speed is greater than the engine speed threshold, the process moves to block 506, and proceeds as described above.

In some examples, instead of transitioning between a 2WD mode to an AWD mode, processing sequence 800 may be used to transition from a first drive mode to a second drive mode. For example, vehicle 2 may include a 1 WD mode (e.g., a turf mode) and/or another drive mode. In such examples, based on whether the HECU 60 detects one or more events, the HECU 60 may transition from a first mode (e.g., a 1 WD mode, a 2WD mode, and/or an AWD mode) to a second mode (e.g., an AWD mode, a 2 WD mode, and/or a 1 WD mode).

Additional details of braking assembly 40 may be disclosed in U.S. patent application Ser. No. 15/471,469, filed Mar. 28, 2017, and entitled "ANTI-LOCK BRAKE SYSTEM FOR ALL-TERRAIN VEHICLE", the complete disclosure of which is expressly incorporated by reference herein. Further, additional details of braking assembly 40 may be disclosed in Application Ser. No. 62/590,041, filed Nov. 22, 2017, and entitled "ANTI-LOCK BRAKING SYSTEM FOR ALL TERRAIN VEHICLE", the complete disclosure of which is expressly incorporated by reference herein.

Activating HECU Intervention Functionality Based on Sensor and/or User Inputs

Figure 24:
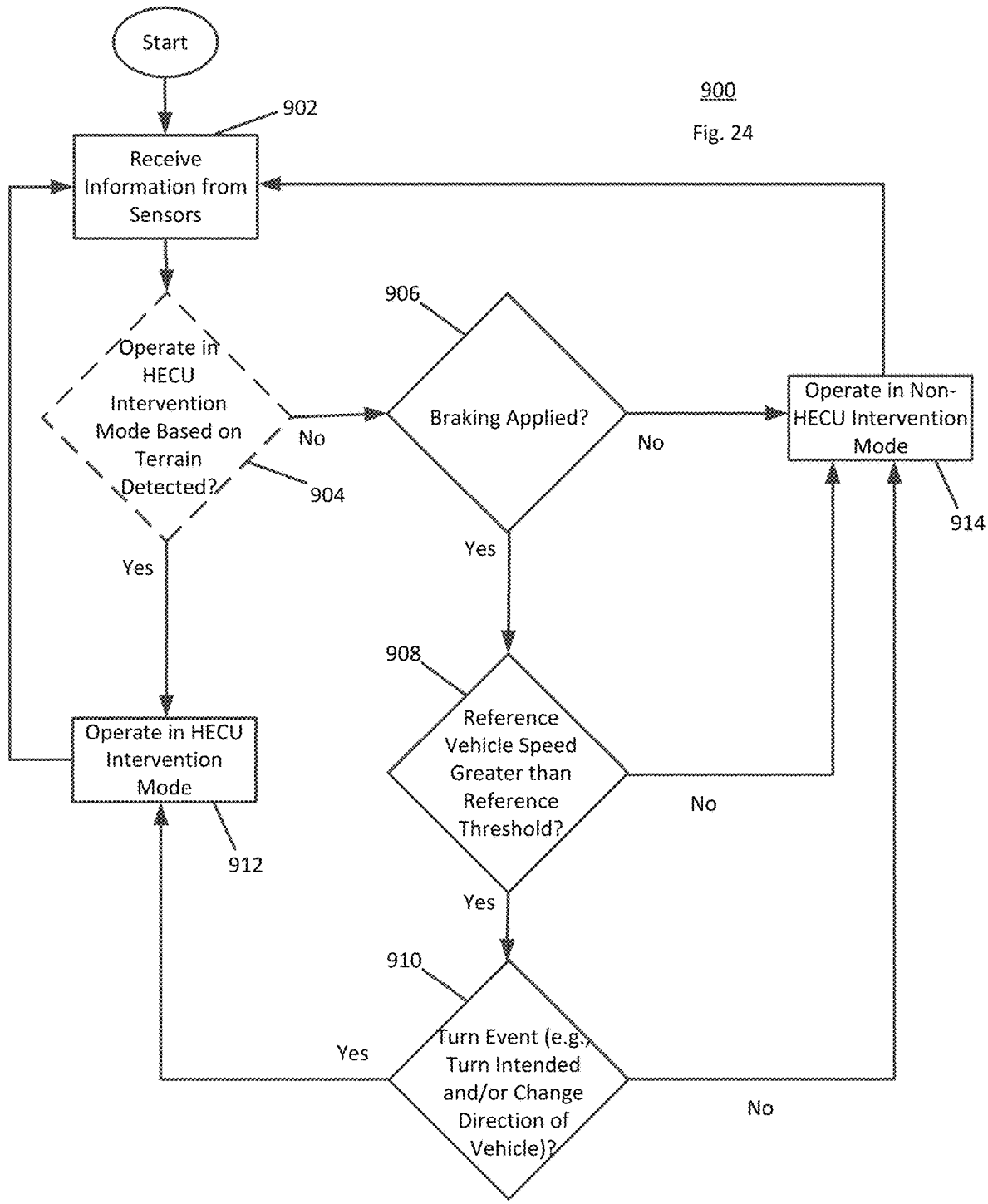
FIG. 24 illustrates a control diagram of the all terrain vehicle switching between an HECU intervention mode and a non-HECU intervention mode.

FIG. 24 illustrates a processing sequence 900 for switching between an HECU intervention mode and a non-HECU intervention mode. For example, in some variations, based on one or more sensor inputs and/or user inputs, the HECU 60 may provide one or more commands to operate in an HECU intervention mode (e.g., an ABS mode and/or an ESC mode) or to operate in a non-HECU intervention mode (e.g., a non-ABS mode and/or a non-ESC mode). For instance, when operating in the HECU intervention mode, the ground engaging members 10, 12 of vehicle 2 may be prevented from locking up and/or skidding, which may allow the user to continue steering and/or maneuvering the vehicle 2 during a braking event (e.g., actuation of the brake member 54, such as a brake pedal). In other words, in the HECU intervention mode, the HECU 60 may be able to control the plurality of ground-engaging members based on steering input. However, in some examples, operating in the HECU intervention mode on certain vehicle terrains may cause the stopping or braking distance of the vehicle 2 to increase. Thus, the HECU 60 may use processing sequence 900 to operate in a non-HECU intervention mode, which may reduce the braking distance as compared to operating in the HECU intervention mode. In the non-HECU intervention mode, the HECU 60 may be unable to control the plurality of ground-engaging members based on the steering input. At any time during braking, the user may seek to turn (e.g., for obstacle avoidance and/or straightening out the vehicle 2). As such, the HECU 60 may activate the HECU intervention functionality to induce wheel slip and permit the wheels to react to steering inputs. In other words, the HECU 60 may use the processing sequence 900 to determine whether or not to use HECU intervention functionality so the vehicle 2 at times may have an optimal braking and at other times may also react to avoid obstructions/obstacles.

In operation, as represented by block 902, the HECU 60 receives information (e.g., inputs) from one or more sensors, devices, and/or subsystems. As described above, FIG. 11 shows a plurality of sensors, devices, and/or subsystems that may be connected (e.g., electrically or hydraulically) with the HECU 60. The HECU 60 may receive (e.g., retrieve and/or obtain) information (e.g., data packets and/or signals indicating sensor readings) from the one or more sensors, devices, and/or subsystems in FIG. 11.

As represented by block 904, the HECU 60 determines whether to operate in an HECU intervention mode based on the detected terrain (e.g., whether the vehicle 2 is traversing on-road or off-road). For example, the HECU 60 may determine the terrain (e.g., pavement, asphalt, ice, dirt) the vehicle 2 is traversing using sensor information such as information from the IMU 212 and/or the wheel speed sensors 80, 90. Based on the determined/detected terrain (e.g., pavement), the HECU 60 may determine to operate in the HECU intervention mode and the processing sequence 900 moves to block 912. Based on other determined/detected terrain (e.g., dirt), the processing sequence 900 moves to block 906. In other words, in certain terrains (e.g., pavement, asphalt, and/or a low friction terrain such as an icy terrain), the vehicle 2 may have similar and/or improved stopping distances when using the HECU intervention mode as compared to the non-HECU intervention mode. As such, the HECU 60 may operate the vehicle 2 in the HECU intervention mode. In other terrains (e.g., a medium friction terrain such as a dirt terrain), the vehicle 2 may have improved stopping distances when using the non-HECU intervention mode as compared to the HECU intervention mode. As such, the HECU 60 may operate the vehicle 2 in the non-HECU intervention mode.

In some instances, the HECU 60 determines the detected terrain based on information from the IMU 212 and/or the wheel speed sensors 80, 90. For example, on certain terrains (e.g., pavement), the HECU 60 may receive smoother signals (e.g., signals with little or no noise/variance). In other words, the HECU 60 may receive IMU 212 measurements (e.g., yaw rates, lateral accelerations, and/or longitudinal accelerations) over a period of time. Based on digital signal processing of the IMU measurements over the period of time, the HECU 60 may determine the detected terrain. Additionally, and/or alternatively, based on digital signal processing of the individual wheel speeds, the HECU 60 may determine the detected terrain.

In some instances, block 904 is optional and the processing sequence 900 moves directly from block 902 to block 906. In other words, the HECU 60 may determine to operate the vehicle 2 in an HECU intervention mode and/or a non-HECU intervention mode regardless of the terrain traversed by the vehicle 2.

As represented by block 906, the HECU 60 determines whether brakes have been applied (e.g., an actuation or depression of the brake member 54). For example, the HECU 60 determines whether the brakes have been applied based on sensor information from the brake sensor 210 (e.g., a position and/or detection of an actuation of the brake member 54). If the brakes have been applied, the processing sequence 900 moves to block 908. If not, the processing sequence moves to block 914. Additionally, and/or alternatively, the HECU 60 may determine whether the vehicle 2 is entering and/or in the middle of a braking event, which is described above in FIG. 23. Based on the determination, the processing sequence 900 moves to block 914 or 908.

As represented by block 908, the HECU 60 determines whether a vehicle reference speed is greater than a reference threshold (e.g., a predetermined, predefined, and/or user-defined threshold). For example, the HECU 60 may determine the vehicle reference speed based on the vehicle speed from the vehicle speed sensor 214, the IMU measurements (e.g., yaw rate, velocity, lateral acceleration, and/or longitudinal acceleration) from the IMU 212, a gear position from the gear selection 206, engine information (e.g., engine torque and/or engine speed) from the engine speed sensor 220 and/or the ECM 122, and/or one or more wheel speeds from the wheel speed sensors 80, 90. The vehicle reference speed being greater than the reference threshold may indicate that one or more ground-engaging members 10, 12 are locked up or skidding (e.g., ground engaging members 10, 12 are unable to rotate, ground engaging members 10, 12 are unable to accept steering inputs to change the direction of the vehicle 2, and/or the vehicle 2 is traveling at a certain vehicle speed, but the wheel speed(s) from the wheel speed sensors 80, 90 are below a wheel speed threshold).

For example, the HECU 60 may determine the reference vehicle speed based on determining whether there is an error with the vehicle speed sensor 214. In some variations, the HECU 60 may determine the error based on the last detected vehicle speed and/or the wheel speeds. For instance, the HECU 60 may determine the last detected vehicle speed from the vehicle speed sensor 214 is above a first threshold (e.g., 50 miles per hour (MPH)). Then, within a certain time frame (e.g., half a second), the HECU 60 may determine the wheel speeds from the wheel speed sensors 80, 90 are below a second threshold (e.g., close to 0 MPH such as 1 or 2 MPH). As such, the HECU 60 may determine an error with the vehicle speed sensor 214. In other variations, the HECU 60 may determine the error using additional and/or alternative sensor inputs and/or logic.

If the HECU 60 determines that there is not an error with the vehicle speed sensor 214, the HECU 60 may use the vehicle speed from the vehicle speed sensor 214 as the reference speed. If the HECU 60 determines that there is an error, the HECU 60 may use the last known accurate vehicle speed (e.g., from the vehicle speed sensor 214), one or more IMU measurements, the gear position, and/or engine information to determine an estimated vehicle speed (e.g., estimated ground speed). Then, the HECU 60 may use the estimated vehicle speed as the reference speed. Logic for determining estimated ground speeds are disclosed in U.S. Pat. No. 9,771,084, filed Oct. 30, 2015, titled SYSTEM AND METHOD FOR CONTROLLING A VEHICLE, the entire disclosure of which is expressly incorporated by reference herein. However, the HECU 60 may use additional and/or alternative logic to determine the estimated ground speed using the last known accurate vehicle speed, the IMU measurements, the gear position, and/or the engine speed. The HECU 60 may compare the determined reference vehicle speed with the reference threshold (e.g., whether the reference vehicle speed is greater than the reference threshold). If the reference vehicle speed is greater than the reference threshold, the processing sequence 900 moves to block 910. If not, the processing sequence 900 moves to block 914.

Additionally, and/or alternatively, the HECU 60 may use one or more rate limiters to increase or decrease the determined reference vehicle speed prior to comparing the reference vehicle speed with the reference threshold. For example, if the HECU 60 determines an acceleration of the reference vehicle speed is above a threshold, the HECU 60 may rate limit the reference vehicle speed (e.g., limit the increasing reference vehicle speed to a first amount). If the HECU 60 determines a de-acceleration of the reference vehicle speed is below a threshold, the HECU 60 may rate limit the reference vehicle speed (e.g., limit the decreasing reference vehicle speed to a second amount). Then, the HECU 60 may compare the new reference vehicle speed with the reference threshold.

In other words, blocks 906 and/or 908 may be used by the HECU 60 to determine a wheel locking event indicating the wheels are unable to accept user input and/or unable to turn (e.g., the ground engaging members 10, 12 are locked up/skidding). Blocks 906 and/or 908 are exemplary and the HECU 60 may use other logic, sensors, and/or additional information to determine whether the ground engaging members 10, 12 are locked up. If the HECU 60 determines the ground engaging members 10, 12 are locked up, the processing sequence 900 moves to block 910. If not, the processing sequence 900 moves to block 914.

As represented by block 910, the HECU 60 determines whether the vehicle is encountering a turning event (e.g., a turn is intended and/or an indication to change a direction of the vehicle 2). For example, based on steering measurements (e.g., a steering angle, steering rate, and/or steering position) from the steering angle sensor 130, the HECU 60 may determine a turn is intended (e.g., by a user), and the processing sequence 900 moves to block 912. In other words, if the HECU 60 determines the steering angle, rate, and/or position is above a threshold, then HECU 60 activates the HECU intervention functionality. Using the HECU intervention functionality, the HECU 60 may induce the slipping of the ground-engaging members 10, 12 and/or allow the ground-engaging members 10, 12 to react to steering inputs (e.g., the user may maneuver the vehicle 2 to avoid the obstacle). If the HECU 60 determines the steering angle, rate, and/or position is below the threshold, the HECU 60 determines to not activate the HECU intervention functionality (e.g., operate in the non-HECU intervention mode as represented by block 914).

Additionally, and/or alternatively, the HECU 60 may determine a turn is intended and/or an indication to change a direction of the vehicle 2 based on steering information and/or IMU information (e.g., yaw rate, velocity, and/or lateral/longitudinal acceleration). For example, the HECU 60 may determine the vehicle 2 is entering and/or in the middle of a cornering event and the processing sequence 900 moves to block 912. Exemplary detection of the events, such as the cornering event, are described above in FIG. 23.

In other words, the HECU 60 may proactively determine the user is intending a turn (e.g., steering information) and may operate the vehicle 2 in the HECU intervention mode. Additionally, and/or alternatively, the HECU 60 may reactively determine a change in the direction of the vehicle 2 (e.g., IMU information and/or steering information) and operate the vehicle 2 in the HECU intervention mode. For example, the ground-engaging members 10, 12 may lock up and the vehicle 2 may begin yawing (e.g., turning) due to the ground engaging members 10, 12 being locked up. The HECU 60 may operate the vehicle 2 in the HECU intervention mode to allow the user to straighten the vehicle 2. In other words, based on the IMU measurements, the HECU 60 may determine a first orientation/direction of the vehicle 2. Then, the HECU 60 may determine a change of direction/orientation from the first orientation/direction (e.g., based on the yaw rates and/or acceleration such as lateral acceleration) and the processing sequence 900 moves to block 912.

As represented by block 912, the HECU 60 provides one or more commands to operate the vehicle 2 in an HECU intervention mode. For example, the HECU 60 may provide one or more commands to allow wheel slip (e.g., intermittently distribute and/or cease distributing hydraulic fluid to the brake calipers 48, 52) to increase and/or permit maneuverability of the vehicle 2. As represented by block 914, the HECU 60 provides one or more commands to operate the vehicle 2 in a non-HECU intervention mode (e.g., allow the ground-engaging members 10, 12 to lock and/or skid). For example, the HECU 60 may provide one or more commands to operate in the non-HECU intervention mode to reduce the stopping distance when traversing off-road terrain. After block 914 and/or 912, the processing sequence 900 moves back to block 902 and repeats.

Differential Lock Engaged on the Fly

Figure 25:
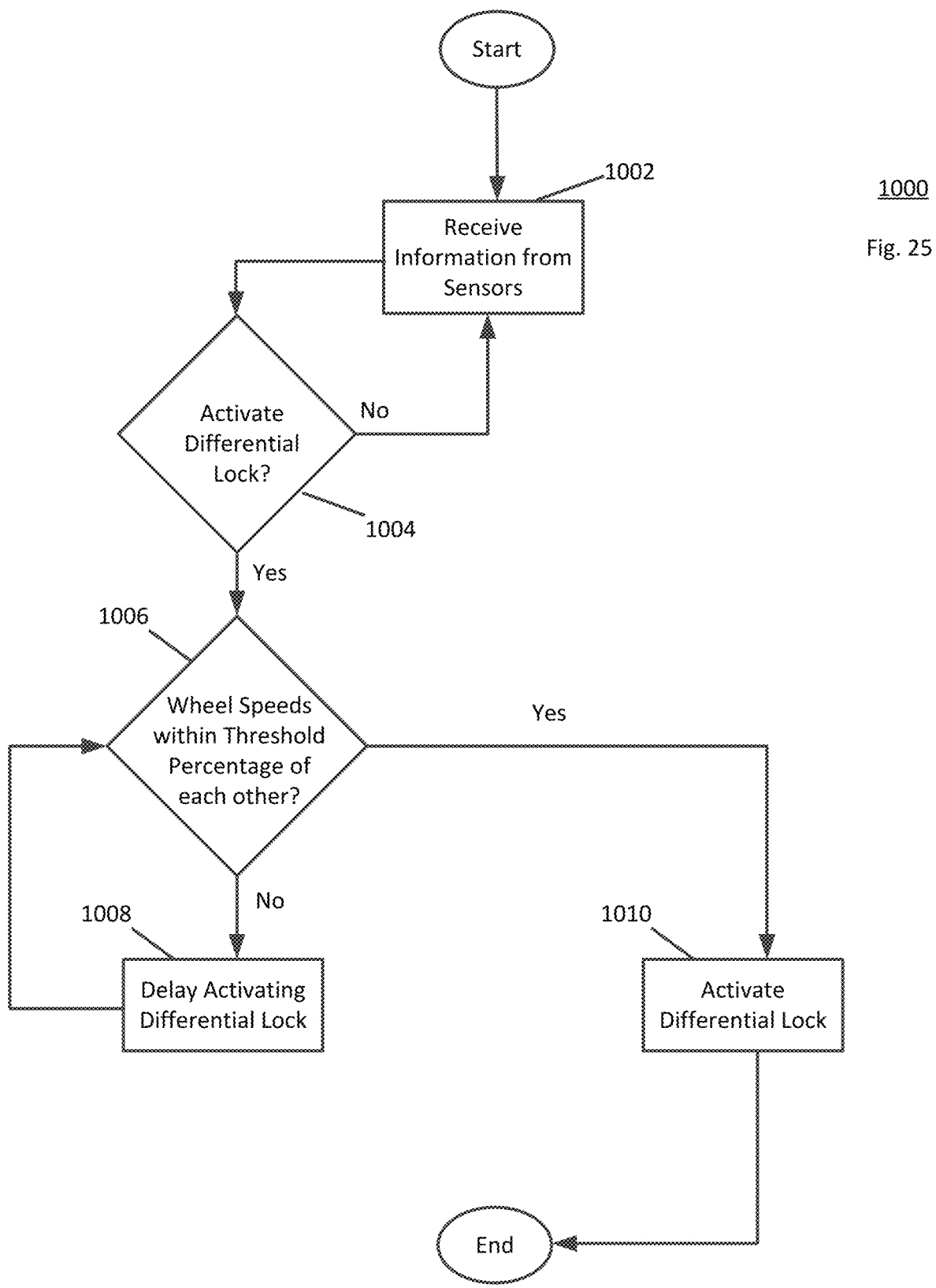
FIG. 25 illustrates a control diagram of the all terrain vehicle switching to a differential lock mode.

FIG. 25 illustrates a processing sequence 1000 for a differential lock that may be engaged on the fly (e.g., vehicle 2 engages a differential lock when a switch is toggled rather than having to bring the speed of vehicle 2 below a pre-determined threshold, such as 15 MPH). The differential lock may lock the front grounding engaging members 10 together and/or the rear ground engaging members 12 together so they move in unison, which is described above.

In operation, as represented by block 1002, the HECU 60 receives information (e.g., inputs) from sensors, devices, and/or subsystems. As described above, FIG. 11 shows a plurality of sensors, devices, and/or subsystems that may be connected (e.g., electrically or hydraulically) with the HECU 60. The HECU 60 may receive (e.g., retrieve and/or obtain) information (e.g., data packets and/or signals indicating sensor readings) from the one or more sensors, devices, and/or subsystems in FIG. 11.

As represented by block 1004, the HECU 60 determines whether to activate differential lock for the ground engaging members 10 and/or 12. For example, the HECU 60 may receive, from the display 124 and/or the user interface 204, a user input indicating to activate the differential lock (e.g., differential lock on). If the user input is received, the processing sequence 1000 moves to block 1006. If not, the processing sequence 1000 moves back to block 1002.

As represented by block 1006, the HECU 60 determines whether the wheel speeds are within a threshold percentage (e.g., pre-determined and/or pre-programmed) of each other. For example, the HECU 60 may receive wheel speeds from one or more wheel speed sensors 80 or 90. As described above, each wheel or ground-engaging member may include a wheel speed sensor. Thus, the HECU 60 may receive wheel speeds for one or more (e.g., front right, front left, rear right, and rear left) ground-engaging members 10, 12. The HECU 60 may compare the wheel speeds of the ground-engaging members to determine whether they are within percentages of each other. For example, vehicle 2 might not be able to activate differential locking effectively if the wheel speeds are substantially different. Thus, the HECU 60 may compare the wheel speeds with a threshold percentage, such as five percent or ten percent. If the wheel speeds are within the threshold percentage, then the process moves to block 1010. If not, the process moves to block 1008.

In some variations, the HECU 60 may determine whether the two front wheel speeds from the front wheel sensors 80 are within a threshold percentage, and if so, the process moves to block 1010. If not, the process moves to block 1008. Additionally, and/or alternatively, in some examples, the HECU 60 may determine whether the two rear wheel speeds from the rear wheel sensors 90 are within a threshold percentage, and if so, the process moves to block 1010.

Additionally, and/or alternatively, similar to FIG. 23, the HECU 60 may use additional sensor inputs (e.g., vehicle speed, engine speed, IMU measurements, steering rate, steering angle, steering position, and/or a determination whether the vehicle is in the middle of one or more events) to determine whether to activate the differential lock. For example, if the HECU 60 determines the vehicle 2 is in the middle of one or more events (similar to block 812), the HECU 60 may delay activating the differential lock until detecting the end of the one or more events.

As represented by block 1008, the HECU 60 delays activating the differential lock of the front and/or rear ground engaging members 10, 12. In some instances, the HECU 60 may wait a pre-determined or pre-programmed amount of time prior to activating the differential lock. In some examples, the HECU 60 may continuously collect information, such as the wheel speeds. Then, the process moves back to block 1006 to determine whether the wheel speeds are within the threshold percentage. In the next iteration, if the wheel speeds are within the threshold percentage, then the HECU 60 moves to block 1010.

As represented by block 1010, the HECU 60 activates the differential lock. For example, the HECU 60 may generate a command to direct the vehicle 2 to lock the ground-engaging members 10 and/or 12.

Inducing Oversteer Conditions and/or Increasing Yaw Rate Thresholds

FIG. 26 illustrates a processing sequence 1100 for inducing oversteer conditions and/or increasing yaw rate thresholds. For example, the HECU 60 and/or the ECM 122 may include active yaw control that prevents too much yaw and/or oversteer (e.g., a yaw rate and/or oversteer threshold). In other words, if the HECU 60 determines the yaw rate of the vehicle 2 is at and/or above a yaw rate threshold, the HECU 60 may apply brake pressure to one or more ground engaging members 10, 12. However, in some instances, the user may want more yaw, generate slip, and/or to induce oversteer for one or more cornering events such as rapidly turning a vehicle 180 degrees or performing spins). Based on detecting the user intent, the HECU 60 may adjust (e.g., increase) the yaw rate threshold for a period of time to reduce the brake pressure to one or more ground engaging members 10, 12.

In operation, as represented by block 1102, the HECU 60 receives information (e.g., inputs) from sensors, devices, and/or subsystems. As described above, FIG. 11 shows a plurality of sensors, devices, and/or subsystems that may be connected (e.g., electrically or hydraulically) with the HECU 60. The HECU 60 may receive (e.g., retrieve and/or obtain) information (e.g., data packets and/or signals indicating sensor readings) from the one or more sensors, devices, and/or subsystems in FIG. 11.

As represented by block 1104, the HECU 60 determines whether it is in the middle of a cornering event (e.g., the vehicle 2 is turning) and/or detect a cornering event. The cornering event is explained above in FIG. 23. If the HECU 60 determines and/or detects the cornering event, the processing sequence 1100 moves to block 1106. Otherwise, the processing sequence 1100 moves back to block 1102 and repeats.

As represented by block 1106, the HECU 60 determines whether there is a user intent to oversteer and/or generate additional yaw. For example, the HECU 60 may determine the user intent based on the sensor information such as engine speed or torque from the engine speed sensor 220, steering angle, rate, and/or position from the steering angle sensor 130, IMU measurements (e.g., lateral acceleration) from the IMU 212, and/or pedal position from the throttle pedal position 208. If the HECU 60 determines there is user intent, the processing sequence 1100 moves to block 1108. Otherwise, it moves back to block 1102.

In some examples, based on an increase in engine torque and/or the steering angle, rate, and/or position indicating a non-countersteer direction, the HECU 60 may determine the user's intent is to induce oversteer and/or generate additional yaw. Additionally, and/or alternatively, based on the pedal position indicating an increased position instead of a steady-state position, the HECU 60 may determine the user's intent is to induce oversteer and/or generate additional yaw. Additionally, and/or alternatively, based on the lateral acceleration, the HECU 60 may determine the user's intent is to induce oversteer and/or generate additional yaw.

As represented by block 1108, the HECU 60 adjusts and/or monitors the yaw rate threshold for a period of time. For example, based on the user's intent, the HECU 60 adjusts (e.g., increases) the yaw rate threshold. Based on the increased yaw rate threshold, the HECU 60 might not provide one or more commands to apply brake pressure to the ground-engaging members 10, 12 until the detected yaw rate reaches the increased yaw rate threshold. In other words, by increasing the yaw rate threshold, the HECU 60 permits the vehicle 2 to generate more yaw and/or induce oversteering.

The HECU 60 may continue to monitor (e.g., increase, reduce, and/or maintain) the yaw rate threshold and/or sensor information for a period of time. For example, based on pedal position being at steady state (e.g., not increasing) and/or based on the steering angle, rate, and/or position indicating a normal and/or countersteer direction (e.g., based on comparing the angle, rate, and/or position with a threshold), the HECU 60 might not increase the yaw rate threshold (e.g., maintain and/or reduce the yaw rate threshold). In other words, the HECU 60 may begin controlling the vehicle 2 yaw rate by applying pressure to the brakes due to the yaw rate reaching the yaw rate threshold and/or by reducing the yaw rate threshold. Additionally, and/or alternatively, the HECU 60 may determine the yaw rate threshold has reached a maximum limit (e.g., maximum yaw rate threshold). The HECU 60 might not increase the yaw rate threshold above the maximum limit. After, the processing sequence 1100 moves back to block 1102.

Anti-Roll Back Mode

FIG. 27 illustrates anti-roll back mode logic using a braking system, such as the ABS system 40. For example, in some embodiments, a user may seek to engage vehicle 2 in an anti-roll back mode. In the anti-roll back mode, if the HECU 60 determines any wheels (e.g., ground-engaging members 10 or 12) are moving in a backwards direction, the HECU 60 may apply the ABS system (e.g., distribute hydraulic fluid to the brake calipers 48, 52) to brake the wheels. For example, typically, to traverse technical terrains (e.g., rock crawling), the user may need to apply the throttle and the brake pedal 54 at the same time to maintain forward progress. By using the anti-roll back mode, the HECU 60 may automatically and/or be configured to apply brake pressure to the ground-engaging members 10, 12 to prevent the vehicle from moving backwards, thus allowing the user to only focus on the throttle.

In operation, as represented by block 1202, the HECU 60 receives information (e.g., inputs) from sensors, devices, and/or subsystems. As described above, FIG. 11 shows a plurality of sensors, devices, and/or subsystems that may be connected (e.g., electrically or hydraulically) with the HECU 60. The HECU 60 may receive (e.g., retrieve and/or obtain) information (e.g., data packets and/or signals indicating sensor readings) from the one or more sensors, devices, and/or subsystems in FIG. 11. Then, the process moves to block 1104.

As represented by block 1204, the HECU 60 determines whether the attitude (e.g., orientation of the vehicle 2)/slope of the vehicle 2 is greater than a threshold. For example, based on the IMU information (e.g., acceleration, such as lateral and/or longitudinal acceleration) from the IMU 212, the HECU 60 may determine the vehicle's slope/attitude is greater than the threshold. In other words, the HECU 60 may determine the vehicle 2 is on technical terrain (e.g., rock crawling or traversing through rocks) and/or being loaded onto a trailer. If the attitude/slope of the vehicle 2 is greater than the threshold, the processing sequence 1200 moves to block 1206. Otherwise, the processing sequence 1200 moves back to block 1202.

As represented by block 1206, the HECU 60 determines whether the vehicle 2 is rolling and/or moving backwards. For example, based on wheel speeds from the wheel speed sensors 80, 90, the HECU 60 may determine whether there is backwards movement and/or the vehicle 2 is rolling backwards. If so, the processing sequence 1200 moves to block 1208. Otherwise, it moves back to block 1202.

As represented by block 1208, the HECU 60 activates the anti-roll back mode. For example, the HECU 60 may provide one or more commands to apply brake pressure to one or more ground engaging members 10, 12 to prevent the vehicle 2 from rolling backwards. Additionally, and/or alternatively, the HECU 60 may activate the anti-roll back mode based on user input (e.g., from the user interface 204 and/or the display 124). For example, even if the vehicle is rolling backwards and/or the attitude/slope of the vehicle 2 is greater than a threshold, the HECU 60 might not activate the anti-roll back mode unless it receives a user input indicating to activate the mode. Afterwards, the processing sequence 1200 moves back to block 1202.

In some variations, after activating the anti-roll back mode, the HECU 60 may maintain it indefinitely. In some instances, the HECU 60 may maintain the anti-roll back mode until it detects that a disabling strategy condition has been met, such as a hardware thermal limitation (e.g., the ABS module is overheating and/or the brake system is overheating). The overheating of the ABS module and the brake system is described above.

In some instances, the HECU 60 determines whether the vehicle 2 is traversing a steep slope (e.g., based on the HECU 60 determining whether the attitude/slope of the vehicle 2 is greater than a threshold from block 1204). Additionally, and/or alternatively, the HECU 60 determines whether there is a user intent to stop or slow down the vehicle 2. For example, the HECU 60 may determine a first throttle position (e.g., 50%) from the throttle pedal position 208. Then, the HECU 60 determines the user intent based on comparing the first throttle position with a second throttle position (e.g., determining a decrease from 50%). Based on the user intent and determining the vehicle 2 is traversing a steep slope, the processing sequence 1200 moves to block 1206. As represented by block 1206, the HECU 60 determines whether the vehicle 2 is rolling and/or moving backwards based on comparing the engine torque (e.g., determined from the ECM 122) with a gravity measurement indicating the gravity applied to the vehicle 2. The HECU 60 may determine the gravity measurement based on the attitude and/or slope of the vehicle 2 from block 1204. If the engine torque is less than the gravity measurement, the processing sequence 1200 moves to block 1208 and the HECU 60 activates the anti-roll back mode (e.g., applying brakes to prevent a backwards roll). Otherwise, the processing sequence 1200 moves back to block 1202.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An all terrain vehicle, comprising:
    a frame;
    a plurality of ground-engaging members supporting the frame and each of the plurality of ground-engaging members is configured to rotate about an axle;
    a powertrain assembly supported by the frame;
    one or more sensors; and
    a braking system comprising a hydraulic and electric controller unit (HECU) operably coupled to the plurality of ground-engaging members, wherein the HECU is configured to:
        receive sensor information from the one or more sensors;
        determine whether the all terrain vehicle is encountering a wheel locking event based on the sensor information, wherein the wheel locking event indicates the plurality of ground-engaging members are unable to turn;
        determine whether the all terrain vehicle is encountering a turning event based on the sensor information;
        operate in an HECU intervention mode based on an indication that the all terrain vehicle is encountering the wheel locking event and the turning event, wherein the HECU intervention mode permits the HECU to control the plurality of ground-engaging members based on steering input.

2. The all terrain vehicle of claim 1, wherein the HECU is configured to:
    operate in a non-HECU intervention mode based on an indication that the all terrain vehicle is encountering the wheel locking event and not encountering the turning event, wherein the HECU is unable to control the plurality of ground-engaging members based on the steering input in the non-HECU intervention mode.

3. The all terrain vehicle of claim 1, wherein the determining whether the all terrain vehicle is encountering the wheel locking event based on:
    determining, based on the sensor information, whether brakes have been applied; and
    determining, based on the sensor information, whether a reference vehicle speed is greater than a threshold.

4. The all terrain vehicle of claim 3, wherein the sensor information indicates an inertial measurement unit (IMU) measurement and one or more ground-engaging member speeds, and wherein the HECU is configured to:
    determine the reference vehicle speed based on the one or more ground-engaging member speeds and the IMU measurement.

5. The all terrain vehicle of claim 1, wherein the sensor information indicates a steering measurement, and wherein the determining whether the all terrain vehicle is encountering the turning event is based on:
    determining a user intent to turn the vehicle based on comparing the steering measurement with a steering measurement threshold.

6. The all terrain vehicle of claim 1, wherein the sensor information indicates an IMU measurement, and wherein the determining whether the all terrain vehicle is encountering the turning event is based on:
    determining a change of direction of the all terrain vehicle based on the IMU measurement.

7. The all terrain vehicle of claim 1, wherein the HECU is configured to:
    determine a detected terrain the all terrain vehicle is traversing based on the sensor information, and
    wherein the operating in the HECU intervention mode is based on the detected terrain.

8. The all terrain vehicle of claim 7, wherein the sensor information indicates a plurality of IMU measurements over a period of time, and wherein the determining the detected terrain is based on performing signal processing on the plurality of IMU measurements over the period of time.

* * * * *